United States Patent
Cuno et al.

(10) Patent No.: US 11,934,025 B2
(45) Date of Patent: Mar. 19, 2024

(54) FAUS INCLUDING PASSIVE ALIGNMENT ADHESIVE PROFILES AND RELATED METHODS

(71) Applicant: CORNING RESEARCH & DEVELOPMENT CORPORATION, Corning, NY (US)

(72) Inventors: Alexander Lee Cuno, Sayre, PA (US); James Scott Sutherland, Painted Post, NY (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 0 days.

(21) Appl. No.: 17/232,384

(22) Filed: Apr. 16, 2021

(65) Prior Publication Data
US 2021/0341679 A1    Nov. 4, 2021

Related U.S. Application Data

(60) Provisional application No. 63/143,196, filed on Jan. 29, 2021, provisional application No. 63/075,975, (Continued)

(51) Int. Cl.
*G02B 6/42* (2006.01)
*G02B 6/36* (2006.01)
(Continued)

(52) U.S. Cl.
CPC .......... *G02B 6/448* (2013.01); *G02B 6/3616* (2013.01); *G02B 6/3628* (2013.01);
(Continued)

(58) Field of Classification Search
CPC .............................. G02B 6/36; G02B 6/3644
See application file for complete search history.

(56) References Cited

U.S. PATENT DOCUMENTS 5,216,741 A   6/1993   Blijleven et al.
5,377,286 A   12/1994  Iida et al.
(Continued)

FOREIGN PATENT DOCUMENTS

CN   207081857 U   3/2018
CN   110673267 A   1/2020
(Continued)

OTHER PUBLICATIONS

Barton et al., "10-channel fiber array fabrication technique for parallel optical coherence tomography system", in Proc. SPIE 6429, Coherence Domain Optical Methods and Optical Coherence Tomography in Biomedicine XI, 64292H, Feb. 7, 2007, 9 pages.
(Continued)

*Primary Examiner* — Eric Wong
(74) *Attorney, Agent, or Firm* — Tamika A. Crawl-Bey

(57) ABSTRACT

A fiber optic assembly is provided including a support substrate having a substantially planar surface, a signal-fiber array supported on the planar surface of the support substrate. The signal-fiber array including a plurality of optical fibers and an adhesive disposed on the plurality of optical fibers and the support substrate. Each of the optical fibers is spaced from adjacent optical fibers of the plurality of optical fibers at a precise pitch.

24 Claims, 75 Drawing Sheets

Related U.S. Application Data filed on Sep. 9, 2020, provisional application No. 63/018,020, filed on Apr. 30, 2020, provisional application No. 63/018,072, filed on Apr. 30, 2020.

(51) Int. Cl.
  *G02B 6/38* (2006.01)
  *G02B 6/44* (2006.01)
  *G02B 6/02* (2006.01)
  *G02B 6/30* (2006.01)

(52) U.S. Cl.
  CPC ......... *G02B 6/3672* (2013.01); *G02B 6/3885* (2013.01); *G02B 6/424* (2013.01); *G02B 6/4403* (2013.01); *G02B 6/4482* (2013.01); *G02B 6/02033* (2013.01); *G02B 6/02042* (2013.01); *G02B 6/30* (2013.01); *G02B 6/3636* (2013.01); *G02B 6/3652* (2013.01); *G02B 6/423* (2013.01); *G02B 6/4245* (2013.01); *G02B 6/428* (2013.01)

(56) References Cited

U.S. PATENT DOCUMENTS

| | | |
|---|---|---|
| 5,486,378 A | 1/1996 | Oestreich et al. |
| 5,812,726 A | 9/1998 | Jinnai et al. |
| 5,905,829 A | 5/1999 | Maenishi et al. |
| 6,048,106 A | 4/2000 | Masayuki |
| 6,052,500 A | 4/2000 | Takano et al. |
| 6,108,467 A | 8/2000 | Naraoka et al. |
| 6,118,917 A | 9/2000 | Lee et al. |
| 6,160,936 A | 12/2000 | You et al. |
| 6,241,399 B1 | 6/2001 | Nobuhara |
| 6,321,019 B1 | 11/2001 | Shibuya et al. |
| 6,442,306 B1 | 8/2002 | Dautartas et al. |
| 6,549,710 B2 | 4/2003 | Simmons et al. |
| 6,655,848 B2 | 12/2003 | Simmons et al. |
| 6,669,378 B2 | 12/2003 | Nobuhara et al. |
| 6,866,426 B1 | 3/2005 | Steinberg et al. |
| 7,123,355 B2 | 10/2006 | Matsumoto et al. |
| 7,889,963 B2 | 2/2011 | Sato |
| 8,867,876 B2 | 10/2014 | Saravanos et al. |
| 9,405,073 B2 | 8/2016 | Chen et al. |
| 9,423,561 B1 | 8/2016 | Chou et al. |
| 9,575,267 B1 | 2/2017 | Shastri et al. |
| 9,706,670 B1 | 7/2017 | Barwicz et al. |
| 9,971,096 B2 | 5/2018 | Shastri et al. |
| 10,048,455 B2 | 8/2018 | Pfnuer |
| 10,107,967 B1 | 10/2018 | Butler et al. |
| 10,288,812 B1 | 5/2019 | Evans et al. |
| 10,409,004 B2 | 9/2019 | Kulick et al. |
| 10,488,602 B2 | 11/2019 | Evans |
| 10,718,908 B2 | 7/2020 | Yang |
| 11,105,989 B2 | 8/2021 | Lim |
| 2003/0002814 A1* | 1/2003 | Dudoff ................. G02B 6/4249 385/146 |
| 2003/0091289 A1 | 5/2003 | Saito et al. |
| 2009/0245736 A1 | 10/2009 | Ahadian et al. |
| 2009/0246905 A1 | 10/2009 | Badehi et al. |
| 2012/0051694 A1 | 3/2012 | Russert |
| 2014/0023332 A1 | 1/2014 | Nishigaki et al. |
| 2015/0117821 A1 | 4/2015 | Aoki et al. |
| 2017/0205592 A1 | 7/2017 | Pfnuer |
| 2017/0351031 A1 | 12/2017 | Shastri et al. |
| 2018/0052285 A1 | 2/2018 | Barwicz et al. |
| 2018/0267265 A1 | 9/2018 | Zhang et al. |
| 2019/0086618 A1 | 3/2019 | Shastri et al. |
| 2019/0179079 A1 | 6/2019 | Potluri et al. |
| 2019/0243071 A1* | 8/2019 | Yang ..................... G02B 6/3644 |
| 2019/0285804 A1 | 9/2019 | Ramachandran et al. |
| 2019/0310431 A1 | 10/2019 | Patel et al. |
| 2019/0384005 A1 | 12/2019 | Brusberg et al. |
| 2019/0384007 A1 | 12/2019 | Matiss et al. |
| 2020/0183103 A1 | 6/2020 | Hochberg et al. |
| 2021/0096302 A1* | 4/2021 | Butler .................. G02B 6/3861 |
| 2021/0109302 A1 | 4/2021 | Guan |
| 2021/0223487 A1 | 7/2021 | Patel et al. |
| 2021/0341679 A1* | 11/2021 | Cuno, Jr. ................ G02B 6/448 |

FOREIGN PATENT DOCUMENTS

| | | | |
|---|---|---|---|
| EP | 0176623 | A1 | 4/1986 |
| EP | 0841582 | A1 | 5/1998 |
| JP | 63-157114 | A | 6/1988 |
| JP | 2000-066057 | A | 3/2000 |
| JP | 3257565 | B2 | 2/2002 |
| JP | 2002-287052 | A | 10/2002 |
| JP | 2003-043305 | A | 2/2003 |
| JP | 2004-226940 | A | 8/2004 |
| JP | 3813318 | B2 | 8/2006 |
| JP | 2007-178852 | A | 7/2007 |
| JP | 5196839 | B2 | 5/2013 |
| JP | 2017-111318 | A | 6/2017 |
| JP | 6379489 | B2 | 8/2018 |
| KR | 10-2010-0045433 | A | 5/2010 |
| KR | 10-1181991 | B1 | 9/2012 |
| WO | 03/23460 | A2 | 3/2003 |
| WO | 2007/001924 | A1 | 1/2007 |
| WO | 2018/182516 | A1 | 10/2018 |

OTHER PUBLICATIONS

Hoffmann et al., "Fiber ribbon alignment structures based on rhombus-shaped channels in silicon", in IEEE Photonics Technology Letters 12(7), 2000, pp. 828-830.
European Patent Application No. 21171241.9, Extended European Search Report dated Oct. 4, 2021; 8 pages; European Patent Office.

* cited by examiner

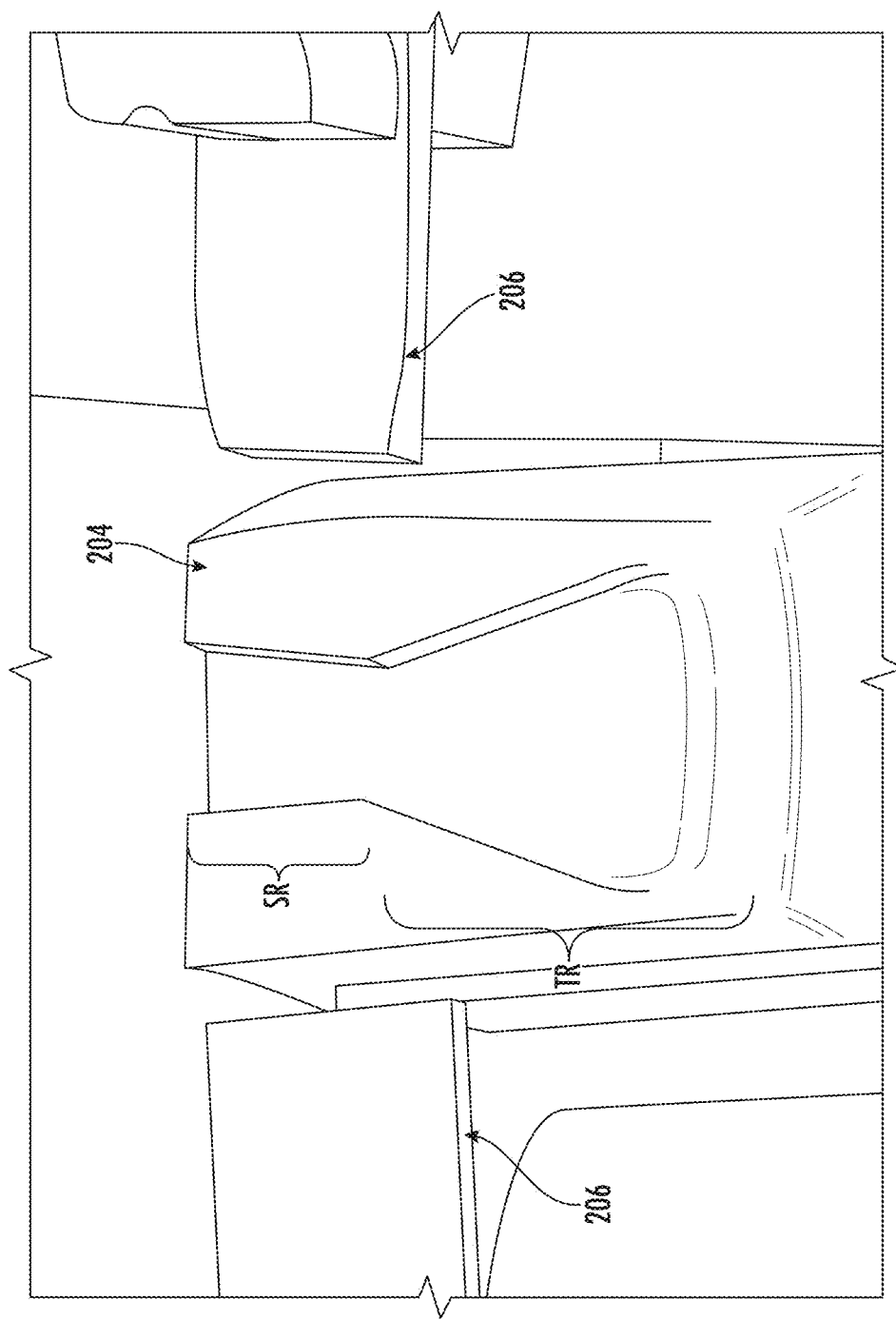

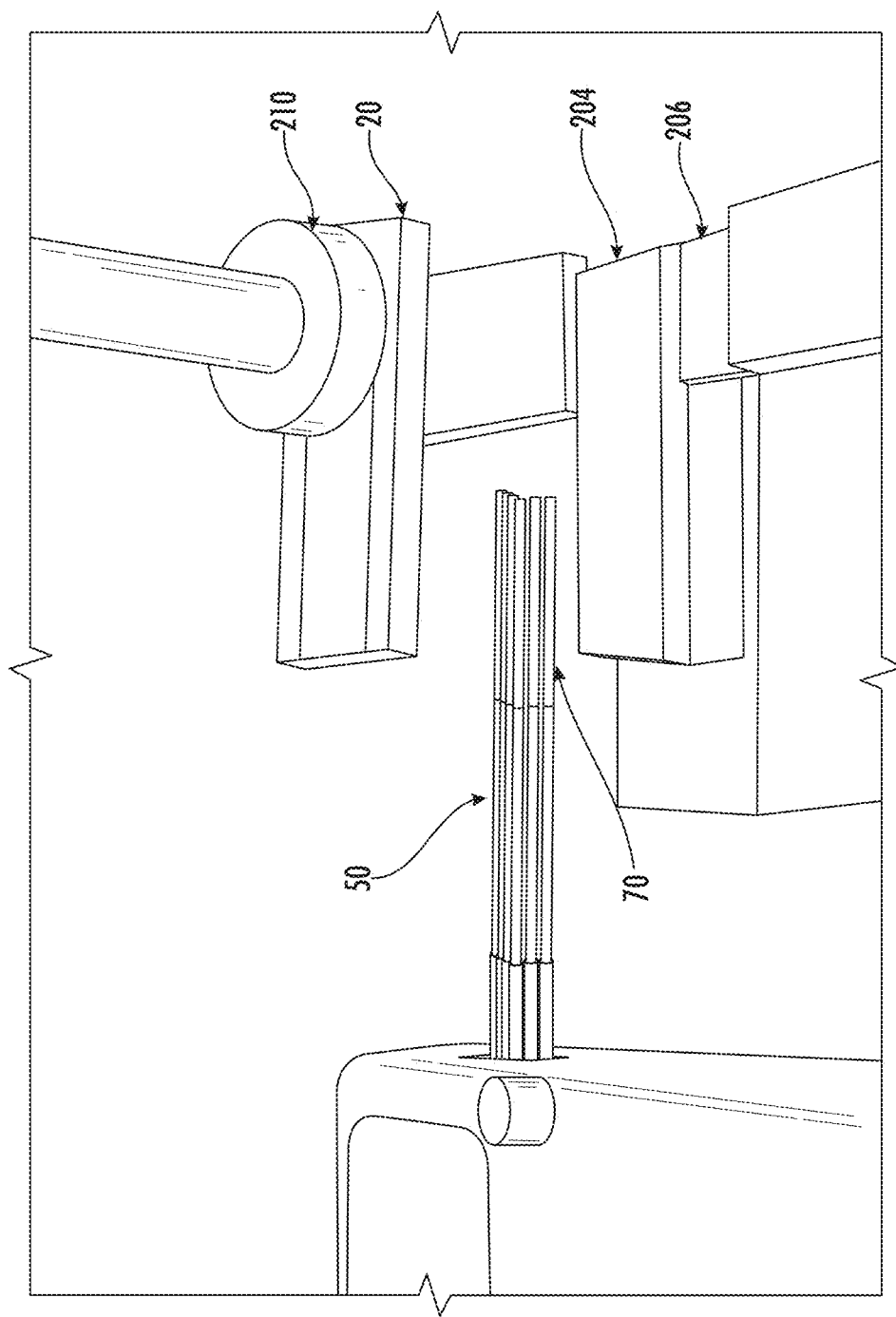

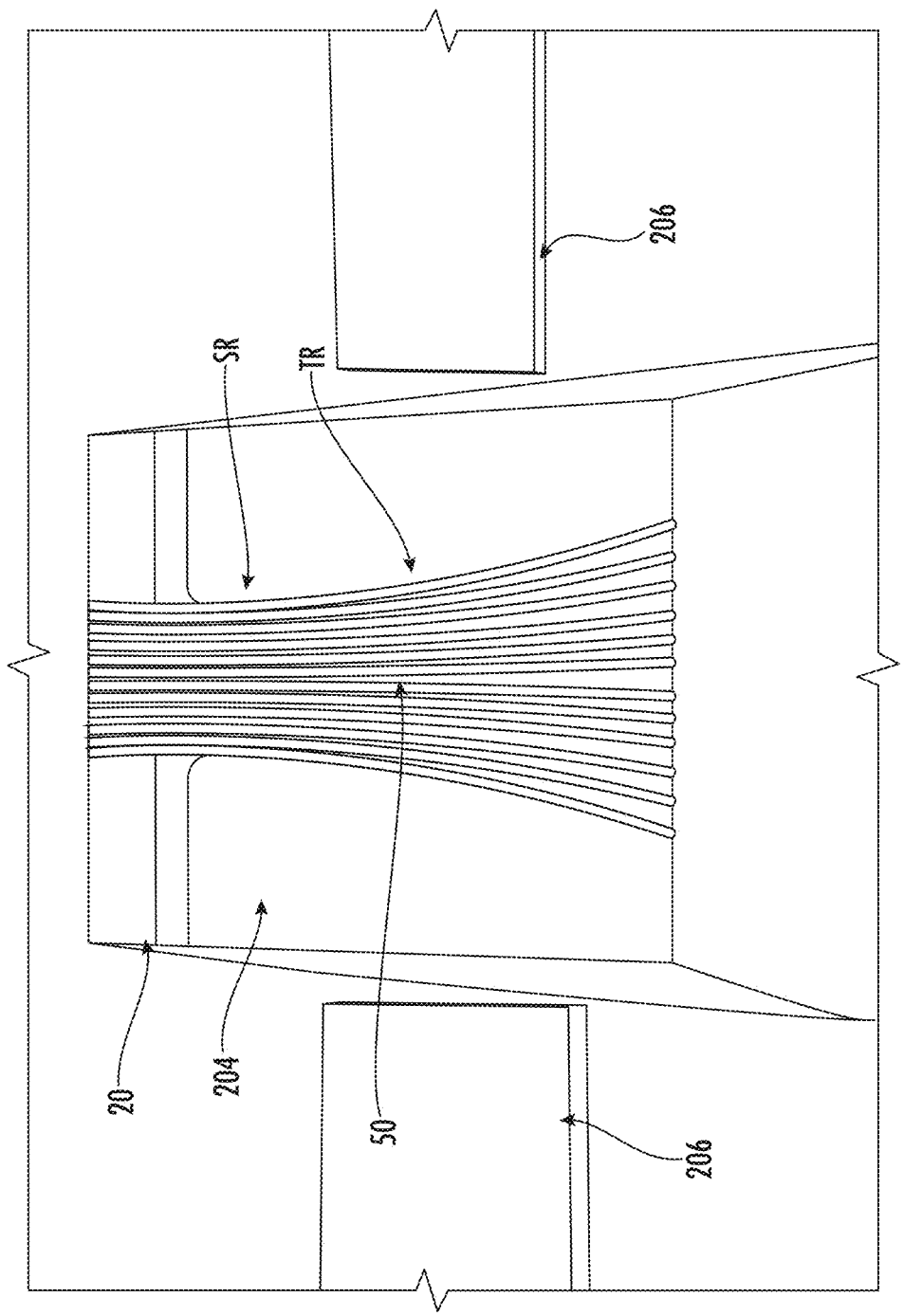

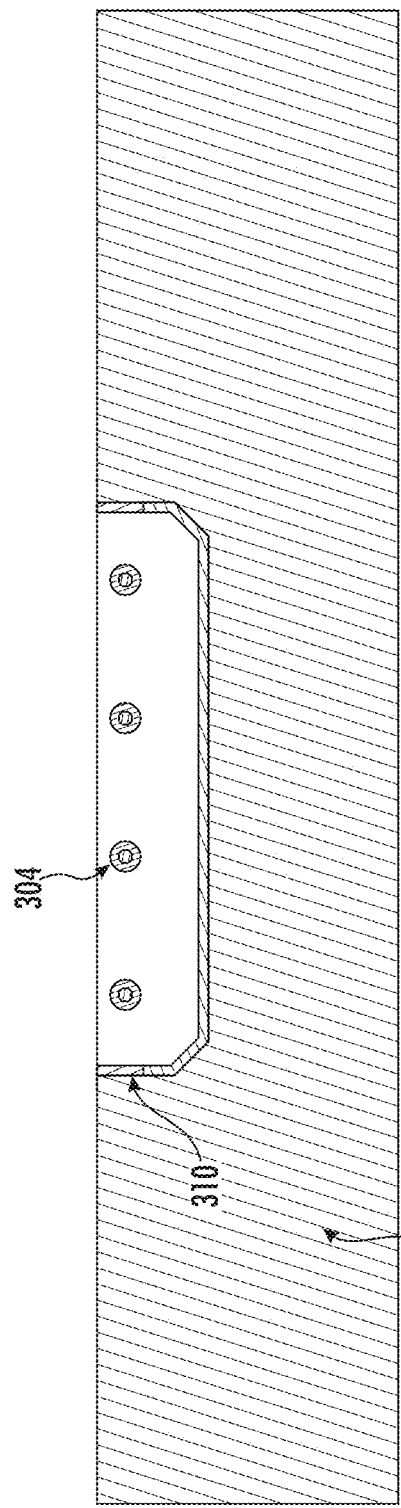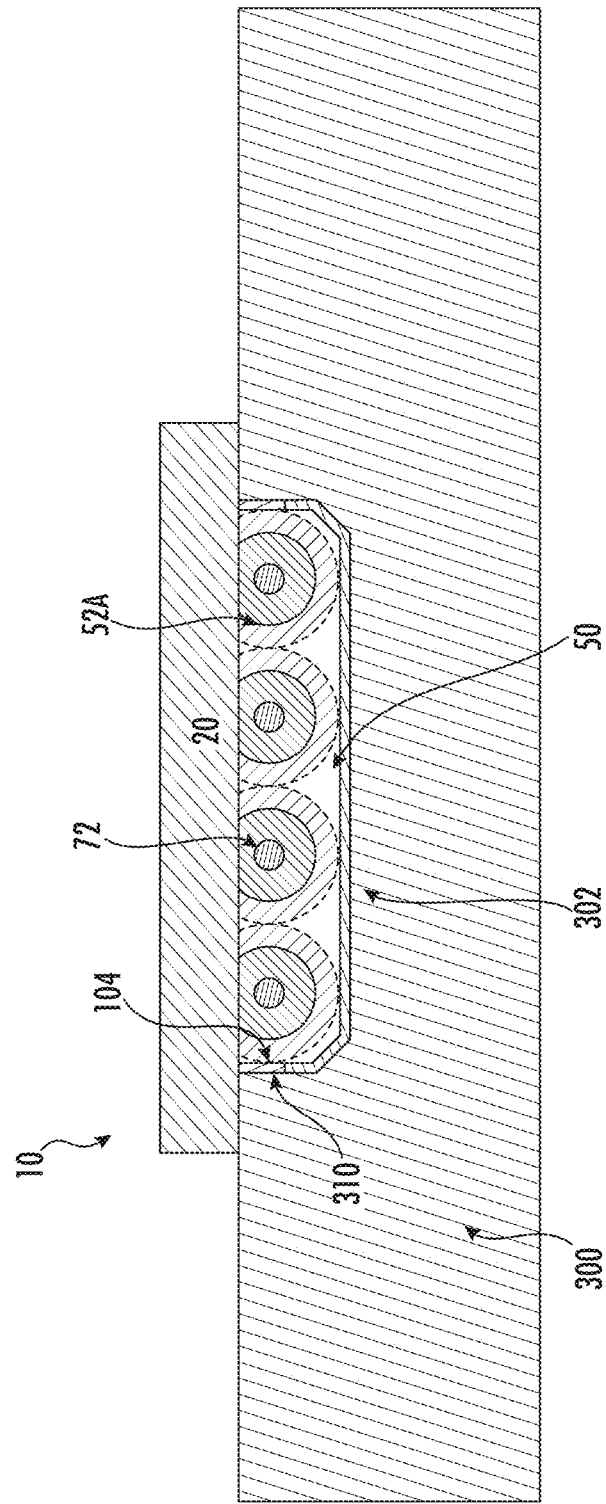

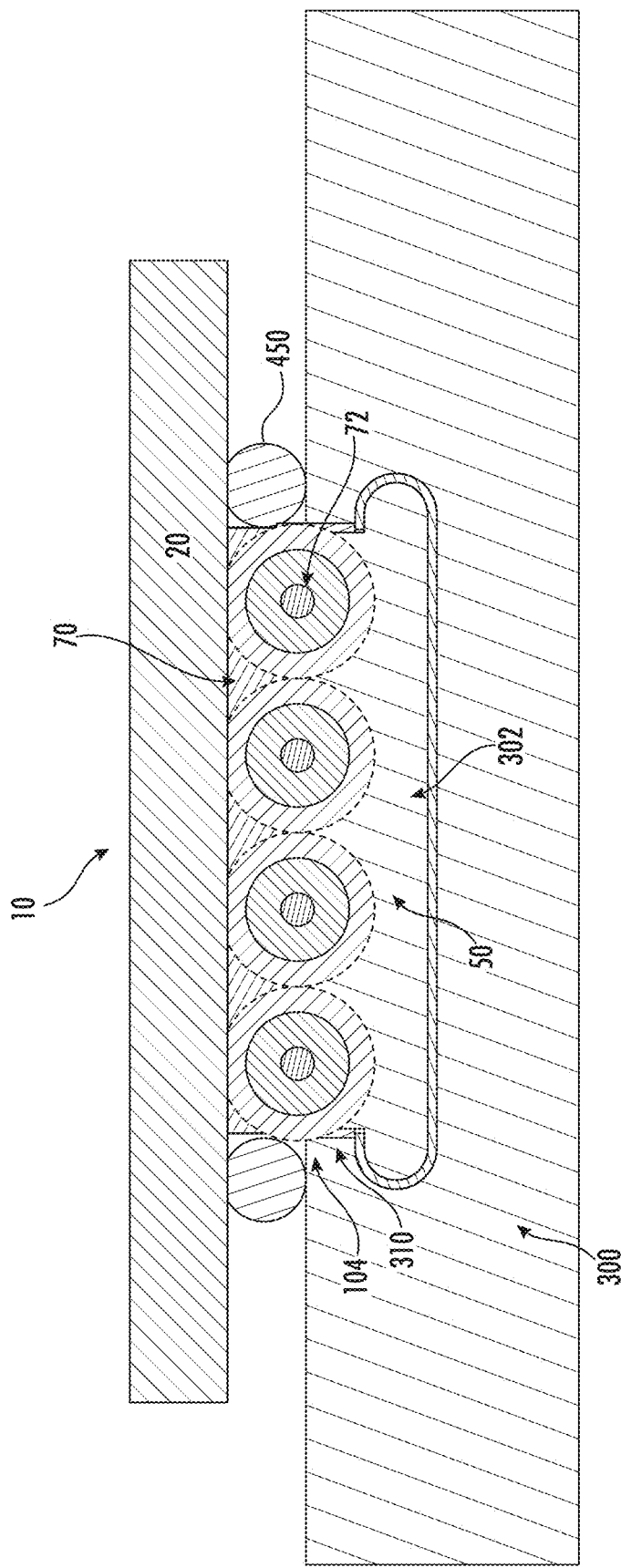

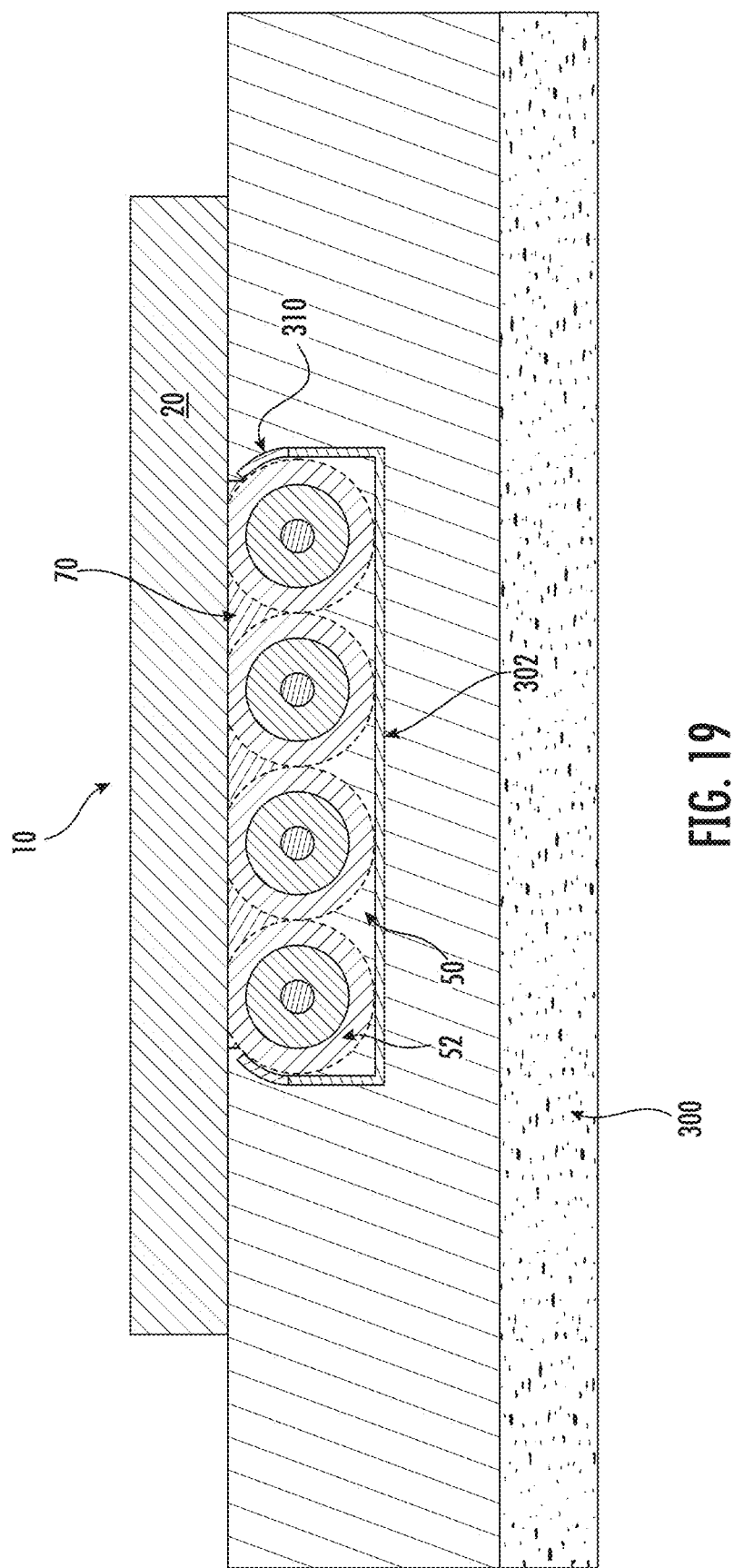

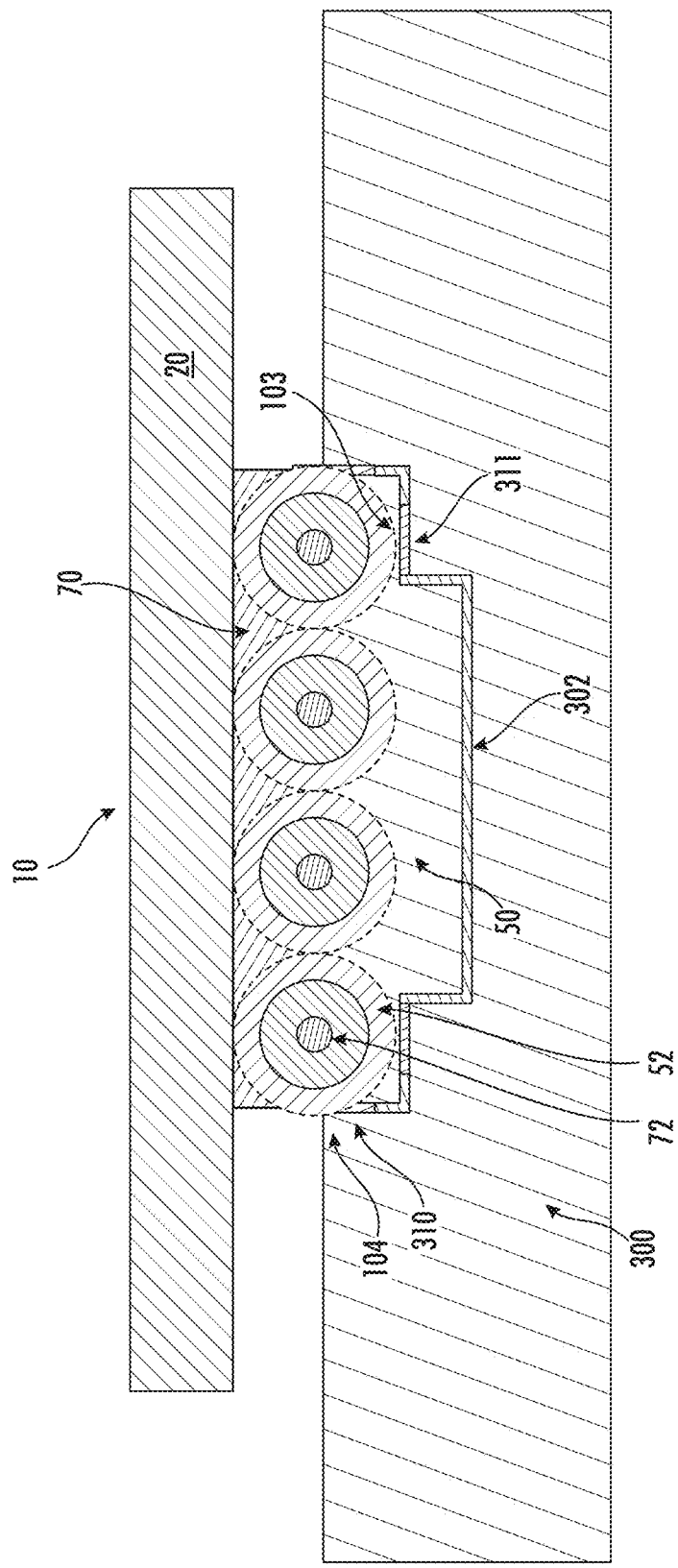

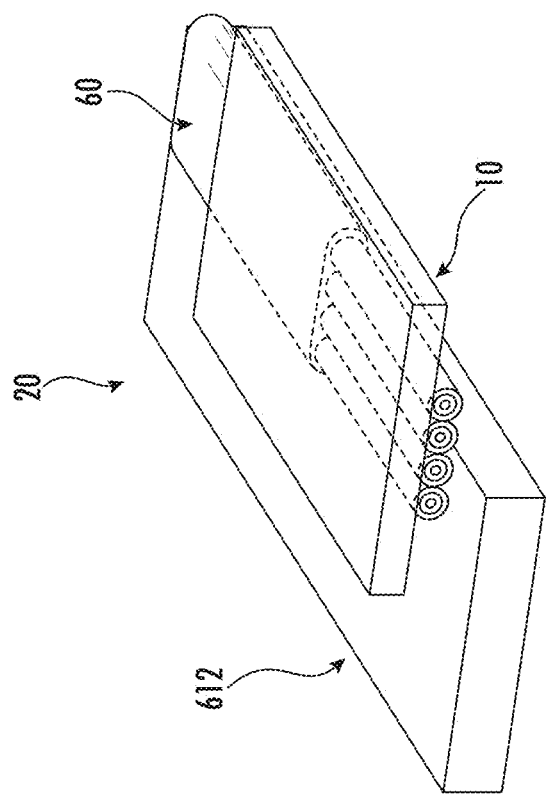
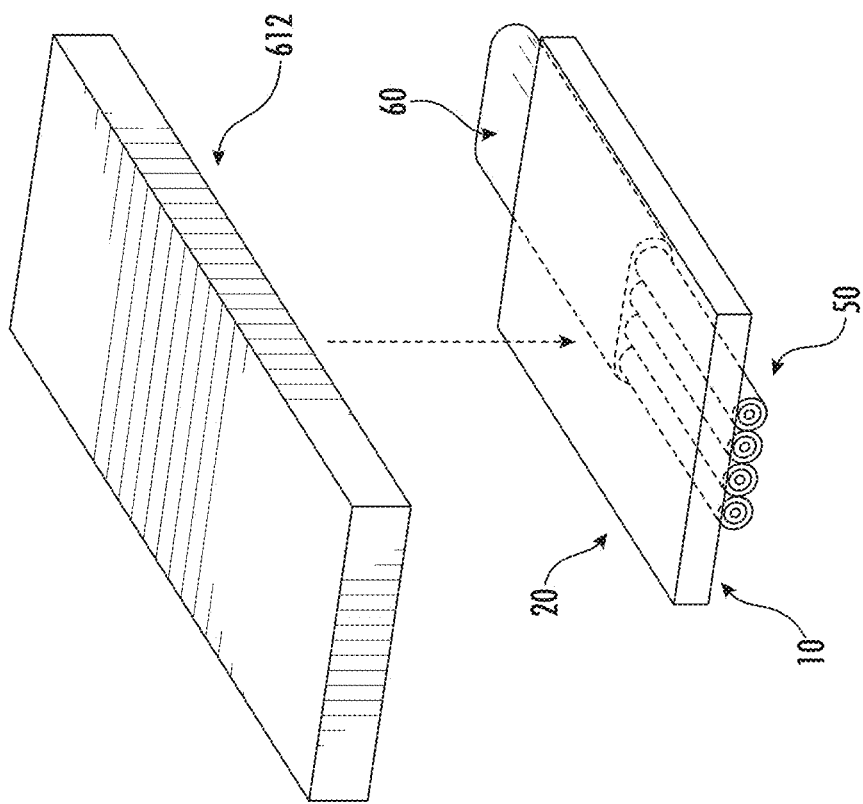
FIG. 28B
FIG. 28A

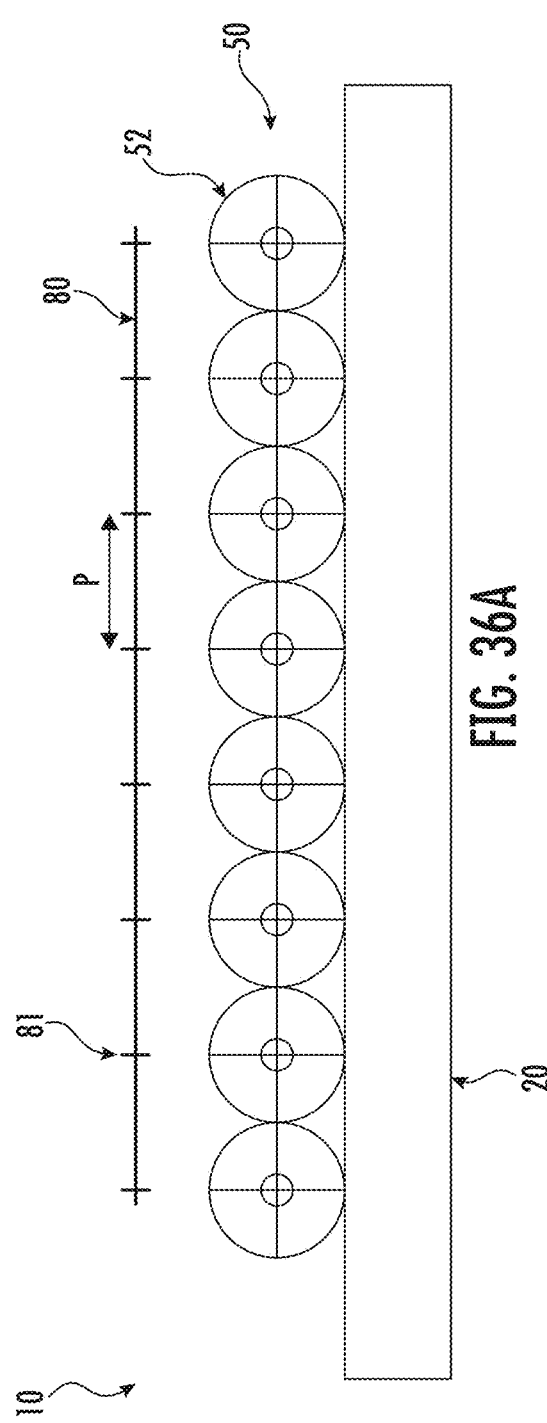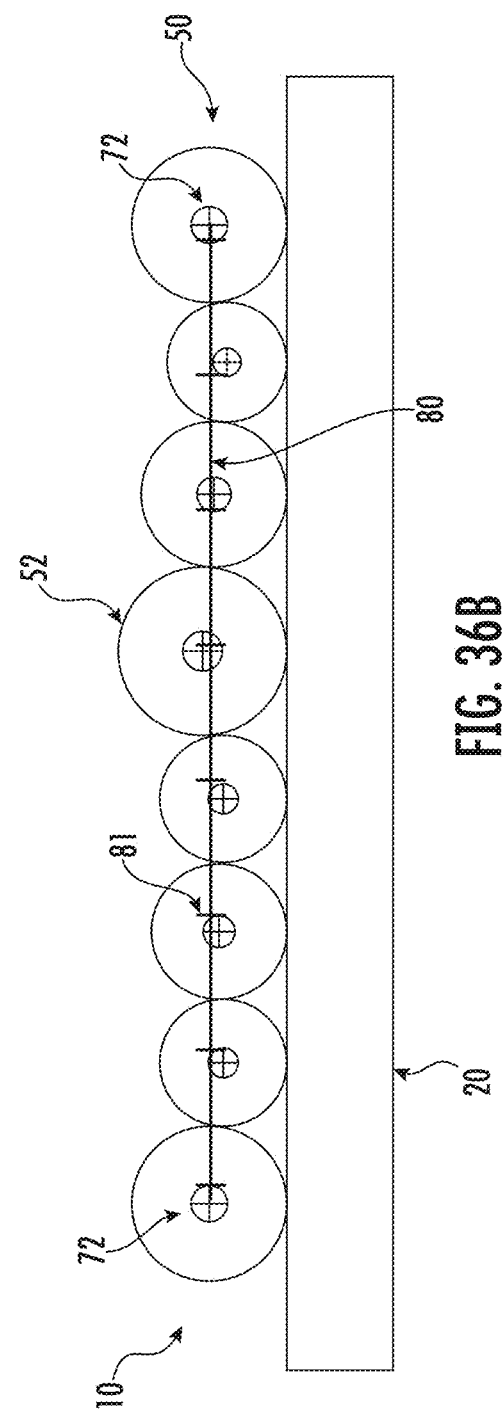

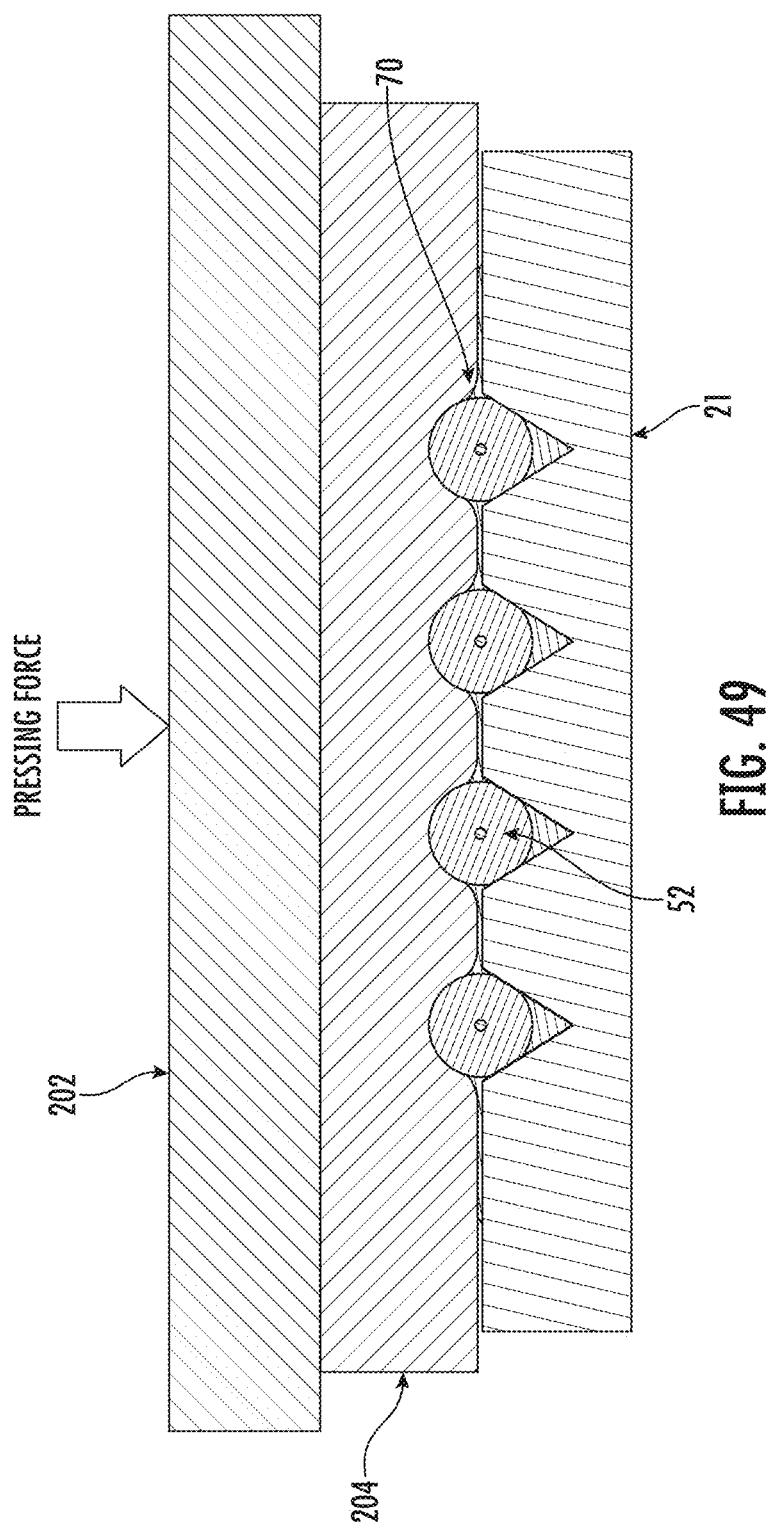

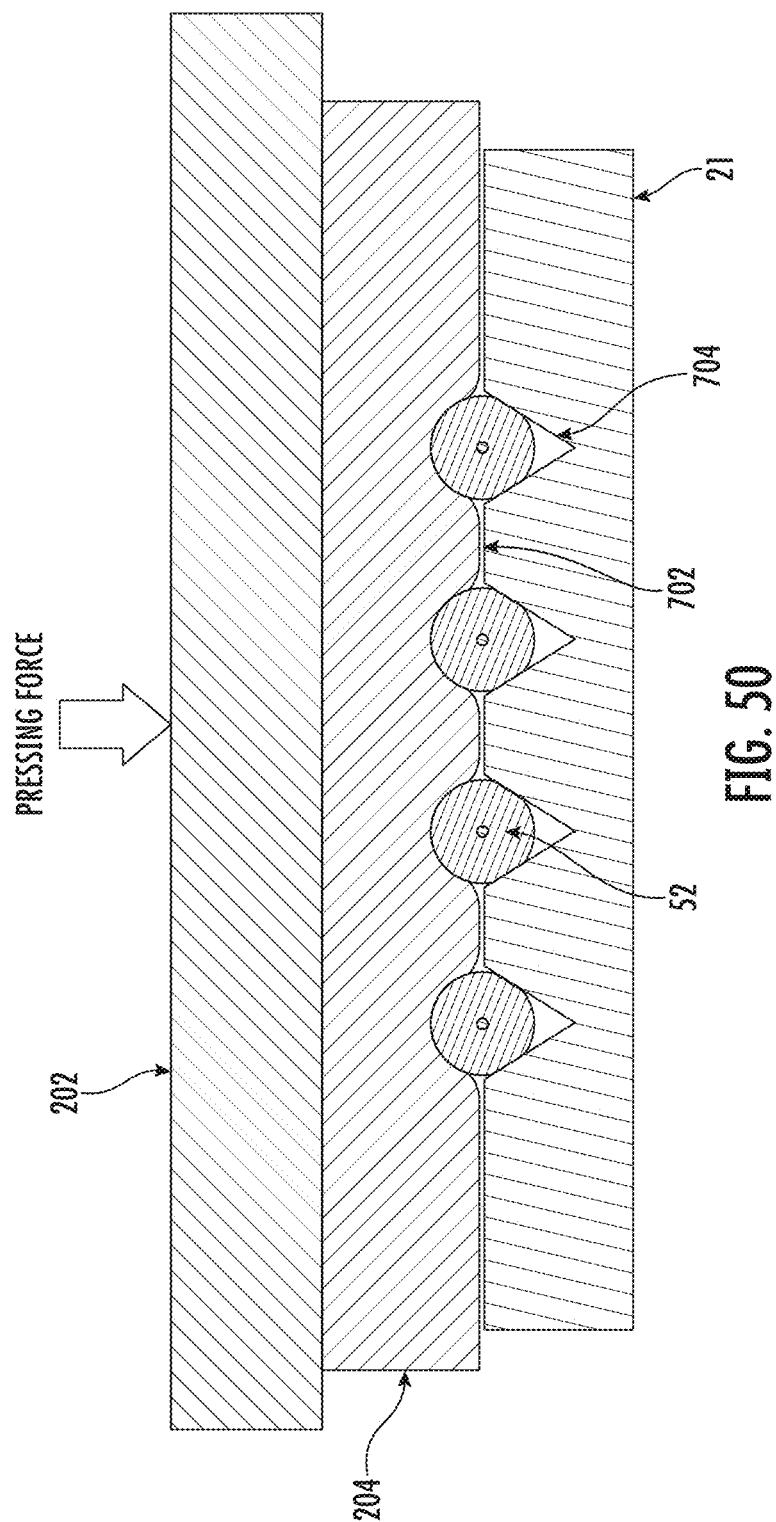

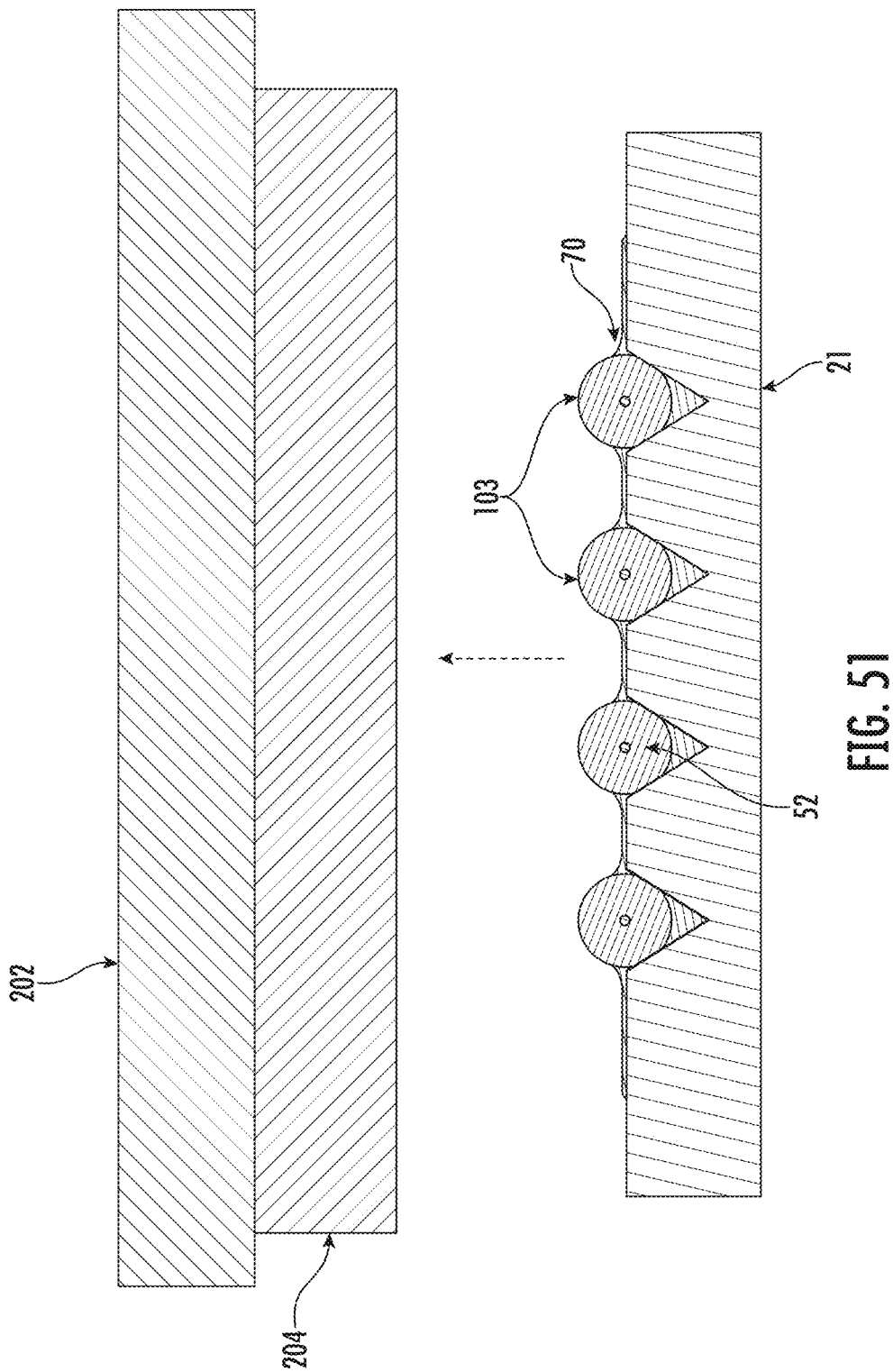

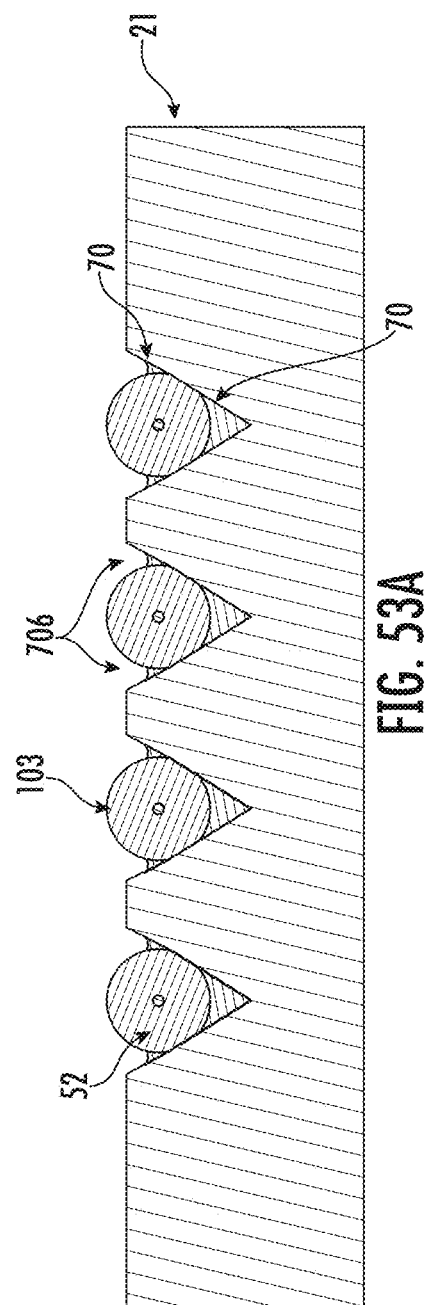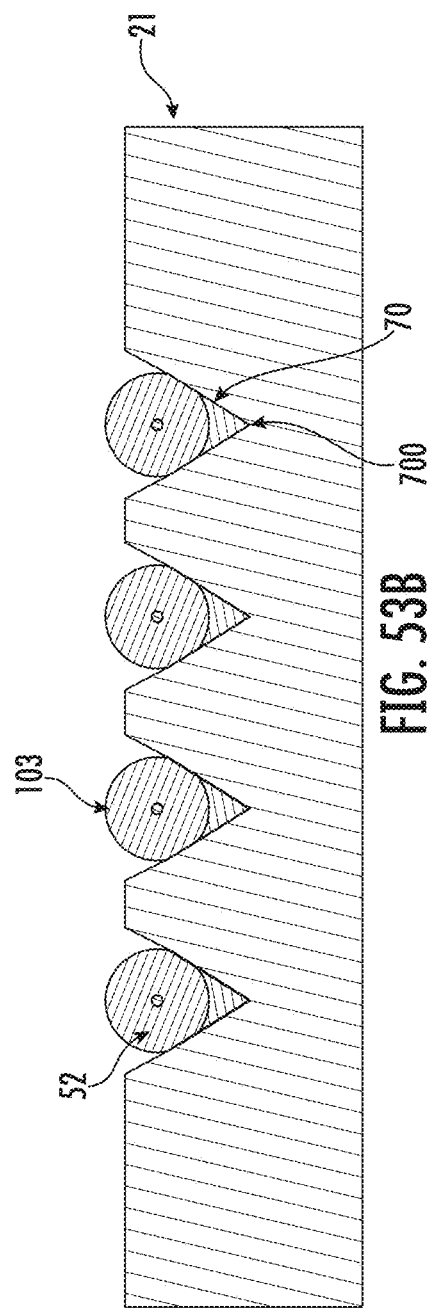

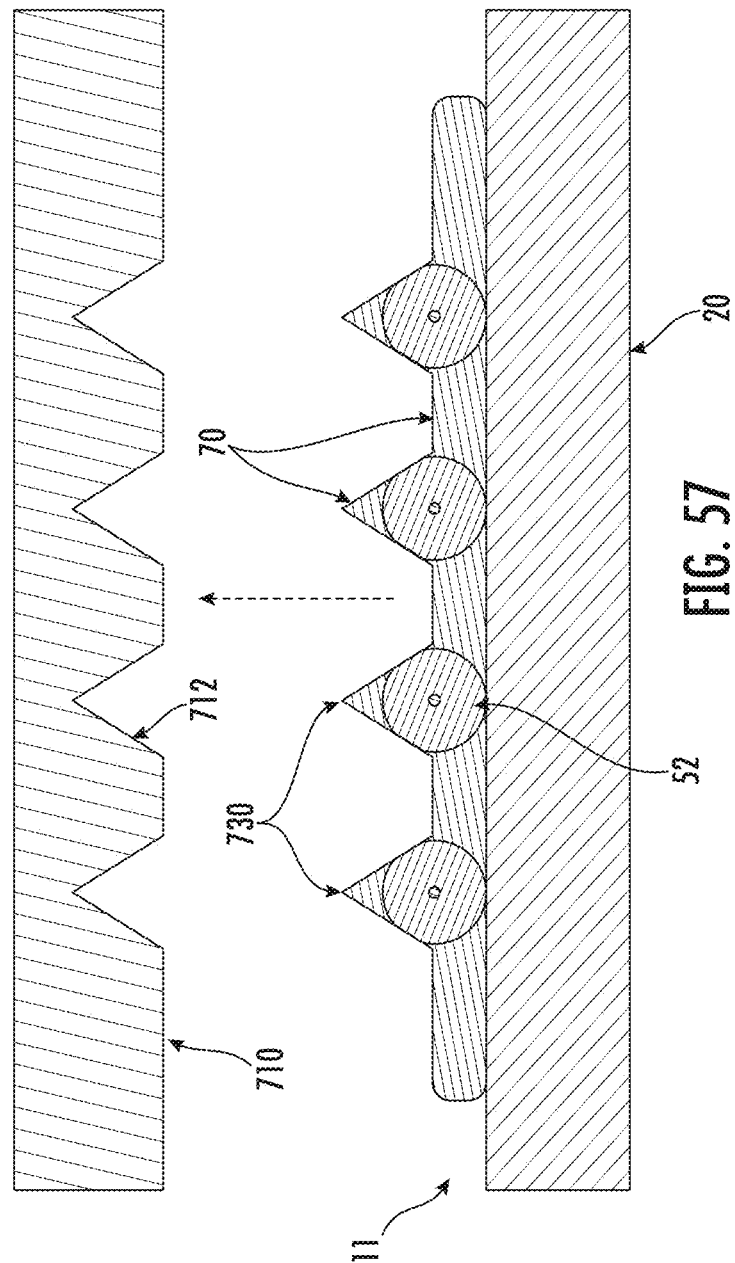

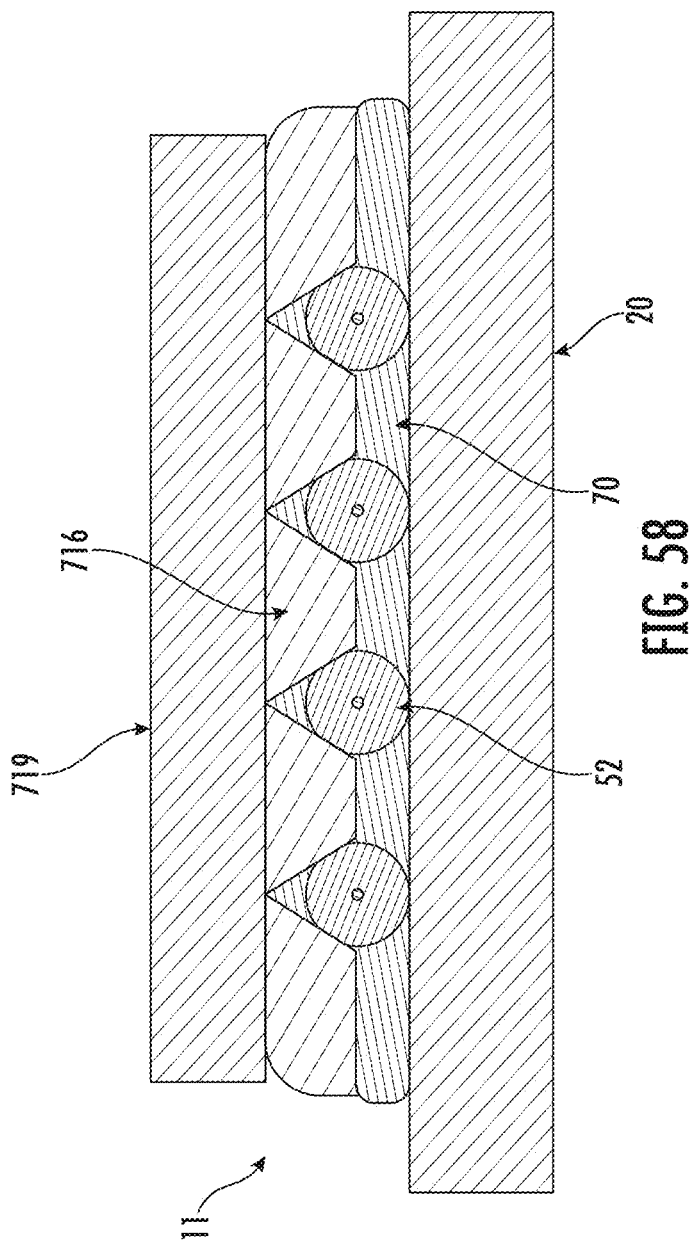

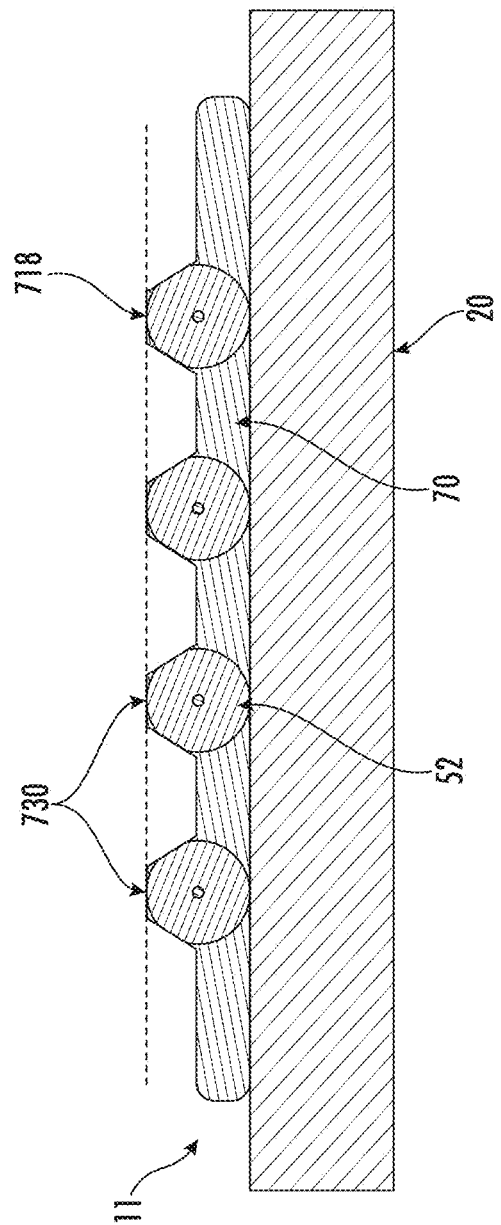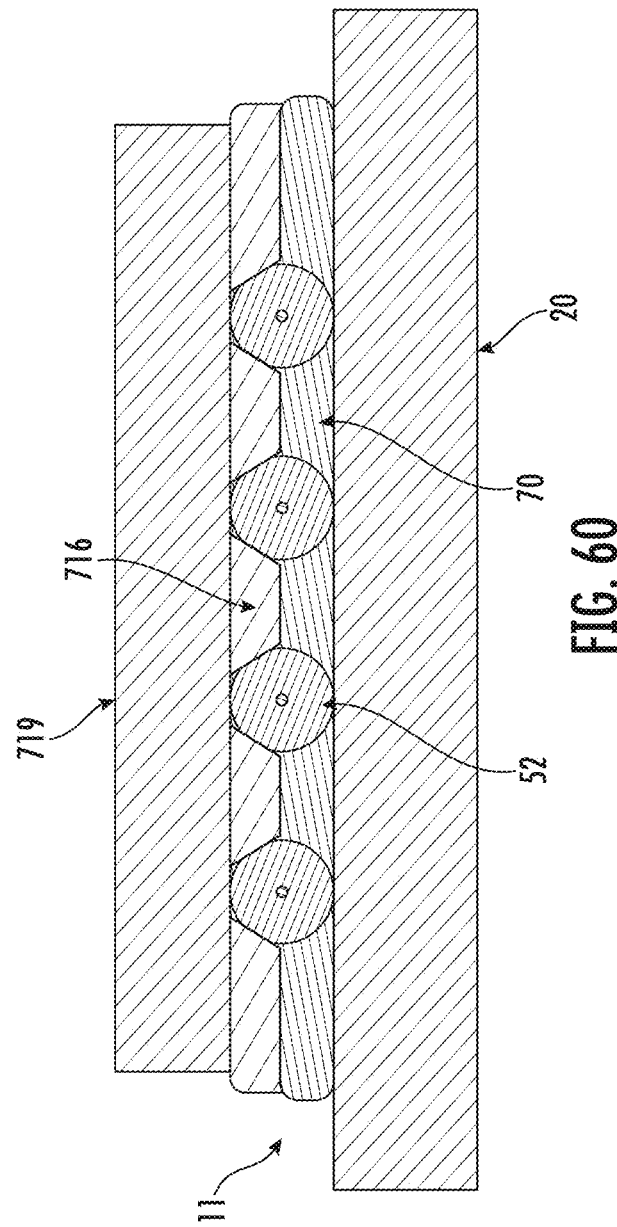

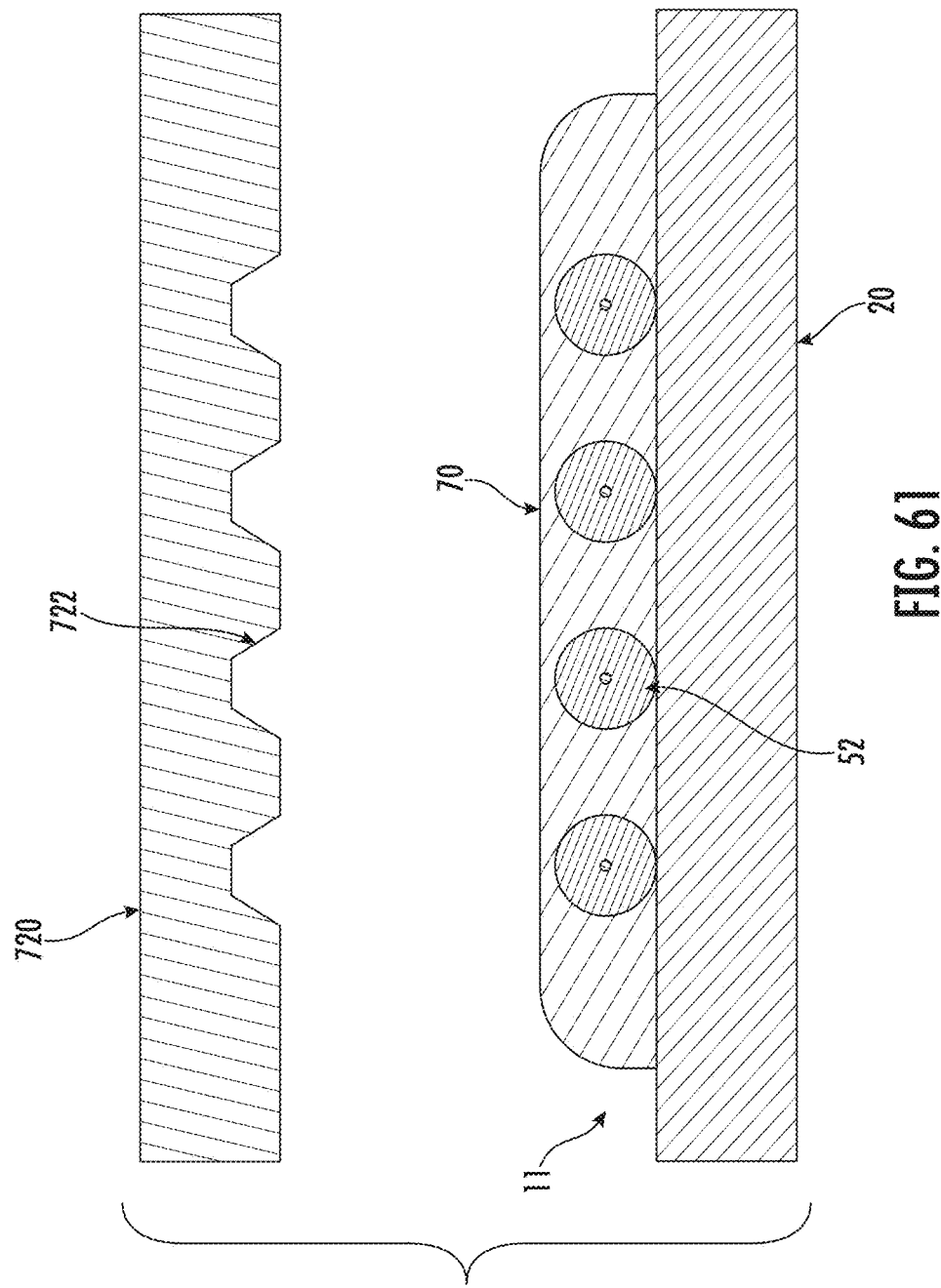

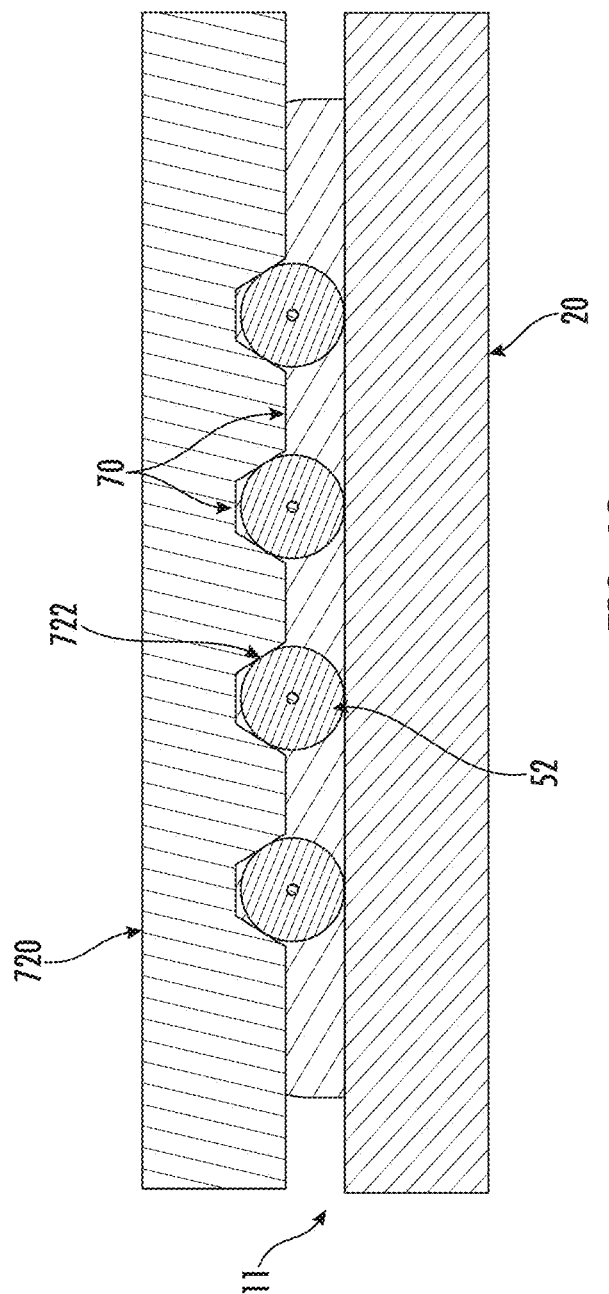

FAUS INCLUDING PASSIVE ALIGNMENT ADHESIVE PROFILES AND RELATED METHODS

PRIORITY APPLICATIONS

This application claims the benefit of priority of U.S. Provisional Application No. 63/143,196, filed on Jan. 29, 2021, U.S. Provisional Application No. 63/075,975, filed on Sep. 9, 2020, U.S. Provisional Application No. 63/018,072, filed on Apr. 30, 2020, and U.S. Provisional Application No. 63/018,020, filed on Apr. 30, 2020, the content of which is relied upon and incorporated herein by reference in entirety.

BACKGROUND

Field of the Disclosure

The present disclosure relates generally to optical fibers and connections. More particularly, this disclosure relates to high-density fiber array units (FAUs).

Technical Background

Fiber connectors are optical interconnection devices that are used to optically connect a first optical fiber to a second optical fiber, or a first set (array) of optical fibers to a second set (array) of optical fibers. Such fiber connectors are sometimes called fiber-to-fiber connectors. The optical fibers are typically carried by optical fiber cables ("cables"). Cables that carry multiple optical fibers are called multifiber cables. Cables where the optical fibers are carried in rows and which are relatively flat are called fiber ribbon cables or just "ribbon cables."

Fiber connectors may also be used to optically connect an array of optical fibers carried by a multifiber cable to an array of optical waveguides of a planar light circuit (PLC) or an integrated photonic device such as a photonic integrated circuit (PIC). Such fiber connectors are sometimes called fiber-to-chip connectors.

Because optical fibers have relatively small core diameters, e.g., on the order of 10 microns for single mode optical fibers, fiber-to-fiber connectors and fiber-to-chip connectors need to establish alignment with their optical counterpart connectors to submicron accuracy. Fiber connectors configured to connect multiple optical fibers such as carried by a multifiber cable are referred to as multifiber connectors.

A conventional approach to achieving precision alignment of an array of optical fibers in a multifiber connector is to use a V-groove substrate machined from flat glass. Unfortunately, fabricating V-groove substrates is expensive and time consuming and requires the use of expensive machine tools. As it is anticipated that multifiber connectors will find increasing use for a variety of applications that would benefit from leveraging the data-carrying capacity of multifiber cables, there is a need for low-cost manufacturing solutions for forming multifiber connectors that may still provide the required alignment precision when making optical interconnections between arrays of optical fibers or between an array of optical fibers and an array of waveguides of a PLC or PIC.

SUMMARY OF THE DETAILED DESCRIPTION

The present disclosure discloses compact, solder reflow compatible, FAUs based on lidless fiber array squeeze technology, and processes to fabricate the same. These lidless FAUs may be well suited for passive alignment to PICs. In some high bandwidth data center switches, co-location of many compact optoelectronic transceivers around electronic switch chips on a common interposer substrate or multi-chip module is becoming a common practice. Lidless FAUs enable a variety of optical interconnections to PICs used in optoelectronic transceivers, including edge, evanescent, and grating coupling solutions. Elimination of the expensive glass V-groove substrate normally found in an FAU helps reduce material cost, while the squeeze approach enables arrangement of optical fibers on a fine pitch for compact high density PIC interconnections.

In an example embodiment, a FAU may be fabricated with an integral support sheet that stiffens the fiber array. An interdigitated bare fiber array may be arranged on top of a rigid support sheet and an adhesive applied. A release pad may be disposed on the exposed surface of the bare fibers. The FAU may then be placed between a top plate and a bottom plate. Force is applied on all four sides of the fiber array to force adjacent fibers into contact with each other. The vertical squeeze force, applied to the top plate and bottom plate, ensures that all fibers in the fiber array are in contact with the top surface of the support sheet. A horizontal squeeze force may be applied to the bare fibers by pusher sheets ensuring contact between adjacent optical fibers. The adhesive may be a UV-curable adhesive which is cured by applying ultraviolet (UV) light, heat, or the like. After the adhesive has cured the force and release pad may be removed, resulting in a lidless FAU that includes datum contacts between each of the adjacent optical fibers of the fiber array and between each of the optical fibers and the support substrate. Further, the fiber array includes an exposed datum surface disposed at a top surface of each optical fiber of the fiber array and/or an exposed datum surface on each edge optical fiber. These exposed datum surfaces may be mated with precision surfaces, such as on a waveguide substrate to enable highly accurate passive alignment of the optical fibers of the FAU to waveguides of the waveguide substrate.

In some example embodiments, the optical fibers of the fiber array may be organized according to the respective outside diameters of the fiber cladding prior to ribbonization. The fiber array may be compared to an ideal core position in a first configuration. to determine a core position error The positions of two fibbers of the fiber array may be swapped and compared to the ideal core position to determine a second core position error. The process may be iterated a predetermined number of time to determine a fiber array configuration having the smallest, e.g. optimized, core position error. By optimizing the order of the optical fibers that comprise the ribbon, the core-to-core pitch error may be minimized resulting in significantly less core-to-core pitch errors in the FAU. This may be especially true in a large array FAU, such as 24-96 fibers. In an example embodiment, a group of optical fibers may be selected and a simulation of core-to-core pitch errors based on the cladding measurements for each of the optical fibers may be carried out. The optical fibers may then be arranged in an order that minimized core-to-core pitch error prior to ribbonization.

Lidless or lid-optional FAUs of the present disclosure compared to V-grooves are relatively more compact, easier to prepare in advance, and more practical for use in pick-and-place applications.

In still further example embodiments, a fiber optic assembly is provided including a support substrate having a first surface comprising a plurality of V-grooves and a signal-fiber array supported on the first surface of the support substrate. The signal-fiber array including a plurality of optical fibers disposed in the plurality of V-grooves. The fiber optic assembly also including an adhesive disposed on the plurality of optical fibers and the support substrate. A first datum surface is disposed at a top surface of each of the plurality of optical fibers opposite the support surface.

In another example embodiment, a fiber optic assembly is provided including a support substrate having a substantially planar surface and a signal-fiber array supported on the planar surface of the support substrate. The signal-fiber array includes a plurality of optical fibers. The fiber optic assembly also includes an adhesive disposed on the plurality of optical fibers and the support substrate. Each of the optical fibers is spaced from adjacent optical fibers of the plurality of optical fibers at a precise pitch.

In a further embodiment, a fiber optic assembly is provided including a support substrate having a planar surface and a signal-fiber array supported on the planer surface of the support substrate. The signal-fiber array includes a plurality of optical fibers. The fiber optic assembly also includes an adhesive disposed on the plurality of optical fibers and the support substrate. Each of the optical fibers is spaced from adjacent optical fibers of the plurality of optical fibers and a datum surface is disposed on an outer surface of each edge optical fiber of the plurality of optical fibers.

Additional features and advantages will be set forth in the detailed description which follows, and in part will be apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description explain the principles and operation of the various embodiments.

BRIEF DESCRIPTION OF THE FIGURES

FIG. 11 illustrates a perspective view of a U-shaped release pad and sheet pushers according to an example embodiment.

FIGS. 12 and 13 illustrate perspective views of an assembly of a lidless FAU according to an example embodiment.

FIGS. 17A and 17B illustrate passive alignment of a lidless FAU having D-shaped optical fibers to a notch feature according to an example embodiment.

FIGS. 18A and 18B illustrate example passive alignments of a lidless FAU to a notch feature including spacer fibers according to an example embodiment.

FIG. 19 illustrates passive alignment of a lidless FAU to a notch feature having an underetch according to an example embodiment.

FIG. 20 illustrates passive alignment of a lidless FAU to a notch feature having a precision surface on sidewalls and a bottom surface according to an example embodiment.

FIGS. 28A and 28B illustrate installation of an overlap sheet on a lidless FAU according to an example embodiment.

FIGS. 36A and 36B illustrate a comparison of an FAU fabricated with ideal optical fibers and an FAU fabricated with optical fibers having cladding diameter and core eccentricity variation according to an example embodiment.

FIGS. 49-51 depict cross-sectional views of the process of FIGS. 47 and 48 according to an example embodiment.

FIGS. 52A-53B illustrate various adhesive profiles of a lidless FAU on a V-groove support substrate according to an example embodiment.

FIGS. 56 and 57 depict cross-sectional views of the process of FIGS. 54 and 55 according to an example embodiment.

FIG. 58 depicts an FAU including an optional lid disposed on an adhesive profile according to an example embodiment.

FIG. 59 illustrates a sanded V-groove adhesive profile according to an example embodiment.

FIG. 60 illustrates the FAU of FIG. 59 including an optional lid according to an example embodiment.

FIGS. 61-63 depict cross-sectional views of forming a lidless FAU using a reusable truncated V-groove alignment substrate according to an example embodiment.

DETAILED DESCRIPTION OF THE EMBODIMENTS

Figure 1:
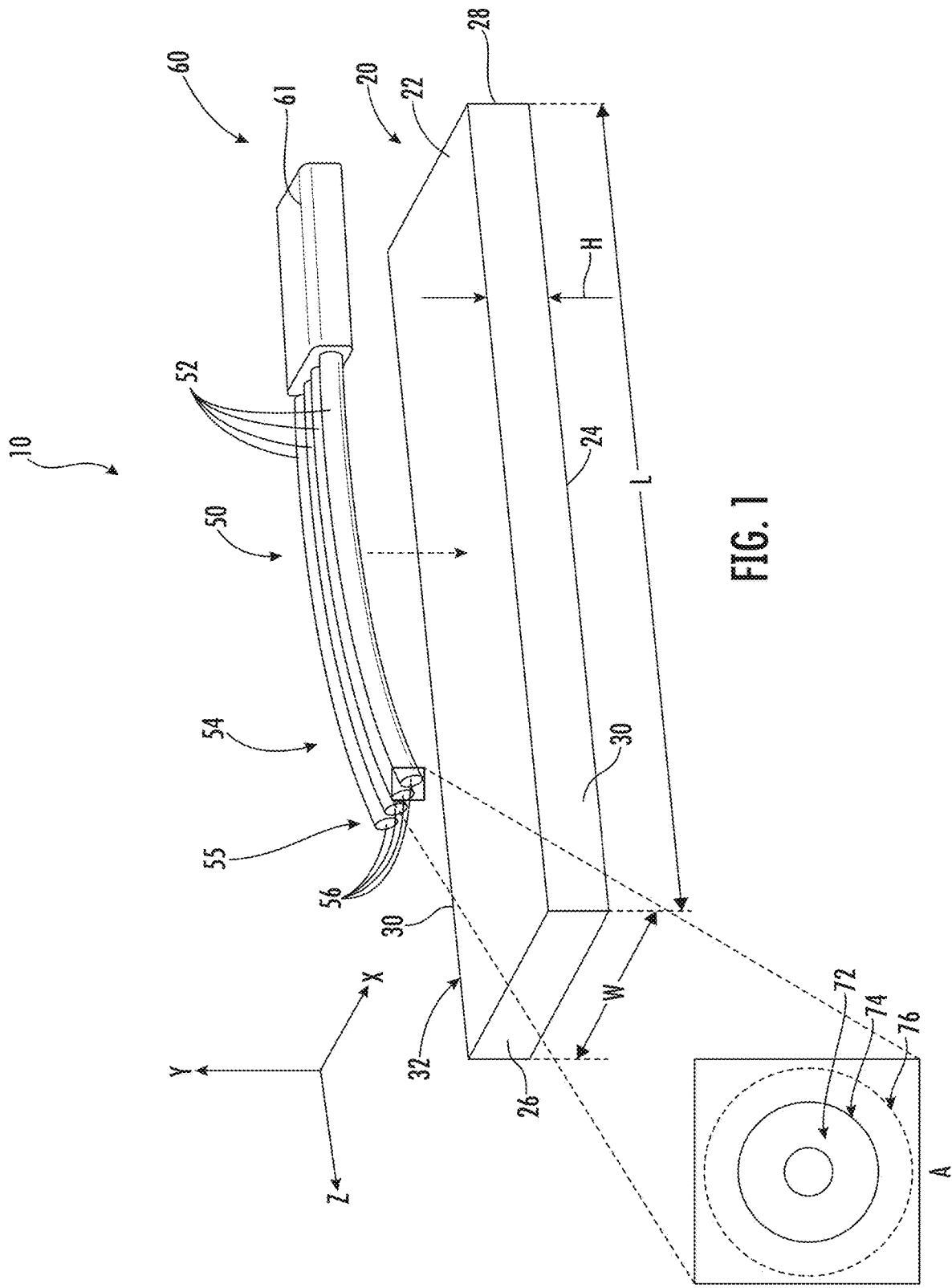
FIG. 1 illustrates a perspective view of an FAU in an initial stage of assembly according to an example embodiment.

Reference will now be made in detail to certain embodiments, examples of which are illustrated in the accompanying drawings, in which some, but not all features are shown. Indeed, embodiments disclosed herein may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

The claims set forth below are incorporated by reference into this Detailed Description section.

Terms like front, back, top, bottom, side, etc. are relative terms used for convenience and ease of explanation and are not intended to be limiting.

A brief explanation of selected terminology used herein is now presented.

The abbreviation μm stands for "micron" or "micrometer," while the abbreviation nm stands for nanometer.

As used herein, the term "datum surface" means a fixed reference point or surface free of debris or other foreign materials, such as to enable a direct contact between a first structure and a second structure. Additionally, as used herein, the term "datum contact" shall mean the direct contact of a datum surface with another structure.

As used herein, the term "precision surface" means a surface that is substantially planner having deviations from a flat plane of less than 0.5 μm over the surface.

As used herein, the term "precise pitch" of the fiber cores means a pitch sufficient to guarantee low loss coupling between FAU waveguides and waveguides of another component. For example, for single mode fiber coupling a precise pitch would be <1 μm deviation in X and Y from an ideal grid (laid out on 127 μm or 250 μm pitch). Preferably the deviation from the ideal grid would be <0.7 μm or <0.5 μm.

Cartesian coordinates are shown in some of the Figures for the sake of reference and are not intended to be limiting as to direction or orientation. Likewise, use of relative terms such as "top," and "bottom" and "side" and "edge" and the like are used herein for ease of description and explanation and are not intended to be limiting as to a direction or orientation.

As used herein, the term "interdigitated", with respect to optical fibers, means that a first group of optical fibers and a second group of optical fibers (e.g., groups A and B) are arranged in an alternating pattern (e.g., A-B-A-B-A-B . . . ).

References to "fiber core position" or "core position" refer to the position of the center of a core of an optical fiber.

The present disclosure concerns fiber array units for optical interconnections. These fiber array units may include a plurality of optical fibers disposed on a support substrate. The plurality of optical fibers may include datum contacts between adjacent optical fibers and between each of the optical fibers and the support substrate. Additionally, each of the optical fibers may include an exposed datum surface on a top surface opposite the support substrate.

Lidless Fiber Array Unit (FAU)

FIG. 1 is a perspective view of an example fiber optic assembly, or fiber array unit (FAU) 10, at an initial stage of formation. The FAU 10 includes a planar support substrate 20 having a top surface 22, a bottom surface 24, a front end 26, a back end 28 and opposite edges 30. The support substrate has dimensions width (W), length (L), and height (H). The front end 26, the back end 28 and the opposite edges 30 define a perimeter 32 of the support substrate 20. Lidless means a lid is not necessary, but is optional for the FAUs. A clear plastic lid or other suitable material, may be used for observation of the optical fibers or as a temporary cover for protective purposes.

The support substrate 20 may be fabricated from a material that provides flat surface, such as polished glass, ceramic, or metal materials. In an example embodiment, glass is a preferred material for the support substrate 20 because glass may be formulated with a coefficient of thermal expansion (CTE) that is a close match to that of silicon materials commonly used in active photonic components. While other materials, such as silicon, may also be used, glass may be particularly advantageous because glass is transparent to visible light, simplifying alignment of optical fibers 52 on the support substrate 20 and allowing transmission of UV light, enabling UV curing of a UV-curable adhesive (discussed below in reference to FIGS. 2-7B). In some example embodiments, a glass support substrate 20 may be fabricated using a process that ensures a high degree of flatness with minimal surface roughness, e.g., Ra<0.1 micron, where Ra is the arithmetic average of the absolute values of the profile height deviations from a mean line, recorded within the evaluation length. Said differently, Ra is the average of a set of individual measurements of the peaks and valleys in a surface taken over a given length. One suitable method for fabricating support substrate 20 is traditional glass grinding and polishing processes. Another suitable fabrication method uses a fusion draw process used for liquid crystal display (LCD) glass fabrication. The fusion draw process may also produce glass sheets with parallel top and bottom surfaces and precise thickness control. A further suitable fabrication method may be float glass forming. Support substrate 20 may be monolithic or made in sections, and the outer surface may have surface features such as smoothness, porosity, roughness, striations, recesses, or grooves, and combinations thereof, to enhance bonding or fiber alignment.

The support substrate 20 may be small and thin (e.g., W=3 mm, L=10 mm and H=1 mm) in some embodiments to facilitate fabrication of compact fiber array assemblies and interconnect devices such as connectors. In an example, the height (H) of the support substrate 20 may be the range from 0.7 mm to 1.0 mm, but this height (H) may be smaller or greater depending on the particular application requirements. For example, it may advantageous for the support substrate 20 to have a height (H) that provides for sufficiently rigid support for the fiber arrays introduced and discussed herein below. In some cases, glass support substrates 20 with a height (H) less than about 0.4 mm may tend to deflect during assembly and use, resulting in unacceptable out-of-plane fiber alignment, known as "potato-chipping." Conversely, since sheet stiffness increases with the cube of the sheet thickness, relatively large fiber arrays (in terms of number of fibers) may be accommodated through only modest increases in the height (H) of the support substrate 20.

The support substrate 20 may be cut to size from a larger sheet, for example, using a computer-controlled dicing saw with a diamond blade or by laser cutting. A single sawing or cutting operation carried out on a wafer or glass sheet sample may yield hundreds of support substrates 20. After sawing, the support substrates 20 may be bevel edge ground or lightly sanded around their edges to round off sharp corners that might otherwise damage bare optical fibers during the assembly process. The support substrates 20 may then be cleaned manually by wiping the surfaces with an ethanol-soaked wipe. The support substrates 20 may also be cleaned in an oxygen plasma furnace to completely remove all organic materials from the surfaces and to prepare the top surface for subsequent bonding using an adhesive, such as an organic adhesive.

With continuing reference to FIG. 1, the FAU 10 also includes a signal-fiber array 50 having signal optical fibers, or "optical fibers" 52. The optical fibers 52 have respective front-end sections 54 that include respective front ends 55 that have respective end faces 56. The signal-fiber array is referred to as a "signal-fiber arrays" because the corresponding optical fibers 52 are configured to carry one or more optical signals.

As shown in detail A, each optical fiber 52 comprises a core 72, a cladding 74 surrounding the core 72, and a protective coating 76 surrounding the cladding 74. In an example, the protective coating 76 is stripped way to define "bare glass" optical fiber sections (where the former protective coating 76 outer surface is indicated by the dashed lines). Thus, in an example, the front-end sections 54 of the optical fibers 52 are formed as bare-glass front-end sections.

In an example, the signal-fiber array 50 is respectively supported by a multifiber cable 60 that has a cable jacket 61. A matrix material (not shown) may be applied to the signal fiber array 50 that encapsulates optical fibers 52 or may be applied intermittently, e.g. spider web ribbons. In some example embodiments, the In the example of FIG. 1, front-end portions of the cable jacket 61 is stripped away to access the optical fibers 52. In addition, the protective coatings 76 are also removed (stripped) from the front-end sections 54 of the optical fibers 52 to form the bare-glass front-end sections 54. The stripping processes for removing the cable jacket 61 may be carried out using mechanical strippers, which heat and soften the cable jacket prior to removal using a pair of serrated blades. The matrix material and/or the protective coating 76 may be removed using a similar mechanical process or a laser-based stripping process. In an example, the multifiber cable 60 may comprise a ribbon cable.

After the cable jackets 61 and the protective coating are stripped away, the exposed portions of the signal-fiber array 50 may be cleaned. In an example, this is accomplished by sandwiching the optical fibers 52 between a folded lint-free wipe that has been soaked in ethanol, and then drawing the wipe toward the front ends 55 of the optical fibers. The signal-fiber array 50 may also be cleaned using an oxygen plasma.

When the front-end portions of the cable jacket 61 are removed from the multifiber cable 60, the optical fibers 52 tend to curl in one direction, as illustrated in FIG. 1 for the multifiber cable 60 and the signal-fiber array 50. This curl arises from fiber ribbon manufacture. The ribbonized multifiber cable 60 may be wound around a core or drum, and, therefore, curl in the same direction.

Therefore, it may be advantageous, when forming the FAU 10, that the signal-fiber array 50 is arranged such that the curl of the optical fibers 52 is directed downward, i.e., towards the top surface 22 of the support substrate 20, as shown in FIG. 1. This ensures that when the signal-fiber array 50 is brought into proximity to the support substrate 20, the front ends 55 of the optical fibers 52 contact the top surface 22 of the support substrate 20.

Figure 2:
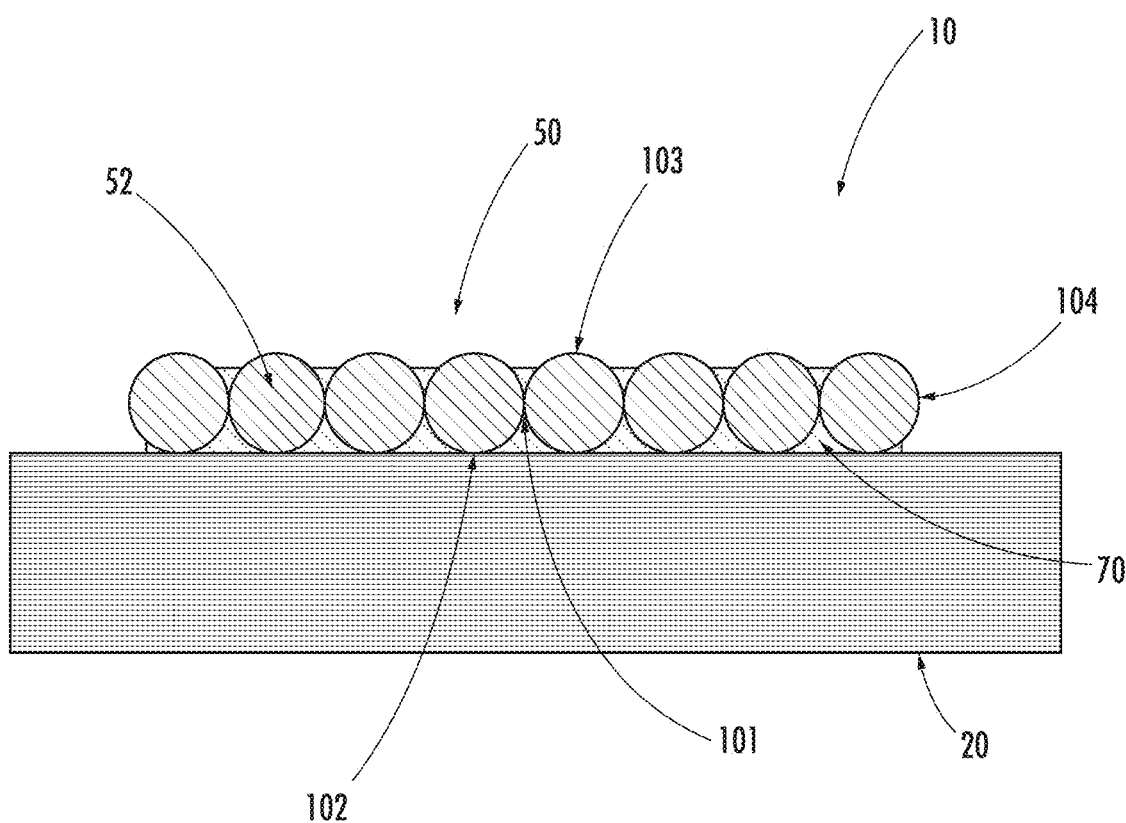
FIG. 2 illustrates a cross-sectional view of an example lidless FAU after an assembly process according to an example embodiment.

FIG. 2 illustrates a cross-sectional view of an assembled FAU 10 according to an example embodiment. The FAU 10 may include a signal-fiber array 50 including a plurality of optical fibers 52. The plurality of optical fibers 52 may be supported by a support substrate 20. An adhesive 70 may be provided in voids between adjacent optical fibers 52 and between the optical fibers 52 and the support substrate 20. The adhesive 70 may be a UV-curable adhesive or other suitable adhesive. The adhesive 70 may bond the optical fibers 52 to each other and/or to the support substrate 20. In some example embodiments, other bonding technologies may be employed, including but not limited to laser bonding, liquid glass (sodium silicate) bonding, or anodic bonding (for glass fiber to silicon substrate).

In an example embodiment, the signal-fiber array 50 may be formed from one or more multifiber cables 60. In embodiments in which multiple multifiber cables 60 are employed, the optical fibers 52 of each of the multifiber cables 60 may be interdigitated. The bare-glass front-end sections 54 of the optical fibers 52 may be in direct contact with the support substrate 20 defining a first datum contact 101 between each of the plurality of optical fibers 52 and the support substrate 20. Additionally, each of the optical fibers 52 may be in direct contact with at least one adjacent optical fiber 52 defining a second datum contact 102 therebetween.

In the embodiment shown, the FAU 10 does not require a lid, such as a glass lid or other substrate, disposed on the top of the optical fibers 52 opposite the support substrate 20. This enables each of the plurality of optical fibers 52 to define a first exposed datum surface 103 at a top of the optical fibers 52 opposite the support substrate 20. The absence of the lid, the FAU 10 may have a shallower profile and thereby enable an increased density of optical connections. Additionally, the datum contacts 102 between each of the plurality of optical fibers 52 may enable highly accurate alignment of the FAU 10 with a waveguide substrate or other optical components, such as mating with a precision surface disposed on the waveguide substrate.

In some example embodiments, the FAU 10 may include a second exposed datum surface 104 disposed on each edge optical fiber 52, e.g. optical fibers 52 that have only one adjacent optical fiber 52. The second exposed datum surface 104 may enable lateral alignment of the FAU 10 with the waveguide substrate, such as mating with a precision surface disposed on the waveguide substrate.

The adhesive 70 bonding the optical fibers 52 to the support substrate 20 and to adjacent optical fibers 52 may reside below a plane defined by the first exposed datum surface 103 and/or the second exposed datum surfaces 104, such as to not interfere with any mating of the first exposed datum surface 103 or the second exposed datum surface 104. The adhesive hardness disclosed herein, for example, has a Shore D of about 65-80 as determined by ASTM D2240-00 and a bonding strength of about 2,000-3600 psi determined by ASTM D3165.

Figure 3:
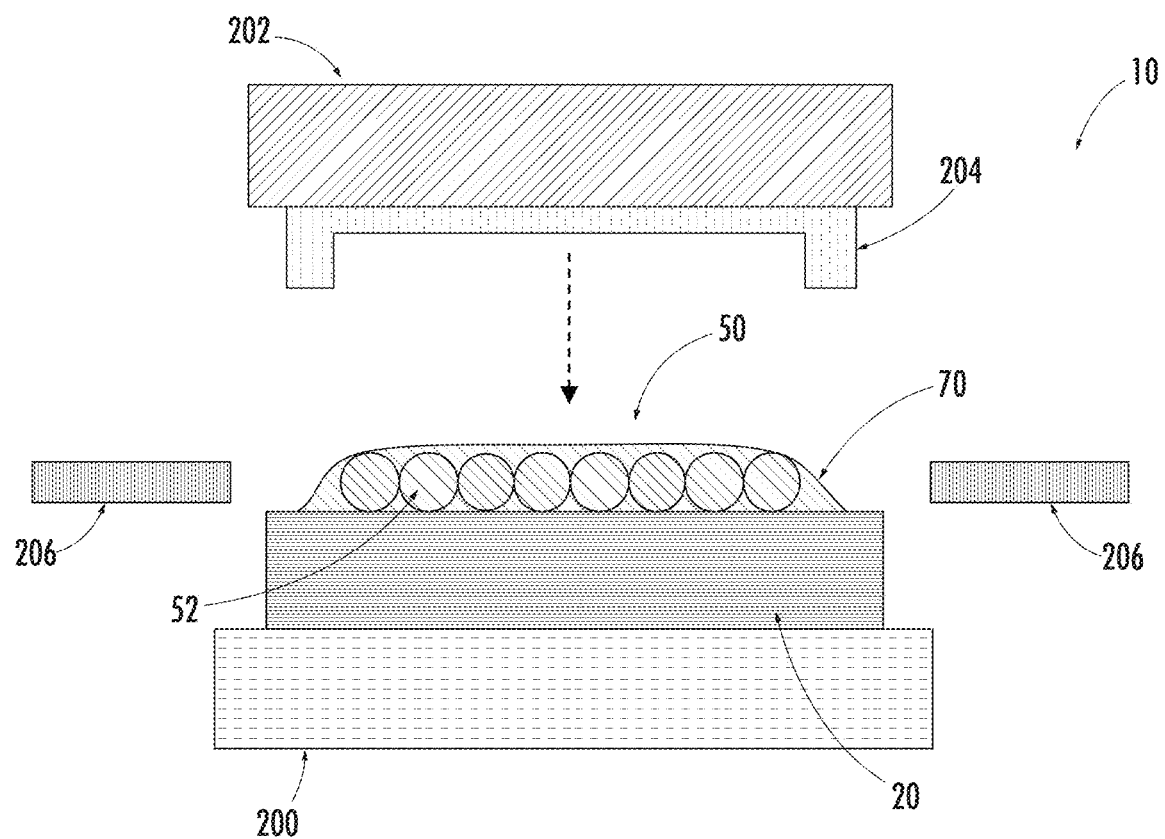
FIGS. 3-7B illustrate cross-sectional views of the lidless FAU of FIG. 2 during each phase of the assembly process using a U-shaped release pad according to an example embodiment.

FIGS. 3-7B illustrate an example method of fabricating the FAU 10 depicted in FIG. 1. As depicted in FIG. 3, bare-glass front-end sections 54 of the optical fibers 52 may be placed in direct contact with the support substrate 20. The support substrate 20 may be positioned on bottom plate 200, such as a glass bottom plate or other suitable material. It is advantageous for the bottom plate 200 to be transparent to light, such that transmission of UV light may enable UV curing of a UV-curable adhesive 70. A UV-curable adhesive 70 may be selected that is stable through a solder reflow process associated with the Photonic Integrated Chip (PIC). The adhesive 70 may thereby stabilize a mechanical interface between adjacent optical fibers 52 of the FAU 10, between the optical fibers 52 and the support substrate 20, and in subsequent assembly steps, between the FAU 10 and a PIC through solder reflow conditions. Additionally or alternatively, the FAU 10 may be passively aligned with the PIC substrate after a solder reflow process. Although, UV adhesive is discussed herein, other adhesives may be used, such as thermal set, epoxy, or the like.

The adhesive 70 may be applied to the bare-glass front-end sections 54 of the optical fibers 52 and/or the support substrate, such that the adhesive flows around to contact all sides of each optical fiber 52 in the signal-fiber array 50. During application of the adhesive 70, a top plate 202 and an associated elastic release pad 204 may be in a retracted position. Similarly, pusher sheets 206 may also be retracted. The top plate 202 may be formed of metal, glass, or other suitable material to transfer pressure from an actuator to the release pad 204, without deformation, to provide an even distribution of pressure across the release pad 204. The release pad 204 may be formed of a deformable non-stick material, such as silicone. The thickness of the release pad 204 may be selected to allow for deformation of the release pad 204 under application of force applied by the top plate 202 during an FAU assembly process. The deformation of the release pad 204 helps control and limit the flow of the adhesive 70 around the squeezed signal-fiber array 50 during assembly. Adhesive 70 may be excluded from regions between and on top of individual optical fibers 52 of the signal-fiber array 50 to allow the exterior exposed surfaces of the optical fibers 52 to serve as datum surfaces, as discussed above. The release pad 204 may not need to have a precise thickness because the release pad 204 is compressed during the assembly process. The release pad 204 may also be covered with a conformal non-stick release sheet, such as polytetrafluoroethylene (PTFE), or a non-stick coating, such as a fluorosilane coating.

In some example embodiments, the release pad 204 may be substantially planar, configured to exclude adhesive from the top surfaces of the signal-fiber array 50. In another example embodiment, the release pad 204 may have a generally U-shape, having a center channel, or cavity, that is roughly the width of the target signal-fiber array 50 and portions that extend downward on either side of the signal-fiber array 50, such as depicted in FIG. 3. In an example embodiment, the internal cavity width of the U-shaped release pad 204 may be selected to be slightly wider than the signal-fiber array 50, such as 25-50 µm wider, so that it may slip over the signal-fiber array 50 during assembly without interference. The side portions of the release pad 204 may be compressed by the pusher sheets 206 during the FAU assembly process. The side portions of the release pad 204 may deform around the edge optical fibers 52 to exclude or substantially avoid adhesive on the exposed edge surfaces of the edge optical fibers 52. The exposed exterior edge surfaces of the optical fibers 52 may serve as datum surfaces after completion of the assembly process.

The release pad 204, may be held in contact with the top plate 202 using, for example, vacuum forces, a gripping fixture that holds the release pad, or a temporary adhesive. The release pad 204 may be at least 10-20 µm thick and preferably 30-50 µm thick in some configurations. In other configurations, the release pad 204 may be formed thicker, such as 100-500 µm thick.

The pusher sheet 206 may a substantially planar material formed from glass, metal, plastic, or the like. The pusher sheet 206 may have a thickness of about the diameter of the optical fibers. In an example embodiment, the pusher sheet 206 may have a thickness up to the uncompressed thickness of the release pad 204. In some example embodiments, a fiber array similar to the signal-fiber array 50 may be used as the pusher sheet 206. The pusher sheet 206 may have a rigidity and strength sufficient to allow for numerous repetitions of the FAU assembly process with little or no damage or deformation.

Figure 4:
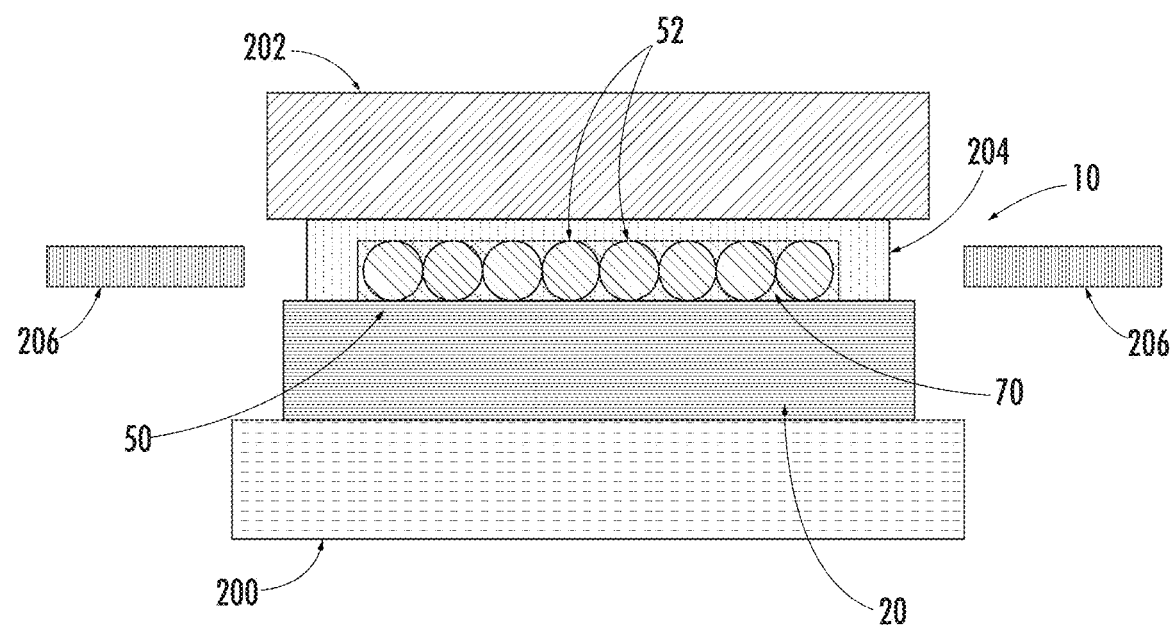

Turning to FIG. 4, the top plate 202 and associated release pad 204 may be moved down toward the bottom plate 200. The release pad 204 may be in contact with the signal-fiber array 50 on a top surface and/or in contact with the support substrate 20 on either side of the signal-fiber array 50. Excess adhesive 70 may be displaced away from the signal-fiber array 50 and/or the surface of the support substrate 20 by the release pad 204.

Figure 5:
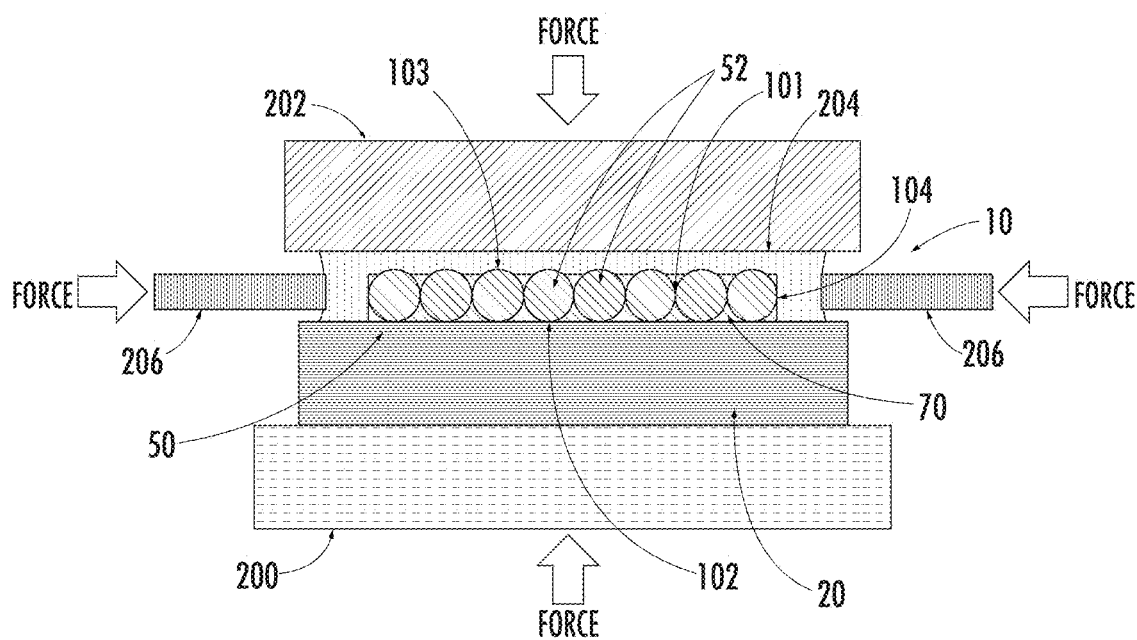

FIG. 5 depicts force being applied on all four sides of the signal-fiber array 50 to force adjacent optical fibers 52 into contact with each other, thereby creating the first datum contacts 101. The vertical squeeze force may ensure that each of the optical fibers 52 fibers in the signal-fiber array 50 are in contact with the top surface of the support substrate 20, thus generating the second datum contacts 102. As the signal-fiber array 50 is pushed into the elastic release pad 204, adhesive 70 is excluded from regions between the optical fibers 52 on the top half of the signal-fiber array 50. As the pusher sheets 206 push on the side portions of the U-shaped release pad 204, the side portions of the U-shaped release pad 204 come into contact with the two outermost optical fibers 52, e.g. edge optical fibers of the signal-fiber array 50, deforming around the edge optical fibers 52 and excluding or substantially avoiding adhesive 70 on the outside edges of the edge optical fibers 52.

Figure 6:
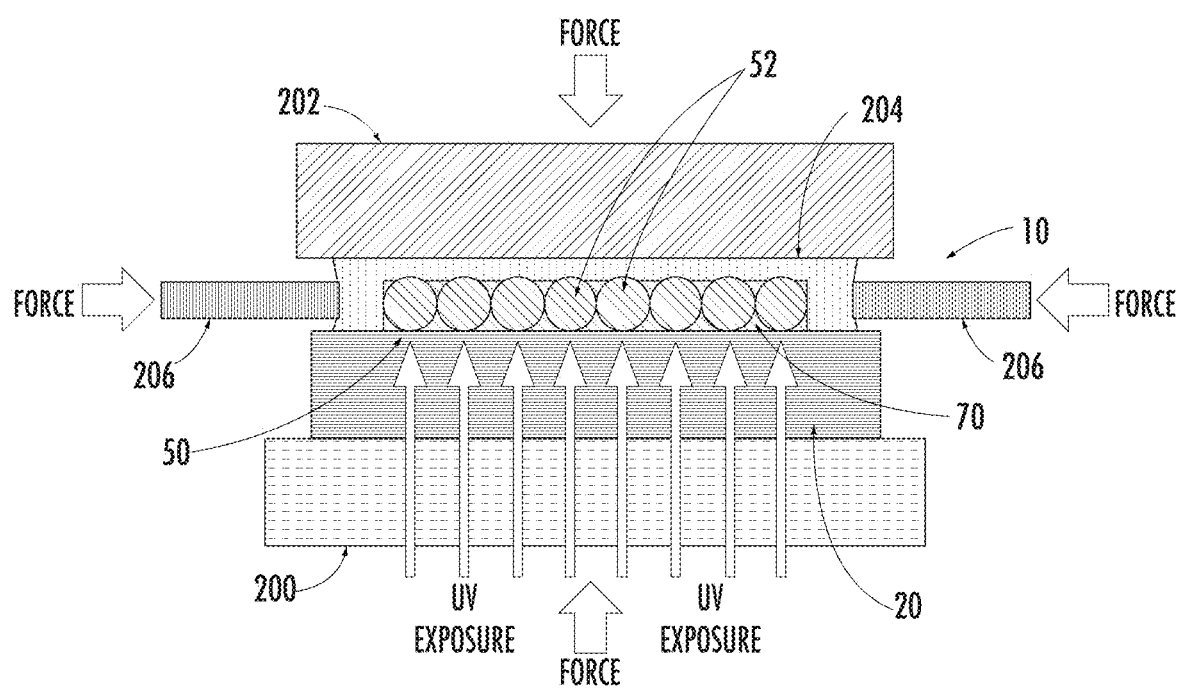
Figure 7A:
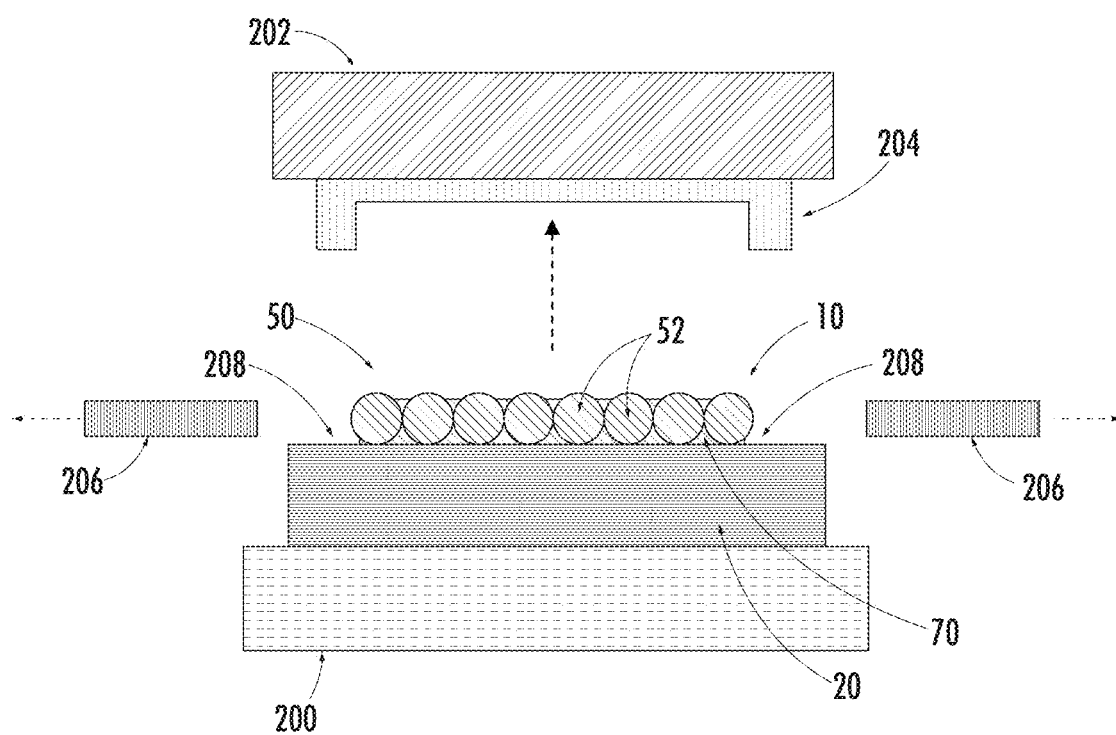
Figure 7B:
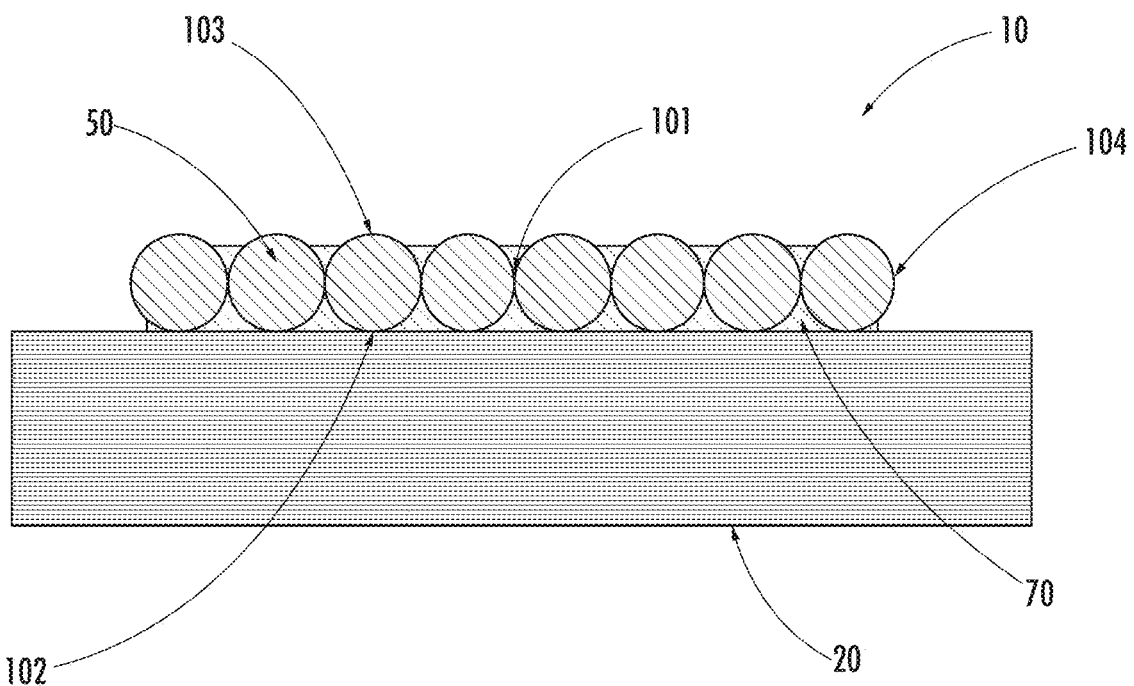

In FIG. 6, a UV light, or beam, is transmitted through the bottom plate 200 and support substrate 20. The UV light causes the UV curing of the UV-curable adhesive 70. The adhesive 70 may be UV cured while maintaining the top, bottom, left, and right squeeze forces. After the adhesive 70 cures, the pusher sheets 206 and the U-shaped release pad 204 may be removed, as depicted in FIG. 7A. The FAU 10 may then be removed from the glass bottom plate 200, as shown in FIG. 7B. Using the U-shaped release pad 204 causes the top surface of the plurality of optical fibers 52 to include the first exposed datum surface(s) 103. Further, use of the side portions of the U-shaped release pad 204 may cause the outer edges of the edge optical fibers 52 to include the second exposed datum surface(s) 104. The exposed datum surfaces 103, 104 of the FAU 10 may be free of adhesive, allowing these regions to be used as precision alignment datum surfaces. In some embodiments, deformation of the release pad 204 about a portion of the optical fibers during the assembly process causes the adhesive to be cured below a plane defined by the exposed datum surfaces 103, 104. In an example embodiment, the side portions of the release pad 204 may also exclude the adhesive from the support substrate 20 in an area adjacent to the edge optical fibers, resulting in an adhesive free surface 208. Subsequent dicing and polishing operations may be carried out, in some embodiments, to prepare the end faces 56 of the optical fibers 52 for low loss optical coupling. It is also contemplated that the assembly process may also be carried out in a configuration that is inverted from the approach shown in FIGS. 3-7B, where the release pad 204 is on the bottom, the optical fibers 52 are in the middle, and the support substrate 20 is on top.

Figure 8:
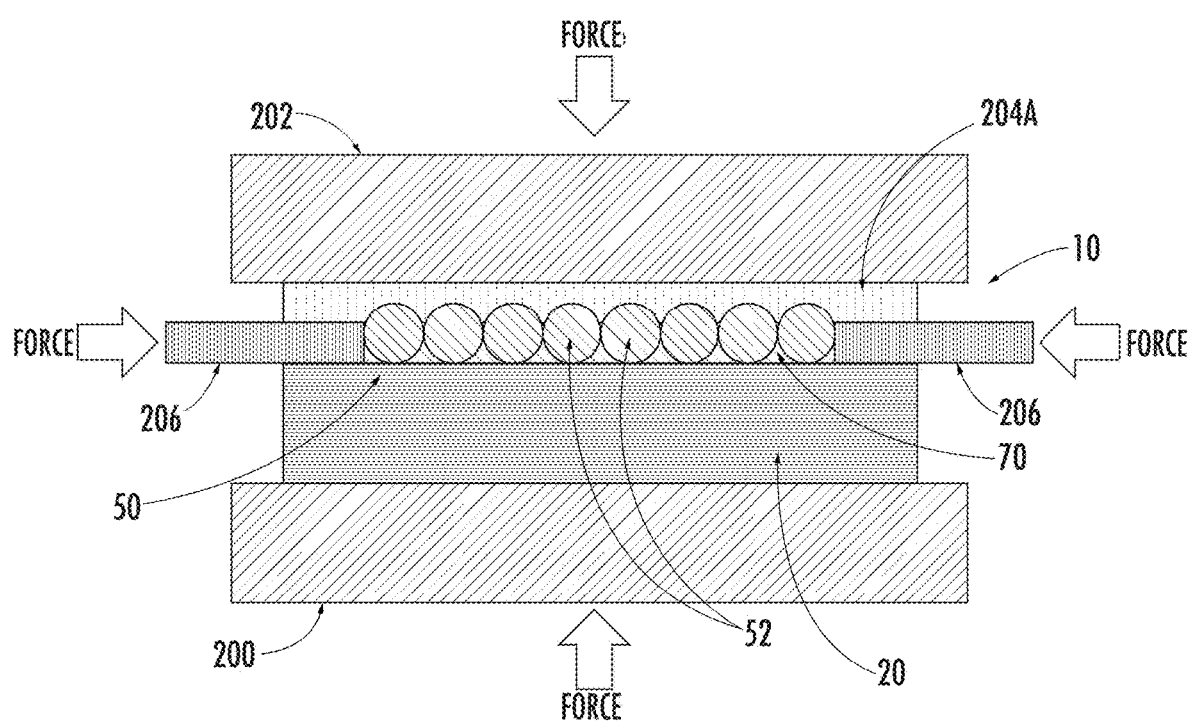
FIG. 8 illustrates a cross-sectional view of an assembly process of a lidless FAU using a planar release pad according to an example embodiment.

As discussed above, in some example embodiments, the release pad 204 may be generally planar. FIG. 8 depicts an FAU 10 in which the signal-fiber array 50 is sandwiched between the top plate 202 and the bottom plate 200, using a planar release pad 204A. The release pad, or in this case the planar release pad 204A, may be held in contact with the top plate 202 using, for example, vacuum forces, a gripping fixture that holds the release pad, or a temporary adhesive. The planar release pad 204A may be at least 10-20 µm thick and preferably 30-50 µm thick in some configurations. In other configurations, the planar release pad 204A may be formed thicker, such as 100-500 µm thick.

In this embodiment, the pusher sheets 206 apply force directly to the edge optical fibers 52 of the signal-fiber array 50. As such, the pusher sheets 206 may be fabricated from a non-stick material (e.g., PTFE). In an example embodiment, the pusher sheets 206 may be formed with an elastic material at the tips of each of the pusher sheets 206 to enhance adhesive removal.

Similar to the embodiment utilizing a U-shaped release pad 204, discussed above and depicted in FIG. 7A, using the planar release pad 204A may cause the top surface of the plurality of optical fibers 52 to include the first exposed datum surface(s) 103. Further, the pusher sheets 206 may cause the outer edges of the edge fibers to include the second exposed datum surface(s) 104. The exposed datum surfaces 103, 104 of the FAU 10 may be free of adhesive, allowing these regions to be used as datum surfaces for subsequent passive or active alignment to PICs.

Figure 9A:
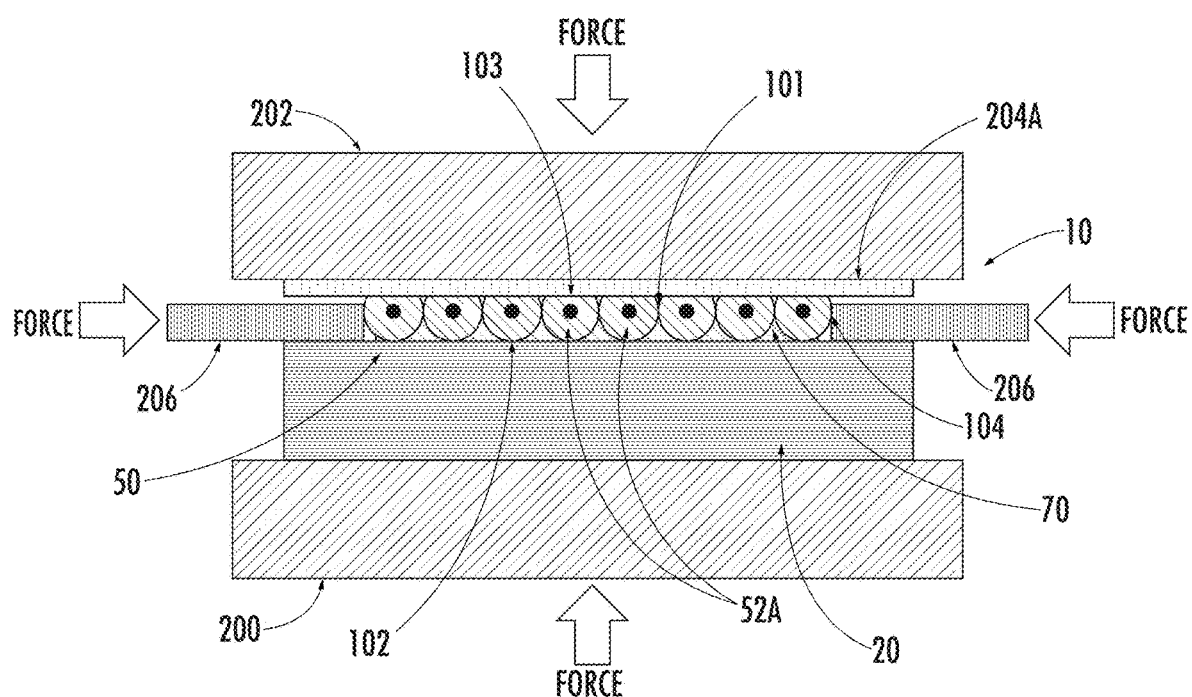
FIGS. 9A and 9B illustrate cross-sectional views of assembly of a lidless FAU including D-shaped optical fibers according to an example embodiment.
Figure 9B:
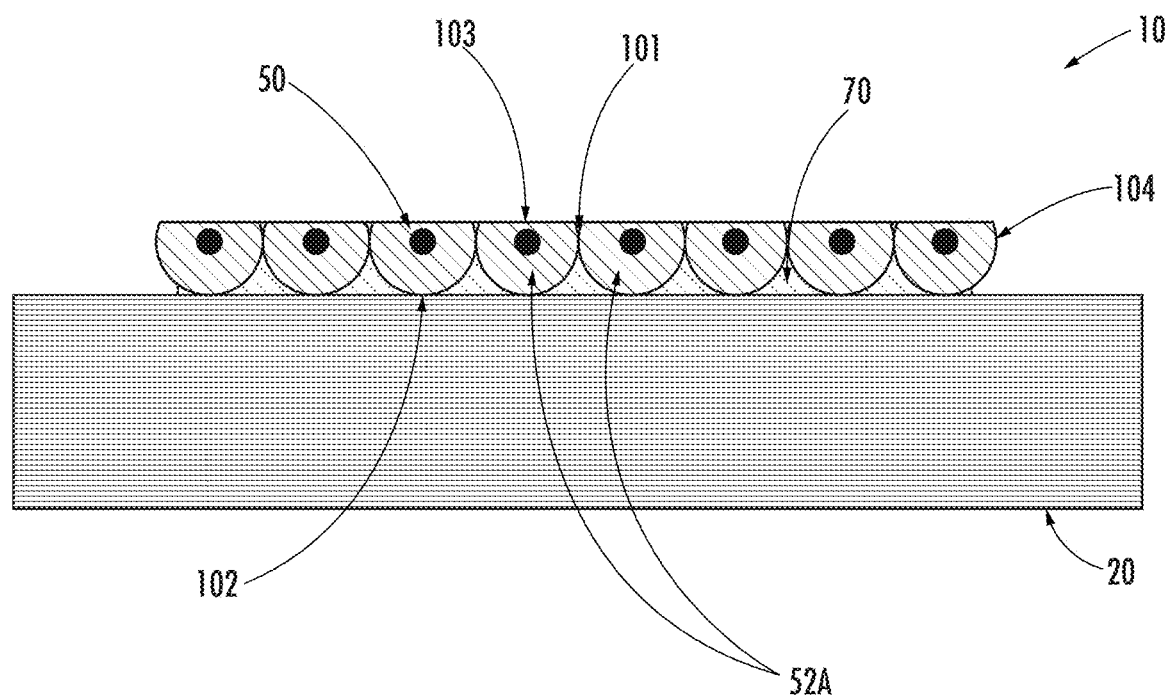

Turning to FIGS. 9A and 9B, the lidless FAU assembly process may be utilized with D-shaped optical fibers 52A. In this configuration, the D-shaped optical fibers 52A are arranged with a flat portion oriented upward, toward the top plate 202 and a round portion oriented toward the support substrate 20. A thin planar release pad 204A may be used to press the D-shaped optical fiber into contact with the support substrate, such as to generate the second datum contacts 102. In an example embodiment, the surface of the support substrate 20 may be a precision surface. Pusher sheets 206 may provide lateral force to squeeze the D-shaped optical fibers 52A together from the sides, so that the D-shaped optical fibers 52A come into contact with each other to generate the first datum contacts 101. Adhesive 70 may fill the voids between the D-shaped optical fibers 52A and the support substrate 20. After UV-curing of the adhesive 70, the pusher sheets 206 and planar release pad 204A may be removed (shown in FIG. 9B). The FAU 10 including D-shaped optical fibers 52A may include the first exposed datum surfaces 103 on the top surface, being the flat portions of the D-shaped optical fibers 52A, and the second exposed datum surfaces at the edge D-shaped optical fibers 52A. for subsequent passive or active alignment to PICs.

Figure 10A:
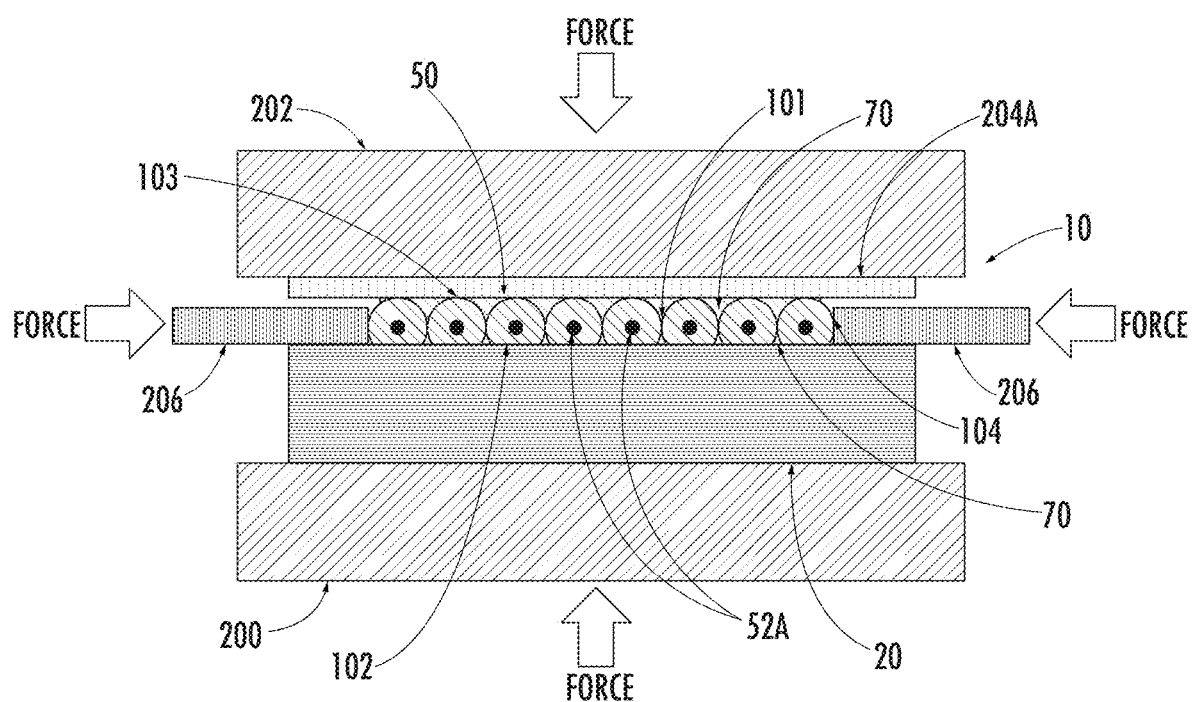
FIGS. 10A and 10B illustrate cross-sectional views of assembly of a lidless FAU including D-shaped optical fibers according to an example embodiment.
Figure 10B:
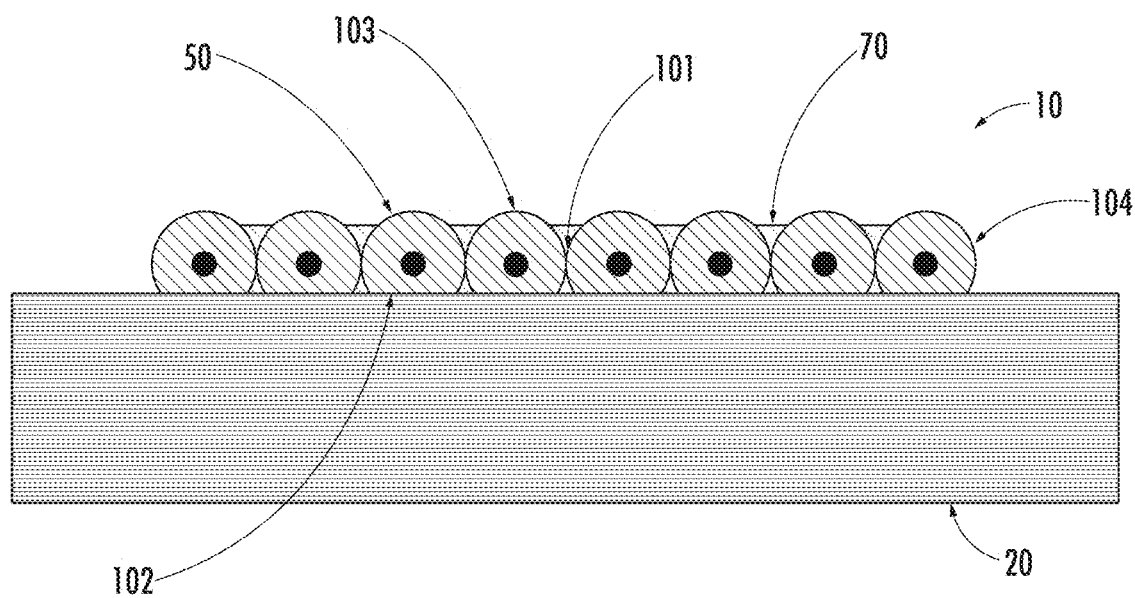

Using a similar assembly approach, D-shaped optical fibers 52A may be positioned on the support substrate 20 with the flat portions oriented downward toward the support substrate 20, as shown in FIGS. 10A and 10B. A thin planar release pad 204A may be used to press the D-shaped optical fibers 52A into contact with the support substrate 20 to generate the second datum contacts 102. In an example embodiment, the surface of the support substrate 20 may be a precision surface. Pusher sheets 206 may provide lateral force to squeeze the D-shaped optical fibers 52A together from the sides, so that the D-shaped optical fibers 52A come into contact with each other to generate the first datum contacts 101. Adhesive 70 may fill the voids between the D-shaped optical fibers 52A and the support substrate 20. After UV-curing of the adhesive 70, the pusher sheets 206 and planar release pad 204A may be removed (shown in FIG. 10B). The FAU 10 including D-shaped optical fibers 52A may include the first exposed datum surfaces 103 on the top surface, being the flat portions of the D-shaped optical fibers 52A, and the second exposed datum surfaces at the edge D-shaped optical fibers 52A for subsequent passive or active alignment to PICs.

FIG. 11 illustrates a perspective view of an example U-shaped release pad 204 according to an example embodiment. The release pad 204 may include a straight channel region (SR) formed to be slightly larger than the FAU 10, such that the optical fibers 52 may be inserted without significant interference. In an example embodiment, the straight channel region SR may be approximately 1-2 mm. The release pad 204 may also include a tapered channel region (TR), such as a 20 degree taper. The tapered channel region TR may allow for a gradual change in spacing of the optical fibers 52 from the multifiber cable 60, which includes the protective coating 76 to the FAU 10, where the optical fibers 52 are in direct contact with each other and the protective coating 76 is removed. The pusher sheets 206 may be positioned such that when actuated, the pusher sheets 206 push on the straight channel region SR of the release pad 204. A vacuum tip 210 (FIG. 12) may be utilized to hold the support substrate 20 over the release pad 204. Similar to the pusher sheets 206, the vacuum tip 210 is positioned over the straight channel region SR of the release pad 204 to allow the force to be concentrated over the straight channel region SR where the optical fibers are squeezed together during the FAU assembly.

Turning to FIG. 12, the support substrate 20 is being held over the release pad 204 by the vacuum tip 210. A signal-fiber array 50 of a ribbon cable, e.g. multifiber cable 60, is stripped of the protective coating 76 to expose the bare-glass front-end sections 54, and UV-curable adhesive 70, such as Epotek 353HD, is applied over the bare-glass front-end sections 54. Adhesive 70 may be applied by positioning the signal-fiber array 50 between lint-free pads that have been soaked with adhesive 70. The adhesive soaked pads may be lightly compressed over the top and bottom of the bare-glass front-end section 54, so that the adhesive 70 is transferred to the bare-glass front-end sections 54. As the signal-fiber array 50 is removed from the adhesive soaked pads, a thin layer of adhesive 70 is applied over the bare-glass front-end sections 54 of the signal-fiber array 50.

After application of the adhesive 70 on the bare-glass front-end sections 54 of the signal-fiber array 50, the signal-fiber array 50 is lowered, such that it contacts the release pad 204 in the tapered channel region TR. The support substrate 20 may then be lowered onto the release pad 204, such that the signal-fiber array is constrained in the tapered channel region TR of the release pad 204 by the support substrate 20, as shown in FIG. 13 (vacuum tip 210 is not shown for clarity of the depicted details). The signal-fiber array 50 is then slowly moved down the tapered channel region TR to the straight channel region SR (located under the support substrate 20 and vacuum tip 210), such that the ends of the optical fibers 52 become squeezed together.

The signal-fiber array 50 may be pushed further down the channel of the release pad 204 until the signal-fiber array 50 emerges from the far end of the channel of release pad 204. The signal-fiber array 50 may be positioned, such that the end faces 56 of the optical fibers 52 extend slightly beyond the edge of the support substrate 20 (e.g., 100-200 µm). In some example embodiments, the signal-fiber array 50 may be retracted, such that the end faces 56 of the optical fibers 52 are flush with an edge of the support substrate 20, or even slightly inside the edge of the support substrate 20. Having the end faces 56 of the optical fibers 52 flush with, or slightly inside, the edge of the support substrate 20 may help with polishing, preventing the end faces 56 of the optical fibers 52 from breaking off during initial polishing.

In the next step the signal-fiber array 50 may be squeezed together. Downward force is applied to the support substrate 20 to compress the release pad 204 and force the signal-fiber array 50 into contact with the surface of the support substrate 20. Simultaneously, the pusher sheets 206 may be moved inward towards the release pad 204, such that they provide a squeezing force that forces adjacent optical fibers 52 of the signal-fiber array 50 into contact with each other. The forces applied to the release pad 204 may cause the release pad 204 to conform to the shape of the signal-fiber array 50, both on the exposed surface of the signal-fiber array 50 and on each of the edges, or sides. While the squeezing forces are still being applied, the adhesive 70 may be illuminated by UV light through the support substrate 20. The UV light may pass through the glass, or other transparent, support substrate causing the adhesive 70 to cure and bond the optical fibers 52 of the signal-fiber array 50 to each other and the support substrate 20.

After the adhesive 70 has been cured the pusher sheets 206 may be retracted to terminate the horizontal, or lateral, squeezing force on the release pad 204. The vacuum tip 210 may also be removed from the support substrate 20 to reveal the signal-fiber array 50 in the straight channel region SR of the release pad 204. In some example embodiments, the vacuum tip 210 remains attached to the support substrate 20 after curing of the adhesive 70. This may allow the support substrate 20 and the attached signal-fiber array 50, e.g. the lidless FAU 10, to be removed from the release pad 204. Since the adhesive 70 does not stick to the release pad 204, the FAU 10 may be easily removed from the release pad 204.

Figure 14A:
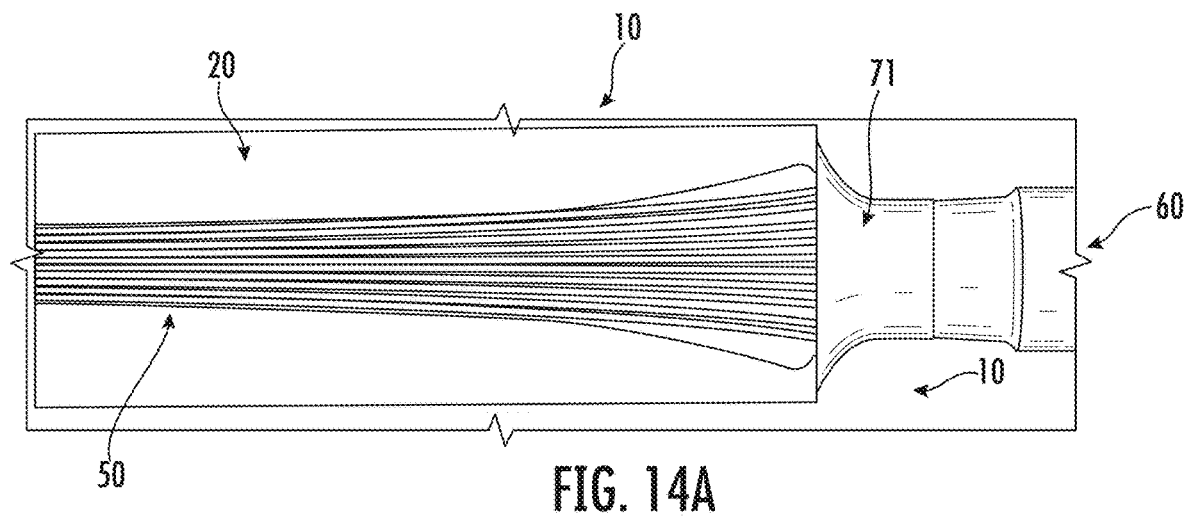
FIGS. 14A and 14B illustrate a top down and side view, respectively of a lidless FAU including an adhesive strain relief according to an example embodiment.
Figure 14B:
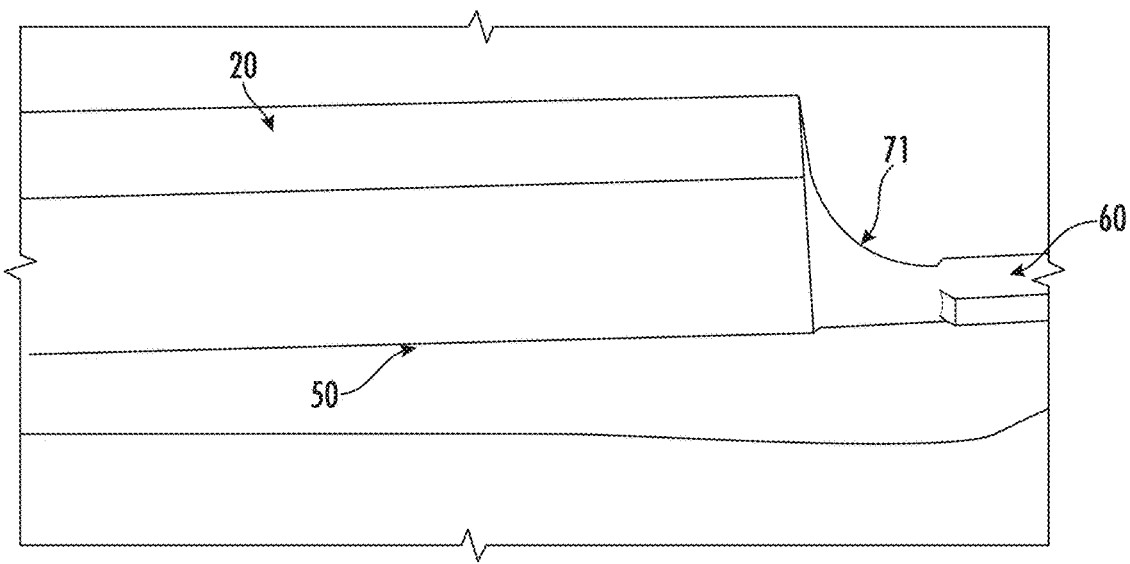

FIGS. 14A and 14B illustrate a top and side view, respectively, of an FAU 10 including a strain relief adhesive 71. In some example embodiments, the strain relief adhesive 71, which may be the same adhesive as adhesive 70, may be applied to the assembled FAU 10. The strain relief adhesive 71 may stabilize and/or protect the bare-glass front-end sections 54 of the signal-fiber array in a region between the support substrate 20 and the multifiber cable 60. In some example embodiments, the top surface of the support substrate 20 may have a step down surface that may be disposed in a plane lower than the top surface. The bare-glass front-end sections 54 may be disposed on the top surface and the portion of the optical fiber having the protective coating may disposed on the step down surface.

Figure 15:
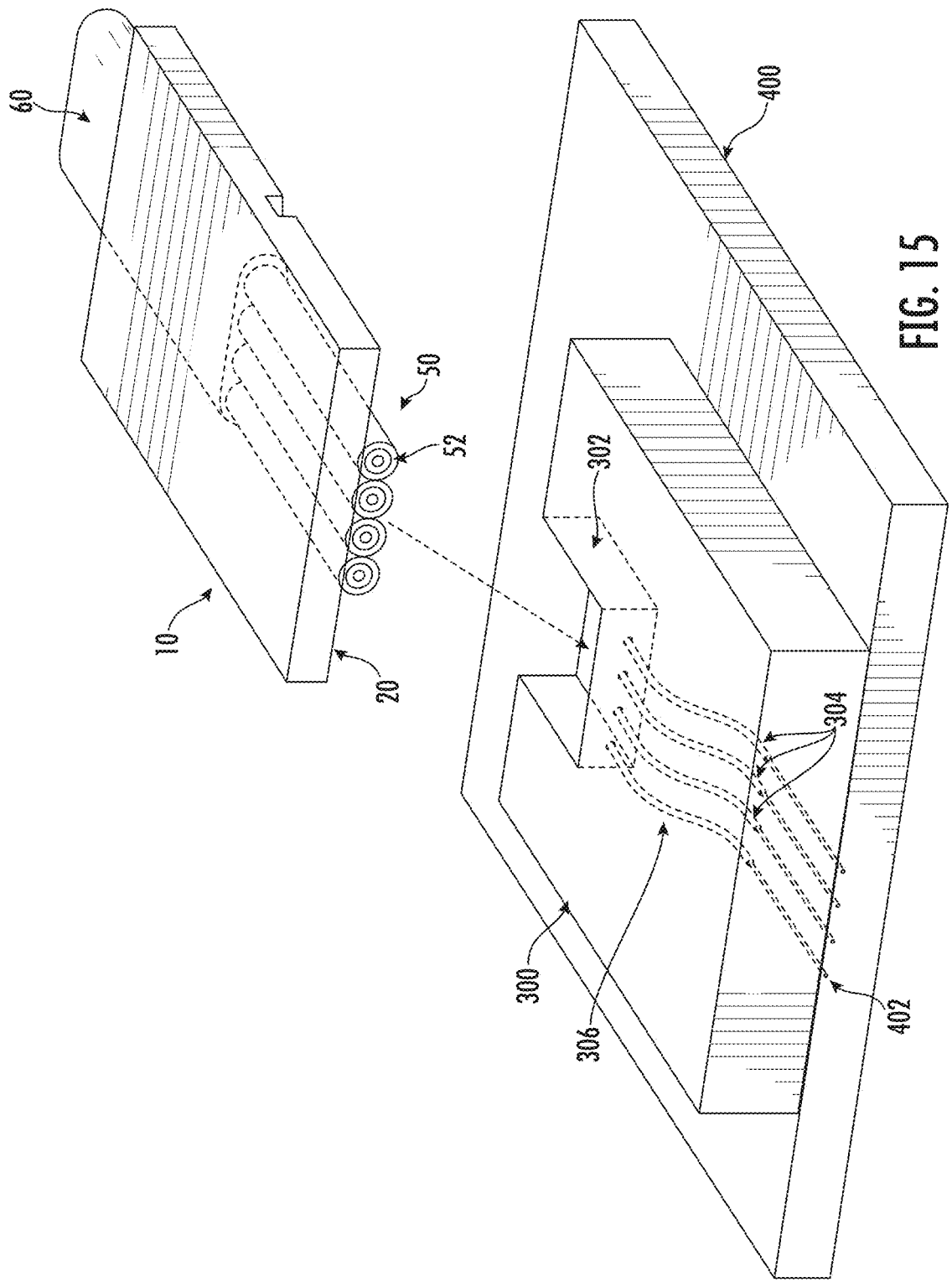
FIG. 15 illustrates passive alignment of a lidless FAU to a waveguide substrate having a notch feature according to an example embodiment.

Turning to FIG. 15, passive alignment of a lidless FAU 10 to a glass or silicon waveguide substrate 300 may be achieved by etching a notch feature 302 with precise surfaces disposed along straight or angled sidewalls into the waveguide substrate 300. Examples of waveguide substrates 300 include, without limitation, photonic integrated circuit (PIC) interposers and adapter substrates that may be used to interface with, e.g. optically connect to, a PIC substrate 400. In the depicted example, a waveguide substrate 300 serves as an adapter for coupling the optical fibers 52 of the signal-fiber array 50 to PIC planar waveguides 404. The waveguide substrate 300 may include an evanescent coupling region 306 including one or more laser written waveguides 304 In an example embodiment, the notch feature 302 is formed by a precision laser damage and etch process. The notch feature 302 may include a width sized to match a width of the signal-fiber array 50 of the FAU 10. It is noted that the depicted example provides a separate waveguide substrate and PIC substrate, however these may be the same substrate. Similarly, the waveguide substrate may be one integral component or may have multiple components that are attached to one another. In the discussion below, the term "waveguide substrate" should be understood to mean a substrate optically connected to the PIC either directly or indirectly.

In some example embodiments, the notch feature 302 may be fabricated in the same step as a PIC chip perimeter deep etch (used to expose waveguides that terminate around the edge of the PIC), using the same mask layer and etch process. Therefore, no additional cost is required to add the notch feature 302 when PIC chip perimeter deep etching is used. Alternatively, the notch may be formed in a separate substrate component and attached to the waveguide substrate, such as by an adhesive.

The notch feature 302 may be positioned at the edge of the waveguide substrate 300, as shown in FIG. 15. In another embodiment, the notch feature 302 may be positioned toward the middle of the waveguide substrate 300, such that it appears as a well of sufficient length (and widened as necessary) to allow the multifiber cable 60 of the FAU 10 to bend upward out of the well.

Passive alignment of the lidless FAU 10 to the notch feature 302 of the waveguide substrate 300 provides an advantage over bare fiber arrays passively aligned in V-grooves in that they are more compact, easier to prepare in advance, and more practical for use in passive alignment pick-and-place applications. The vertical offset of the cores 72 of the optical fibers 52 may also be more accurately controlled relative to the bottom surface of the support substrate 20.

Figure 16:
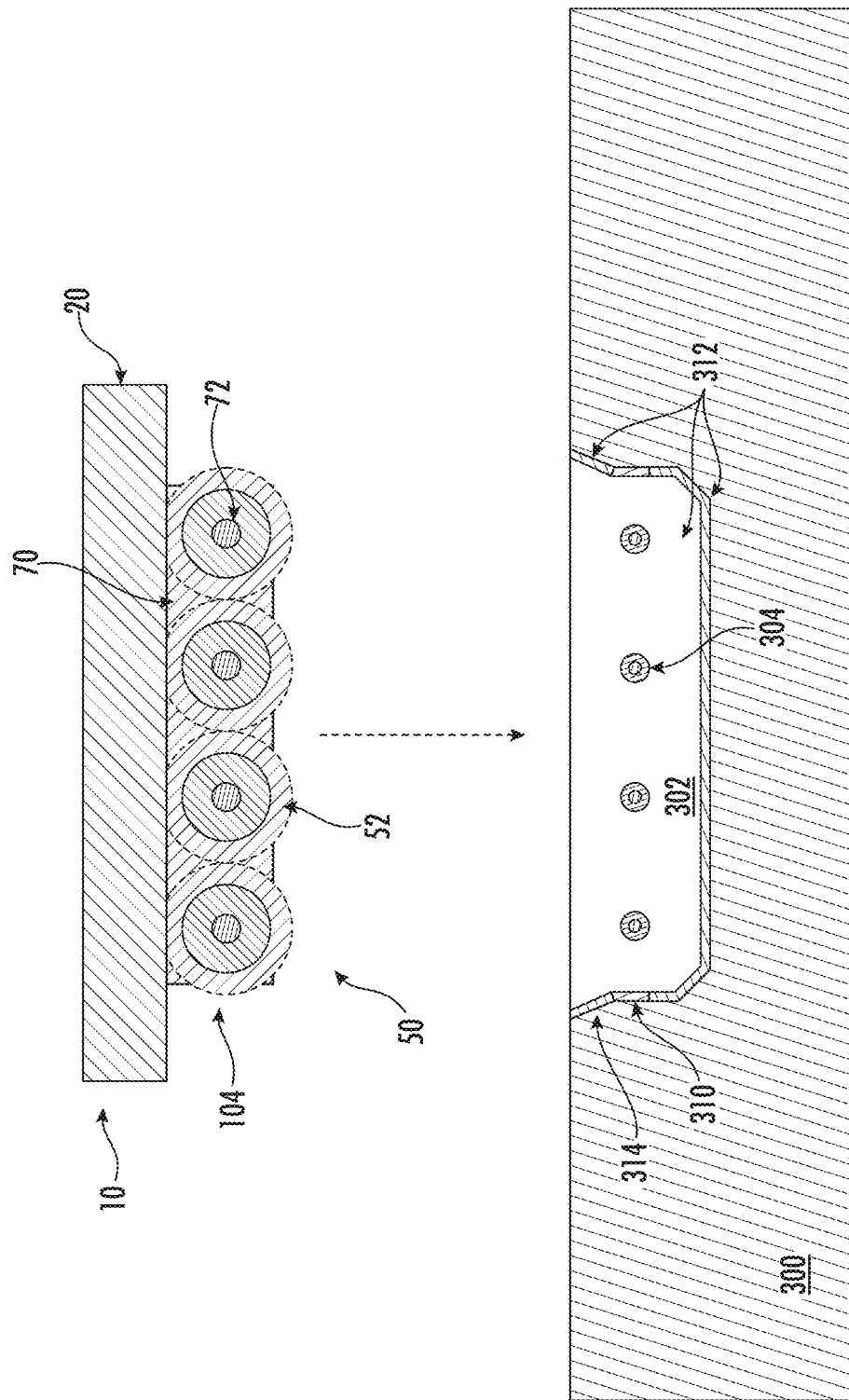
FIG. 16 illustrates passive alignment of a lidless FAU to a notch feature having precision surfaces according to an example embodiment.

FIG. 16 depicts lidless FAU 10 positioned over a U-shaped notch feature 302 that is etched into the surface of a waveguide substrate 300. In an example embodiment, the waveguide substrate 300 may be glass, and the notch feature may be formed using a laser damage and etch process. Additionally, an ultra-short pulse laser process may be used to form an array of buried waveguides 304 in the waveguide substrate 300. In some example embodiment, the two laser forming processes may be performed using the same laser, so that the laser written waveguides 304 are precisely aligned to the left and right sidewall edges of the notch feature. The exposed end faces of the laser written waveguides 304 may also be laser polished to create optically smooth surfaces to minimize coupling losses.

In the depicted embodiment, the notch feature 302 includes chamfered surfaces 314 where the notch feature 302 sidewalls meet a top surface of the waveguide substrate 300. The chamfered surfaces 314 may aid in passive alignment of the FAU 10 with the notch feature 302. The width of the notch feature 302 may be sized to be slightly wider than the width of the signal-fiber array 50 of the FAU 10 (by, for example, 0.5 μm). When the signal-fiber array 50 of the FAU 10 is inserted into the notch feature 302, the cores 72 of the optical fibers 52 may be precisely aligned with the cores of the laser written waveguides 304 in the waveguide substrate 300. The alignment may be accomplished by forming the laser written waveguides 304 at a precise depth in the waveguide substrate 300, such as exactly one half the diameter of the optical fibers 52 (e.g., 62.5 μm for standard 125 μm diameter optical fiber).

The FAU 10 may be passively aligned laterally, to waveguides 304 of the waveguide substrate 300 by contact of the sides of edge optical fiber 52 (particularly the second datum surfaces 104) with precision surfaces 310 formed at selected locations on the sidewalls of the notch feature 302. Generally, laser write time may be longer for forming precision surfaces 310 than coarse or rough surfaces. To minimize fabrication time and cost, the area of the notch feature 302 that is dedicated to precision surfaces 310 is minimized. Other surfaces 312 of the notch feature 302, such as other locations on the notch sidewalls and bottom surface, may be fabricated using a fast laser forming process that results in a rough surface. The rough surface does not participate in passive alignment or serve as datum contact or surface. The precision of each of the passive alignment elements may enable lateral alignment of single mode waveguide cores to within <1 μm, and preferably to within <0.5 μm.

Prior to passive alignment and attachment of the FAU 10 to the waveguide substrate 300, UV-curable adhesive may be applied to the side walls of the notch feature 302 and/or the FAU 10, such as on the signal-fiber array 50. After the FAU 10 is inserted into the notch feature 302, a moderate downward force may be applied on top side surface of FAU 10. This force may exclude adhesive from a region where the FAU 10 contacts the top surface of the waveguide substrate 300. In the depicted example, vertical alignment of the cores 72 to the waveguides 304 may be provided by contact of the surface of the support substrate 20 of the FAU 10 with the top surface of the waveguide substrate 300. Roughness of other surfaces 312 may improve the bond strength of UV-curable adhesive 70 used to bond the optical fibers 52 to the notch feature 302.

Advantageously, the laser write time for forming the notch feature 302 may be significantly less than a comparable V-groove structure for aligning individual V-grooves due to fewer precision surfaces needed for optical fiber alignment (two precision sidewall surfaces for all of the optical fibers 52 of the signal-fiber array 50 vs. 2N precision V-groove surfaces for each optical fiber 52 of the signal-fiber array 50). Additionally, there is significantly less bottom surface area associated with the notch feature 302 due to the optical fibers 52 being arranged in a 125 μm pitch instead of the 250 μm pitch of similar V-groove structures.

In some fabrication processes of waveguide substrate 300, such as ion exchanged (IOX) waveguide fabrication, the waveguides 304 may be planar waveguides that are formed near the surface of the waveguide substrate 300. FIGS. 17A and 17B provide views of an etched notch feature 302 on a waveguide substrate 300 with an array of waveguides 304 fabricated near the top surface of the waveguide substrate 300. The notch feature 302 provides two precision surfaces 310 on opposing sidewalls that extend upward to meet the top surface of the waveguide substrate 300.

Similar to the FAU 10 depicted in FIGS. 10A and 10B, a D-shaped optical fiber 52A may be selected so that the distance between the core 72 and the flat portion matches the depth of the waveguide 304 below the top surface of the of the waveguide substrate 300 of the waveguide substrate 300, for example the waveguide depth may be 5 to 10 µm. FIG. 17B shows a lidless FAU 10 assembled using a signal-fiber array 50 having D-shaped optical fibers 52A that has been inserted into the notch feature 302 of the waveguide substrate 300. The cores 72 of the D-shaped optical fibers 52A align with the waveguides 304 disposed near the surface on the waveguide substrate 300. Lateral alignment of the cores 72 to the waveguides 304 may be achieved by the contact between the precision surfaces 310 of the notch feature 302 and the datum surfaces 104 of the edge optical fibers 52 of the signal-fiber array 50. The FAU 10 with D-shaped optical fibers 52A may be held in the notch feature 302 of the waveguide substrate 300 using a UV-curable adhesive, as discussed above.

Figure 18A:
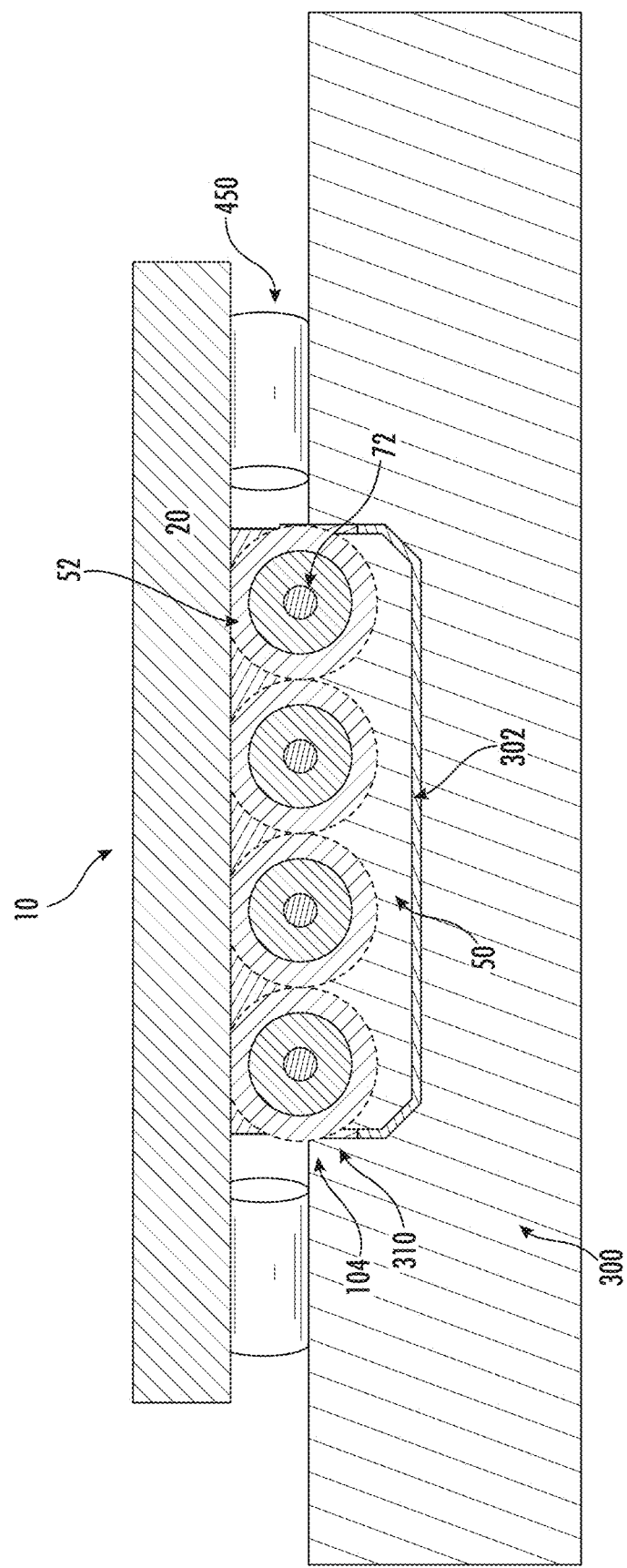

Some PIC planar waveguide technologies position waveguides at the surface of the PIC substrate 400, or possibly only slightly below the surface of the PIC substrate (e.g., 1-3 µm below). Examples include silicon, silicon nitride, and silicon oxynitride, and polymer waveguides fabricated as ridge waveguides or near-surface buried waveguides on silicon, glass, and LiNbO3 substrates. These waveguides may be employed in passive or active waveguide components. To accommodate PIC substrates that include surface waveguides, the FAU 10 may be modified to include one or more vertical standoff features so that its depth in the etched notch is precisely controlled. FIGS. 18A and 18B depict an example FAU 10 embodiment including vertical standoff features.

Drawn glass fibers, e.g. spacer fibers, may be fabricated with precise diameters, often to within <0.5 µm of target values. Spacer fibers 450 with precise diameters may be attached to the surface of support substrate 20 of the FAU 10 adjacent to the signal-fiber array, as depicted in FIG. 18A. The spacer fibers 450 may be attached to the support substrate 20 during or after the fiber array squeeze assembly process. In some examples, spacer fibers 450 may also be utilized as the pusher sheets 206, discussed above. The spacer fibers 450 may push on the opposing sides of the signal-fiber array 50 during assembly to push the optical fibers 52 into contact with each other. Excess length of the spacer fiber 450 may be removed after assembly of the FAU 10, such as via scoring and cleaving, or sawing. When the signal-fiber array 50 of the FAU 10 is inserted into the notch feature 302 of the waveguide substrate 300 the spacer fiber 450 provides a precise vertical spacing, such that the cores 72 are aligned to the planar waveguides 304 of the waveguide substrate 300. Lateral alignment of the cores 72 to the waveguides 304 may be achieved by the contact between the precision surfaces 310 of the notch feature 302 and the datum surfaces 104 of the edge optical fibers 52 of the signal-fiber array 50.

In the depicted embodiment, the spacer fibers 450 are shown perpendicular to longitudinal axis of the optical fibers 52. However, in an alternative configuration, the spacer fibers 450 may be arranged parallel to the longitudinal axis of the optical fibers 52, as depicted in FIG. 18B. Additionally, in some example embodiments, the release pad 204 may include small step recesses to accommodate two outboard smaller diameter spacer fibers 450 during assembly of the FAU 10. The spacer fibers 450 may be squeezed and held in place by the adhesive 70, similar to the manner discussed above with to assembly of the FAU 10.

In further example embodiments, instead of using precision diameter spacer fibers 450, fusion drawn glass sheets may be used both as the pusher sheet 206 and as precision vertical spacer sheets. The assembly process of the FAU 10 may be substantially similar to the FAU 10 assembly process discussed above with regard to the spacer fibers 450. Excess length of the spacer/pusher sheet may be removed via glass scoring and breaking or laser scoring or ablation processes. When FAU 10 is inserted into the notch feature 302 of the waveguide substrate 300, the spacer/pusher sheets provide a precise vertical offset that enables alignment of the cores 72 of the optical fibers 52 of the signal-fiber array 50 to the waveguides 304 of the waveguide substrate 300. Lateral alignment of the cores 72 to the waveguides 304 may be achieved by the contact between the precision surfaces 310 of the notch feature 302 and the datum surfaces 104 of the edge optical fibers 52 of the signal-fiber array 50.

Additionally or alternatively, laser bumps may be formed on the support substrate 20 and/or the waveguide substrate 300 with precise heights. For example, laser bumps that are 2 to 100 µm high may be formed on surfaces of the support substrate 20 and/or waveguide substrate 300 with a height control of <0.5 µm. Using laser bumps to control core depth alignment, three or more laser bumps may be formed on the surface of the support substrate 20 adjacent to the signal-fiber array 50 and/or the surface of the waveguide substrate 300 adjacent to the notch feature 302. The bump heights may be selected, such that when the FAU 10 is inserted into the notch feature 302, the cores 72 of the optical fibers 52 are aligned with the waveguides 304.

FIG. 18A depicts an example embodiment, in which the notch feature 302 includes straight sidewalls etched in to the waveguide substrate 300. The notch feature 302 may be etched, as discussed above, using laser damage and etch processes in waveguide substrates 300 formed from glass. In other embodiments, the notch features 302 may be formed in waveguide substrates 300 from silicon using anisotropic deep RIE (Reactive Ion Etch) processes, such as the Bosch process. The anisotropic deep RIE process may be tuned to create deep etches with smooth vertical sidewalls. An example etch depth using the anisotropic deep RIE process with FAUs 10 that have round optical fibers may be about 70 pm. The depth of the notch feature 302 does not have to be precisely controlled, however the width of the notch feature 302, particularly the precision surfaces 310 may precisely controlled via photolithographic etch masking.

FIG. 18B depicts a silicon waveguide substrate 300 including a notch feature 302 formed using a combination of isotropic and anisotropic etch processes. The notch feature 302 may be formed in three steps, such as 1) shallow anisotropic etch to form a precision surface 310 disposed on the side wall of the notch feature 302; 2) sidewall passivation to prevent etching at precision surface in a subsequent step; and 3) deep isotropic etch to rapidly remove material moving downward into waveguide substrate 300. The combination of isotropic and anisotropic etch processes mimics the low cost and rapid SCREAM (Single-Crystal Reactive Etching And Metallization) process used to produce MEMS (Micro-Electro-Mechanical Sensor) sensors and accelerometers via underetch. Advantageously, the combination of isotropic and anisotropic etch processes produces the required precision surface 310 of the notch feature 302, while allowing the remaining surfaces to be etched away rapidly.

The sidewall underetch may also be used to create a notch feature 302 that holds the FAU 10 captive after passive alignment to the silicon waveguide substrate 300, as depicted in FIG. 19. Similar notch features 302 may also be fabricated in glass waveguide substrates 300 using laser damage and etch processes. A waveguide substrate 300 may include a notch feature 302 with a sidewall having an undercut with a precision surface 310. The undercut profile may be etched such that the precision edge matches the outer diameter of the optical fibers 52 of the signal-fiber array 50 of the FAU 10, enabling contact between the undercut profile and the optical fibers 52 at at least one point.

The notch feature 302 may be tapered along its length (parallel to the axis of optical fibers 52 of the signal-fiber array 50), such that during insertion of the FAU 10 into notch feature 302, the undercut features gradually engage the outer diameter surface of the optical fibers 52. When the FAU 10 is fully inserted in the notch feature 302, the clearance between the precision surface 310 of the undercut and the surface of the outer diameter of the optical fiber 52 may be about 0.5 μm. This clearance may facilitate low loss coupling between cores 72 of the optical fibers 52 and the waveguides 304 of the waveguide substrate 300.

Additionally or alternatively, the sidewalls and/or the precision surfaces 310 of the notch feature 302 may also be angled using anisotropic wet etch processes, forming a broad V-groove notch feature. In such an example embodiment, laser formed glass bumps may be provided on the support substrate 20 of the FAU 10 to ensure that the FAU 10 is properly aligned in the broad V-groove notch feature and cores 72 of the optical fibers 52 are aligned to the waveguides of the waveguide substrate 300.

One solution for coupling an FAU 10 to a waveguide substrate 300 with surface waveguides 304 may be to include vertical offset features on the FAU 10, such as laser bumps, fiber spacers, or sheet spacers, as described above. Another approach may include setting the vertical offset of the FAU 10 by fabricating bottom precision surfaces 311 on the bottom of the notch feature 302. The sidewall precision surface 310 and the bottom precision surfaces 311 may be fabricated in glass waveguide substrates 300 using laser damage and etch process. Lateral alignment of the cores 72 to the waveguides 304 may be achieved by the contact between the precision surfaces 310 of the notch feature 302 and the datum surfaces 104 of the edge optical fibers 52 of the signal-fiber array 50. Vertical alignment of the cores 72 to the waveguides 304 may be achieved by the contact between the bottom precision surfaces 311 of the notch feature 302 and the datum surfaces 103 on the top of one or more of the optical fibers 52 of the signal-fiber array 50.

Figure 21:
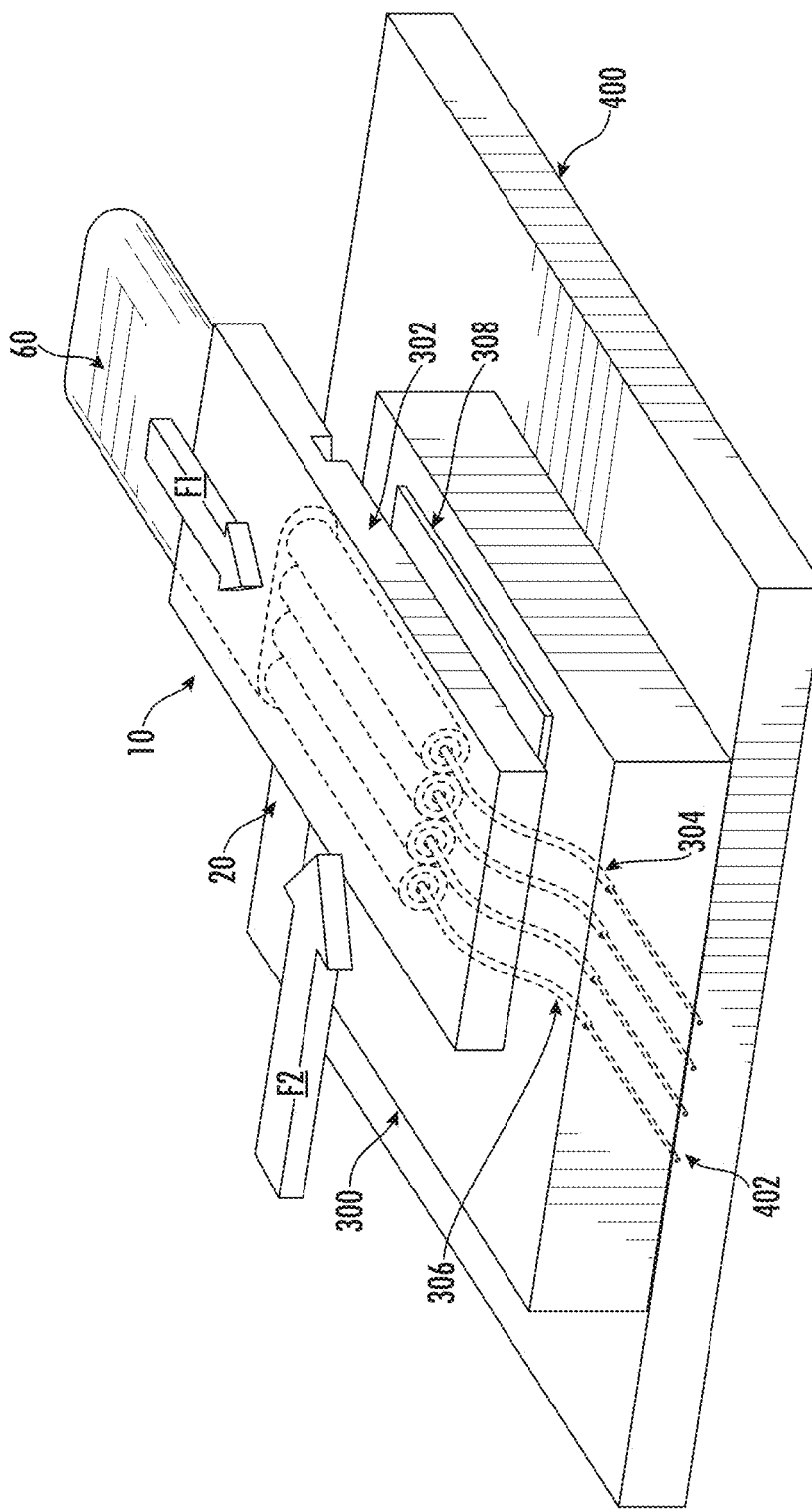
FIG. 21 illustrates passive alignment of a lidless FAU to a waveguide substrate including an alignment feature according to an example embodiment.

Additionally or alternatively, passive alignment of the FAU 10 with the notch feature 302 of the waveguide substrate 300 may be accomplished by providing a single alignment feature 308 on the surface of the waveguide substrate 300 that serves as a lateral stop, as depicted in FIG. 21. The alignment feature 308, or rib, may be fabricated on the waveguide substrate 300 using a photolithographic or laser processing step, in which the alignment feature 308 is positioned at a predetermined lateral offset from laser written waveguides 304. The alignment feature 308 may include a precision surface disposed on an edge facing the notch feature 302. The alignment feature 308 may also be a thin glass substrate with a precision edge facing the FAU 10 that is bonded to the waveguide substrate 300 using adhesive. In such an embodiment, the alignment feature 308 may be actively aligned to the waveguide substrate 300 with sub-micrometer precision using, for example, fiducial marks provided on both the alignment feature 308 and the waveguide substrate 300.

The FAU 10 may be attached to the waveguide substrate 300 where the FAU 10 is positioned against the alignment feature 308. In this approach, each core 72 of the signal-fiber array 50 of the FAU 10 is positioned on the support substrate 20 at a precise lateral position relative to the edge of the support substrate 20. An axial force F1 may be applied to insert the FAU into the notch feature 302, while a lateral force F2 is applied to the FAU against the alignment feature 308. A concern with this approach is that dicing processes for cutting large glass sheets into smaller support substrates 20 may not create a precise straight edge, such that the edge may have some waviness, roughness, edge chipping or other deviation from an ideal straight line along its length that is on the order of 1 μm or more.

To overcome inconsistency in the edge of the support substrate 20, laser damage and etch processes may be used to fabricate a precision surface on selected perimeter locations of the support substrate 20. In an example embodiment, a large glass sheet is first patterned by a ultra-short pulse laser to create a precision rectangular notch adjacent to each glass support substrate 20. The notch may be formed all the way through the glass sheet or etched to a sufficient depth to enable assembly using the lidless FAU squeeze approach, described above in reference to FIGS. 3-10B.

After the notch is etched away the glass sheet may be cut into support substrates 20 using a dicing saw. Alternatively, the laser damage and etch process may be used to form both the precision rectangular notches and less precise straight cuts that separate the support substrates 20, using a faster laser exposure process that leaves a more coarse surface on the edges of the support substrate 20 after etching.

Figure 22:
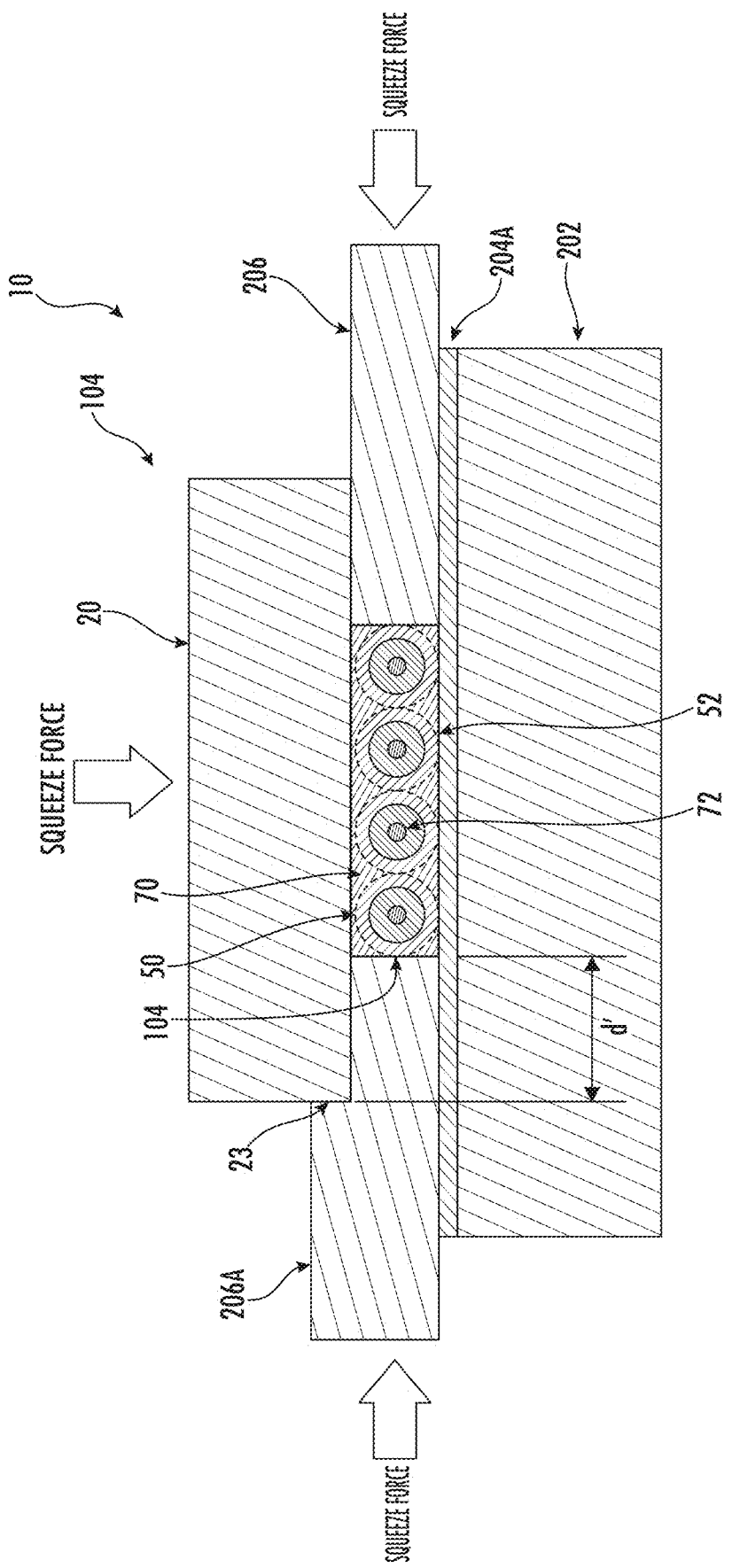
FIG. 22 illustrates that FAU fabrication process including a stepped pusher sheet according to an example embodiment.

FIG. 22 provides an end face view of an FAU 10 with a precision edge surface during assembly. During assembly of the FAU 10 an edge 23 including the precision surface of the support substrate 20 may be have a precise lateral offset (d') to the datum surface 104 of the edge optical fiber 52 of the signal-fiber array 50. A stepped pusher sheet 206A may be positioned on the edge 23 of the support substrate 20 and may maintain the lateral offset d' during the squeeze assembly process of the FAU 10. The stepped pusher sheet 206A may be fabricated using a diamond turning process to provide the precise lateral offset d'. The stepped pusher sheet 206A may also be coated with a non-stick coating, such as a fluorosilane coating, such that after curing of the adhesive 70, the FAU 10 does not become attached to the stepped pusher sheet 206A.

Lidless FAU Mounting to Flip Chip PIC

An emerging trend in high bandwidth data center switches involves co-location of many compact optoelectronic transceivers around electronic switch chips on a common interposer substrate or multi-chip module. Flip chip mounted PICs are preferred because they enable high bandwidth solder bump electrical interconnections to supporting interposer or PCB substrates, and they are compatible with low cost pick and place assembly techniques.

A challenge with flip chip mounting of PICs is that their photolighographically defined features, such as waveguides, alignment features, alignment marks, and control electronics, are located on the side of the PIC that faces downward toward the supporting interposer or PCB substrate. This configuration makes it difficult to access or observe these features and use them for passive alignment of optical interconnections. As a result most PICs are mounted with their waveguides and other features facing upward, requiring more complicated packaging and electrical interconnection solutions.

Laser damage and etch processes may be used to rapidly form precision feature on glass sheets. Etched features may be positioned with high precision (e.g., <0.5 µm) relative to other etched features, laser written waveguides, or surface or edge datum features. Glass substrates with precision features may be attached to PIC substrates since the glass substrate CTE (Coefficient of Thermal Expansion) may be adjusted to match the PIC substrate CTE. This may enable a fully passive alignment assembly approach for coupling lidless squeeze FAUs (to flip chip mounted PICs via an intermediate glass alignment substrates, where the glass alignment substrates are patterned with precision laser damage and etch channel features. Although discussed below in the context of flip chip mounted PICs, the described method and structures may also be applied to any configuration that the PIC waveguides and alignment marks are not easily accessible after the PIC is mounted on a support including without limitation, a PCB, another PIC, an IC, or the like, alone or in a 3D stack.

Figure 23:
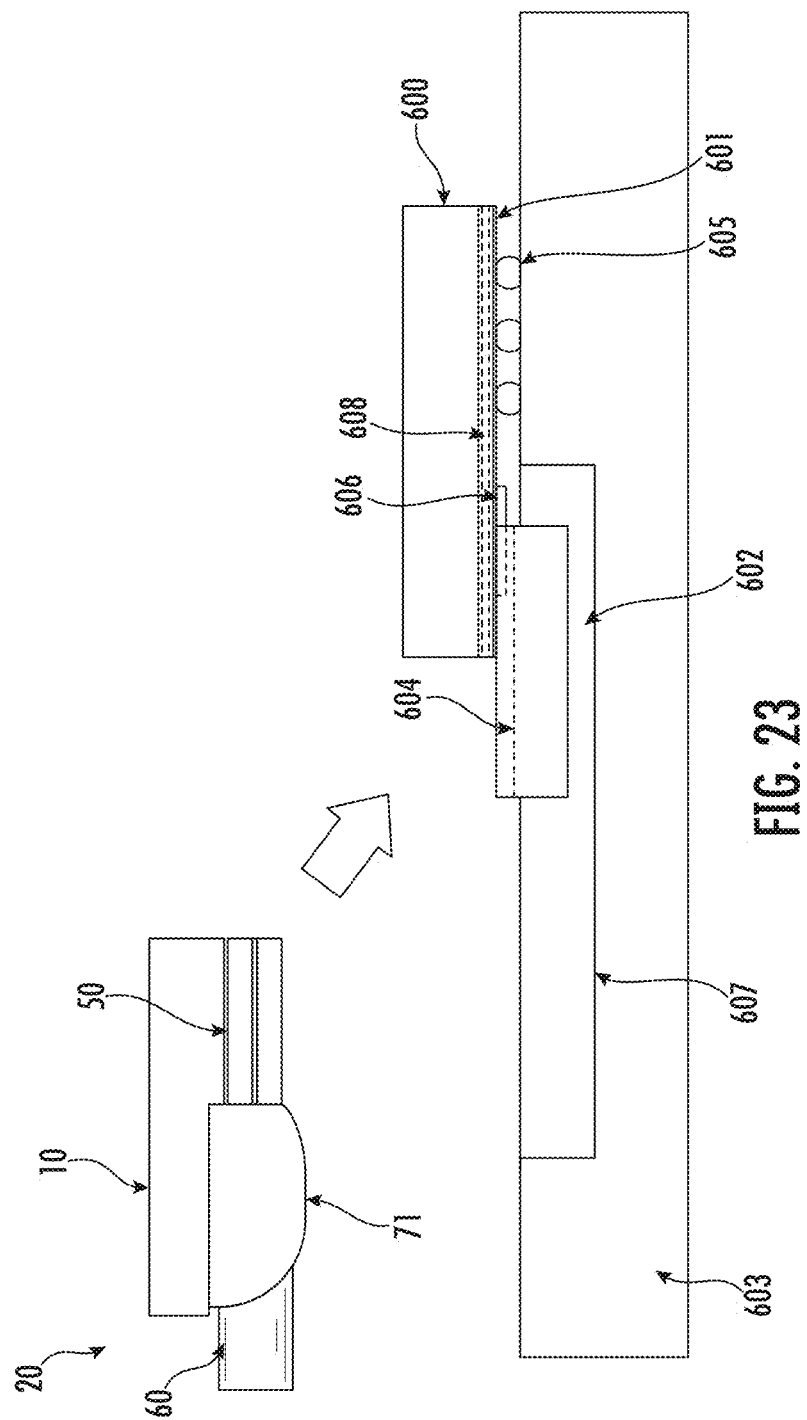
FIG. 23 illustrates a lidless FAU installation onto a flip chip mounted PIC substrate according to an example embodiment.
Figure 24:
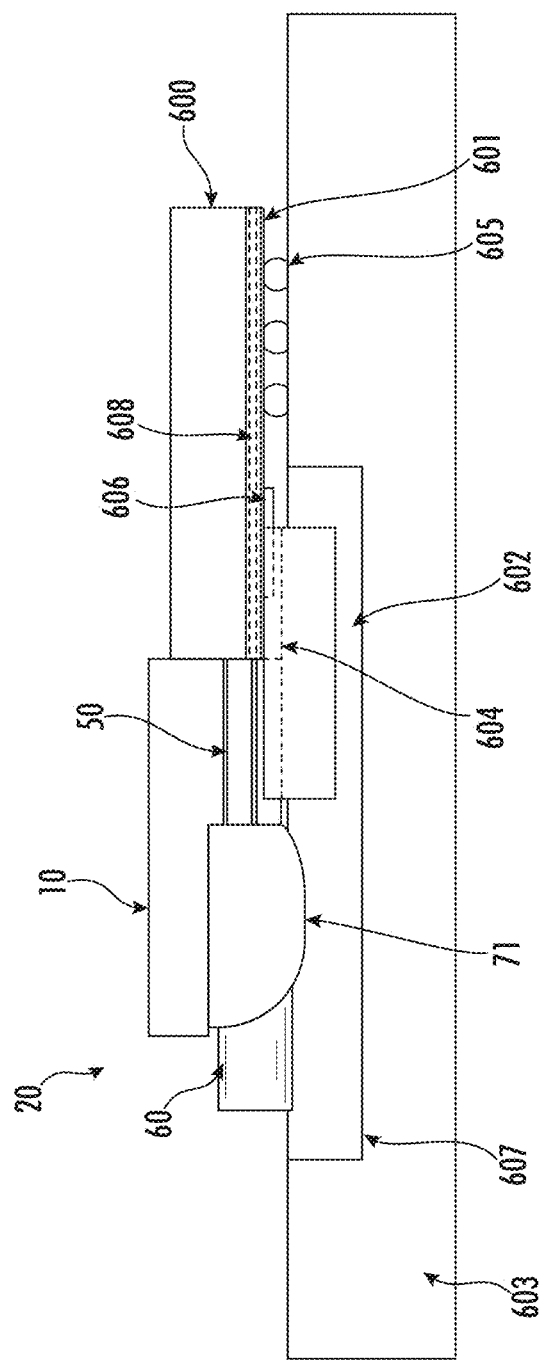
FIG. 24 illustrates the lidless FAU of FIG. 23 installed onto the flip chip mounted PIC substrate according to an example embodiment.

Turning to FIGS. 23 and 24, a method for passively aligning a lidless FAU 10 to a PIC substrate 600 with flip chip mounting is provided. The PIC substrate 600 may include one or more electric connection elements, such as solder pads, disposed on a PIC face 601. The PIC substrate 600 may be flip chip mounted to a printed circuit board (PCB) 603 or other electronic packaging support substrate, such as a glass or silicon interposer substrate. The PCB 603 may include one or more PCB electronic connection elements, such as solder pads, which may be complementary to the at least some of the electronic connection elements of the PIC substrate 600. The PCB electronic connection elements and the electronic connection elements of the PIC substrate 600 may be connected by one or more solder balls 605, using a solder reflow process. A glass alignment substrate 602 may be mounted to the bottom surface, e.g. PIC face 601, of the PIC substrate 600. The alignment substrate 602 may include a precision channel, such as a U-channel 604 or V-channel, that enables passive alignment of the lidless FAU 10 to the PIC substrate 600. For example, the PIC substrate 600 may include one or more alignment features, such as alignment ribs 606 extending from the PIC face and configured to engage the U-channel 604 to align the alignment substrate 602 with one or more planer waveguide 608 disposed on the PIC face 601 of the PIC substrate 600. Additionally, the external features, e.g. exposed datum surfaces 103, 104, as discussed above in reference to FIG. 2 may also engage the U-channel 604 to align the signal-fiber array 50 with the waveguides 608. Additionally or alternatively, the alignment feature on the PIC face 601 may be configured to engage a separate channel, e.g. U-groove or V-groove, disposed on the alignment substrate 602, where the separate channel is formed at a precision offset from the U-channel 604 used for alignment to the plurality of waveguides 608. In some example embodiments, the alignment feature extending from the PIC face 601 may be configured to align with a precision edge on the alignment substrate 602.

In some example embodiments, a recess 607 may be provided in the PCB 603. The recess 607 may enable the PIC substrate 600 to be mounted to a top face of the PCB and allow at least a portion of the alignment substrate 602 to be disposed below the top face of the PCB 603. By positioning at least a portion of the alignment substrate 602 below the top face of the PCB 603 the signal fiber array 50 may be aligned with the waveguides 608, as shown in FIG. 24.

The lidless FAU 10 may be passively aligned to the alignment substrate 602 and then held in place using UV-curable adhesive. The process as described in FIGS. 23-34C may include fabrication of the alignment substrate 602, passive alignment of alignment substrate 602 to a PIC substrate 600, flip chip attachment of PIC substrate 600 to PCB 603, passive alignment of the lidless FAU 10 to PIC waveguides 608, attachment of the lidless FAU 10 using UV-curable adhesive, and/or retaining lidless FAU 10 in contact with PIC substrate 600, as discussed below.

Figure 25A:
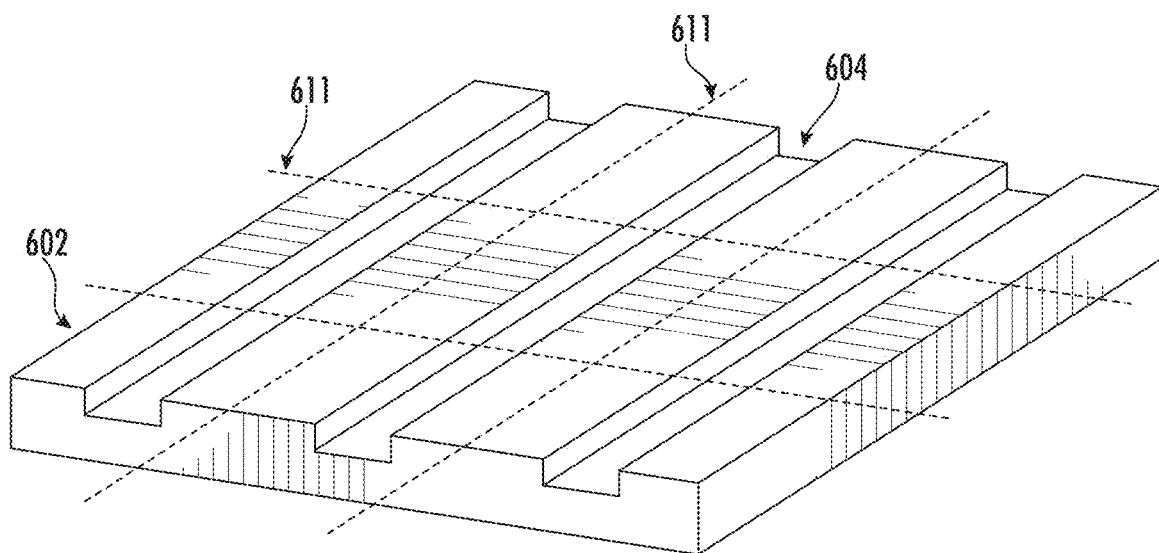
FIG. 25A illustrates fabrication of an alignment substrate according to an example embodiment.
Figure 25B:
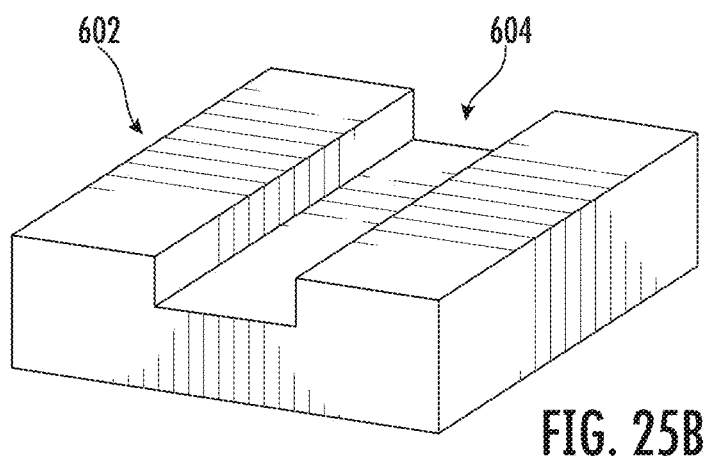
FIG. 25B illustrates an example alignment substrate according to an example embodiment.

Turning to FIGS. 25A and 25B, the U-channel 604 of the alignment substrate 602 may be formed by laser damage and etch processes in a glass substrate. The U-channels 604 may include characteristics similar to the notch features 302, as discussed above, such as one or both of the width and the depth of the U-channel 604 may be precisely controlled and/or include a precision surface.

The alignment substrate 602 may be fabricated starting with a glass sheet that provides an extremely flat surface, such as standard Liquid Crystal Display (LCD) glass. Precision width U-channels 604 may be formed into the surface of the glass sheet using laser damage and etch processes, precision photolithographic masking and etching, or precision diamond sawing. The widths of the U-channel 604 slot may be configured to be only slightly wider than the width of the signal-fiber array 50 of the lidless FAU 10, for example 0.5-0.7 µm wider than the signal-fiber array 50. The U-channels 604 may also be fabricated with a precise depth such that when the signal-fiber array 50 is passively aligned by the U-channel 604, the cores 72 (FIG. 1) are vertically, as well as horizontally, aligned to waveguides 608 of the PIC substrate 600.

As depicted in FIG. 25B, the glass sheet may be separated into smaller pieces, e.g. alignment substrates 602, using a dicing saw, as indicated by dashed lines 611. Alternatively, the augment substrate 602 may be separated using a fast laser damage and etch process. After dicing, individual alignment substrates 602 may be ready for passive alignment to a PIC face 601 of a PIC substrate 600. Depending on the application and the number of optical interconnections required by the PIC substrate 600, the alignment substrate 602 may include one U-channel 604, or it may include many U-channels 604 arranged side-by-side.

Figure 26A:
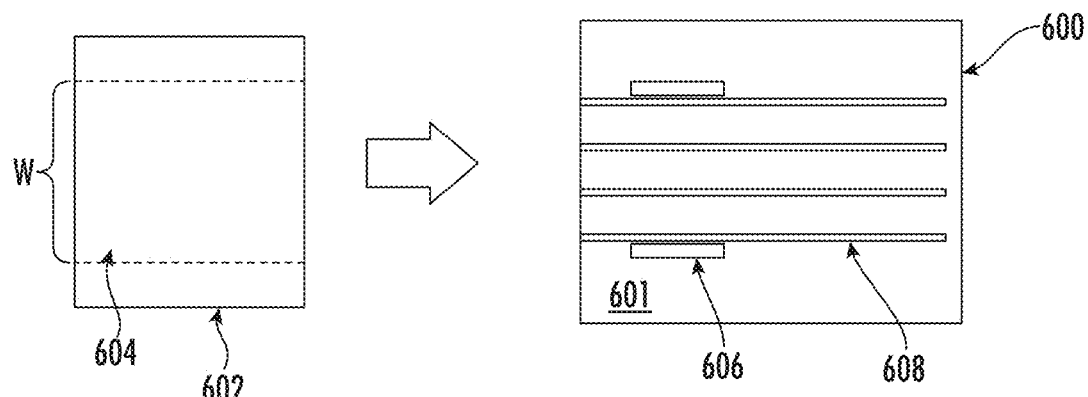
FIG. 26A-26C illustrate bottom, side, and end views of an example installation of an alignment substrate onto a PIC face of a PIC substrate according to an example embodiment.
Figure 26B:
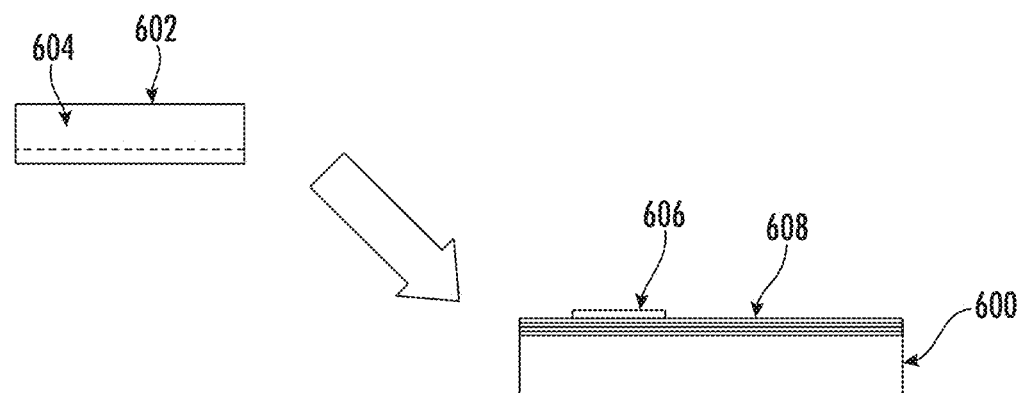
Figure 26C:
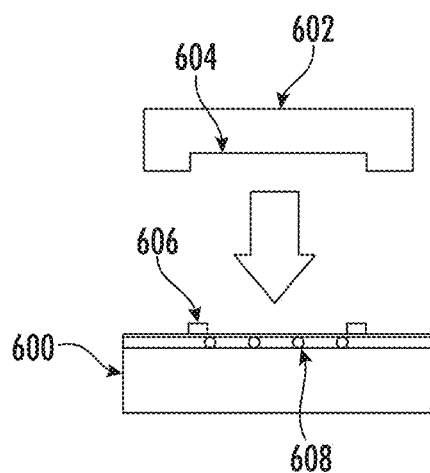
Figure 27A:
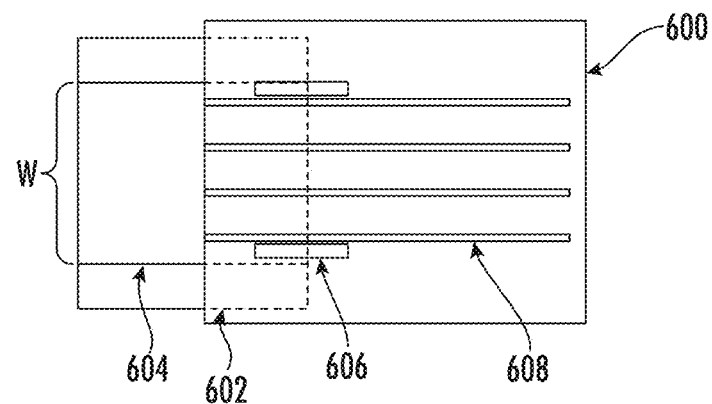
FIG. 27A-27C illustrate top, side, and end views of the alignment substrate installed on the PIC substrate according to an example embodiment.
Figure 27B:
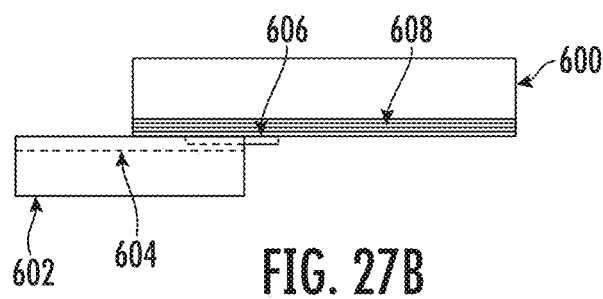
Figure 27C:
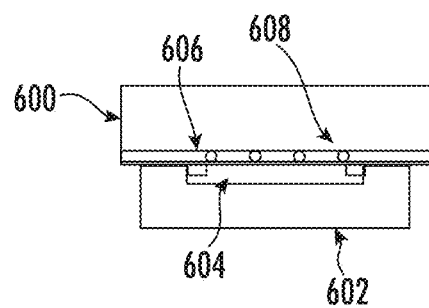

FIGS. 26A-26C depict bottom, side, and end views of passive alignment of the alignment substrate 602 to the PIC substrate 600 using precision alignment features, such as the raised alignment ribs 606. The alignment ribs 606 may be precisely positioned on the PIC face 601 of the PIC substrate 600 relative to the waveguides 608 using, for example, photolithographic alignment techniques. The alignment ribs 606 may be positioned, such that the distance between outside surfaces of the alignment ribs 606 matches the width (W) of the U-channel 604 of alignment substrate 602. A slight clearance tolerance may be provided to accommodate manufacturing variations of the alignment ribs 606 and the width of the U-channel 604, such as 0.2-0.5 µm. FIGS. 27A-27C depict an optical assembly after passive alignment the alignment substrate 602 and the PIC substrate 600, where UV-curable adhesive is used to hold the two components together.

The alignment features, such as alignment ribs 606 may be fabricated using a variety of techniques for glass, silicon, LiNBO3, and other optoelectronic substrate materials. Non-limiting example techniques for fabricating raised alignment ribs, blocks, or posts using additive processes may include photoresist, metal, or other deposited materials. Non-limiting example techniques for fabricating raised alignment ribs, blocks, or posts by removing substrate material adjacent to the ribs or depressed surfaces may include slots, channels, grooves, or pits formed by reactive ion etch (RIE) processes, wet chemical etch processes, laser damage and etch processes (for glass substrates). The raised alignment ribs may also be created by adding a precision geometry object, such as an optical fiber into a precision depressed surface, such as a V-groove. The U-channel 604 edges on the alignment substrate 602 may be formed with sharp corners, therefore, the alignment ribs 606 do not have to be extremely high. For example, alignment of the U-channel 604 may be achieved with a height of the alignment feature of 5-10 μm.

Additional lead-in features, such as tapers and funnels, may be incorporated into the shape of the alignment rib 606 or the U-channel 604 of the alignment substrate 602 to aid in initial coarse alignment (both lateral and angular) of the U-channel 604 to the alignment ribs 606 of the PIC substrate 600. The alignment rib 606 may also include a perpendicular feature, extending out of a longitudinal axis of the alignment rib 606, that serves as a stop to arrest the motion of the glass alignment substrate during alignment. Alternatively the alignment substrate 602 may include a top surface step feature that causes the alignment substrate 602 to stop at a precise location relative to the edge of the PIC substrate 600 during passive alignment. In some embodiments, the outside edge of the alignment substrate 602 may also be used as a passive alignment datum, such as when it is formed using a precision etching process. The laser damage and etch process may also be used to create additional alignment features on the alignment substrate 602, such as trenches, ribs, posts, or notches that are designed to align to complementary mating features on the PIC face 601 of the PIC substrate 600. A number of options may be utilized for the passive alignment assembly process. Some non-limiting examples include passive alignment carried out between individual alignment substrates 602 and individual PIC substrates 600, as depicted in FIGS. 26A-27C; or alignment substrates 602 fabricated in strips with 1D arrays of U-channels 604, where the multiple U-channels 604 may be passively aligned to an individual PIC substrate 600. In a further example, alignment substrates 602 may be fabricated in strips with 1D arrays of U-channels 604 for passive alignment to 1D strips of multiple PIC substrates. After passive alignment the joined components are diced to produce individual alignment substrate 602/PIC substrate 600 assemblies. Another example assembly process may include wafer-scale assembly, where a 2D array of U-channels 604 of alignment substrate 603 are aligned on a single glass sheet and are passively aligned to a 2D array of PIC substrates 600 on a single wafer. After passive alignment the joined components are diced to produce individual alignment substrate 602/PIC substrate 600 assemblies.

After assembly, a protective material (e.g., tape or film material) may be applied over the U-channel 604 of the alignment substrate 602 to protect the U-channel 604 from contamination during subsequent processing. The protective material may be made of a material configured to survive exposure to solder reflow temperatures (~260° C. for several minutes), such as Kapton.

As discussed above in reference to FIGS. 23 and 24, the alignment substrate 602/PIC substrate 600 assembly may be attached to the PCB 603 using flip chip solder ball or solder bump joining processes. The alignment substrate 602 and the PIC substrate 600 are joined using an adhesive that is solder reflow compatible. The alignment ribs 606 engage the U-channels 604 of the alignment substrate 602 to stabilize the alignment even if the adhesive softens during solder reflow process. An advantage of this approach is that during solder reflow the lidless FAU 10 is not connected to the alignment substrate 602, so applied forces that may misalign the alignment substrate 602, relative to the PIC substrate, 600 may be minimized.

The applied protective high temperature tape that covers over the U-channel 604 of the alignment substrate 602 may be removed after the PIC substrate 600 is attached to the PCB 603 or interposer by the solder reflow process. Alternatively, the tape covering the U-channel 604 of the alignment substrate 602 may be left in place until subsequent passive alignment of the lidless FAU 10 with the U-channel 604.

Next, the lidless FAU 10 may be passively aligned with flip chip mounted PIC substrate 600 by inserting the lidless FAU 10 into the U-channel 604. The precision surfaces of the U-channel 604 may engage the exposed datum surfaces 103, 104 of the lidless FAU 10, thereby aligning the signal-fiber array 50 with the waveguides 608. In an example embodiment, the lidless FAU 10 may be similar to the FAUs discussed above in reference to FIG. 2. In some example embodiments, an overlap sheet 612 may be disposed on a second surface of the support substrate 10, opposite the signal-fiber array 50, as depicted in FIGS. 28A and 28B.

The overlap sheet 612 may be an enlarged glass sheet that is configured to overlap the PIC substrate 600 during assembly to increase the mechanical strength of the interface. The enlarged glass sheet, e.g. overlap sheet 612, may be installed over a lidless FAU 10 to form an overlap FAU, as depicted in FIG. 28B. An adhesive, such as a UV curable adhesive, may be utilized to bond the overlap sheet 612 to the support substrate 10. In this configuration, the thickness of support substrate 10 may be selected such that the bottom of the overlap sheet 612 is approximately even to a top surface of the PIC substrate 600 after passive alignment. The thickness of the support substrate ($T_{SS}$) may found using EQN. 1

Equation 1

$$T_{SS} = T_{PIC} - r_{OF} - D_{WG} + T_{AD} + V_{ar} \qquad (1)$$

where $T_{PIC}$ is the thickness of the PIC substrate, $r_{OF}$ is the radius of the optical fiber, $D_{WG}$ is the depth of the PIC waveguide center below the surface of the PIC substrate; $T_{AD}$ is the target nominal adhesive thickness between the bottom of the overlap glass sheet and the top of the PIC substrate, and Var is an additional thickness to account for variations in the thickness of the PIC substrate. Additionally or alternatively, spacers features may be added to the bottom surface of the overlap sheet 612 to relax the tolerances on the thickness of the support substrate 10. The spacers may be laser bumps, precision fibers, fiber array rafts, glass spacer sheets, or the like.

Figure 29A:
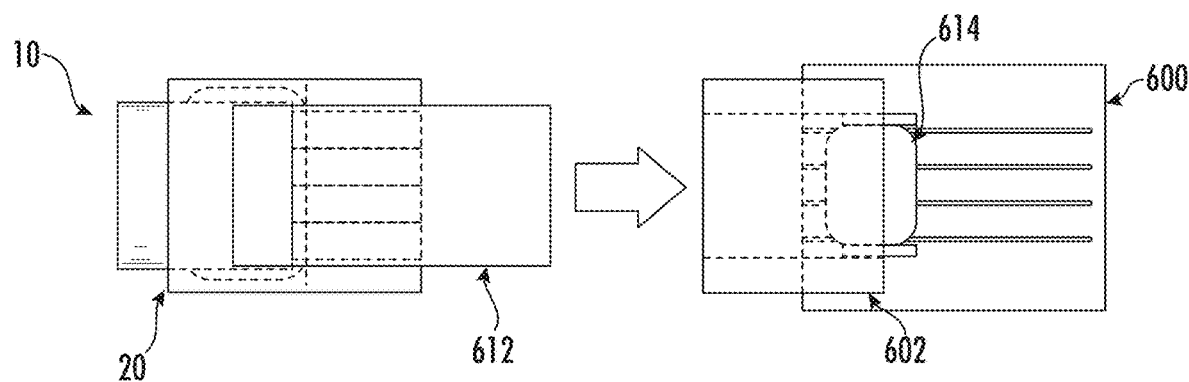
FIGS. 29A-29C illustrate top, side, and end views of installation of a lidless FAU including an overlap sheet to a PIC substrate according to an example embodiment.
Figure 29B:
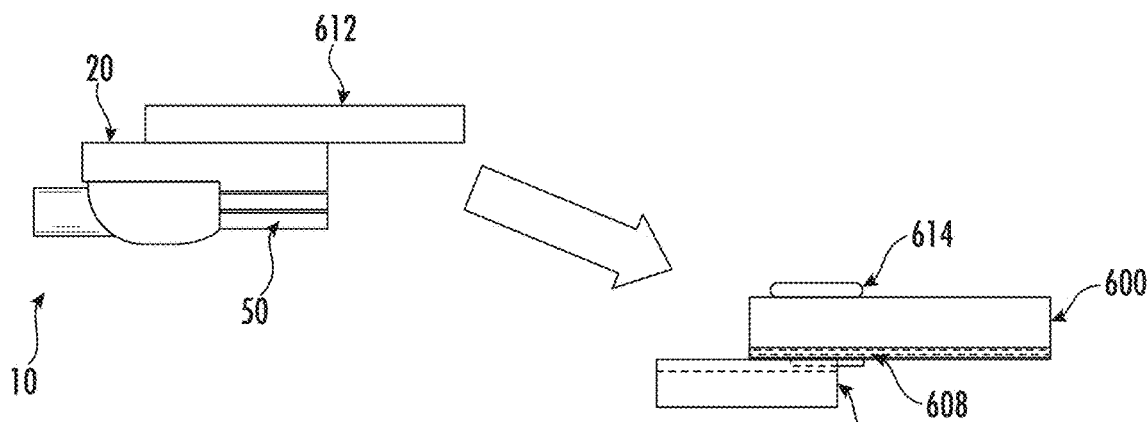
Figure 29C:
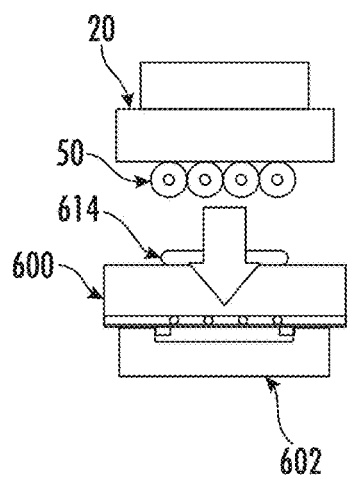
Figure 30A:
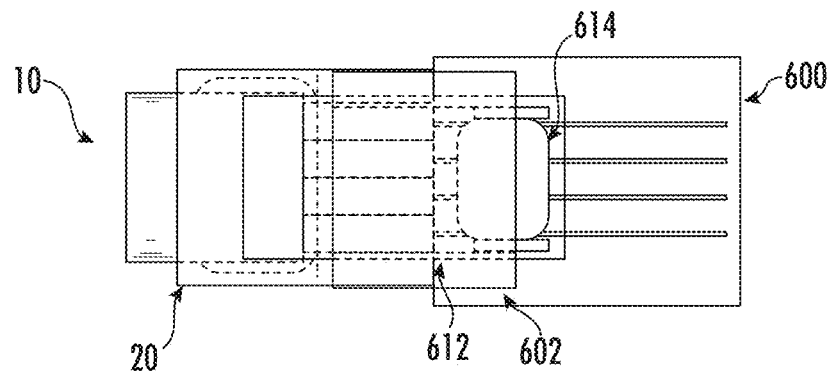
FIGS. 30A-30C illustrates top, side, and end views of the lidless FAU of FIGS. 29A-29C installed on the PIC substrate according to an example embodiment.
Figure 30B:
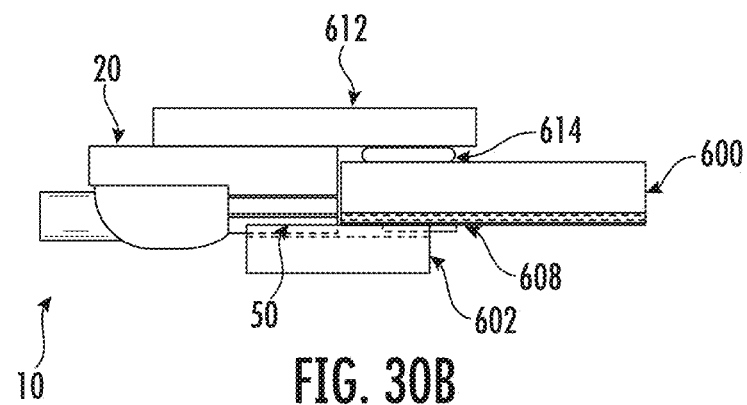
Figure 30C:
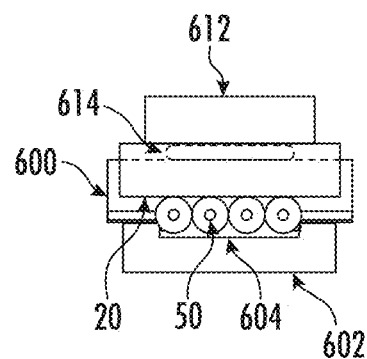
Figure 31:
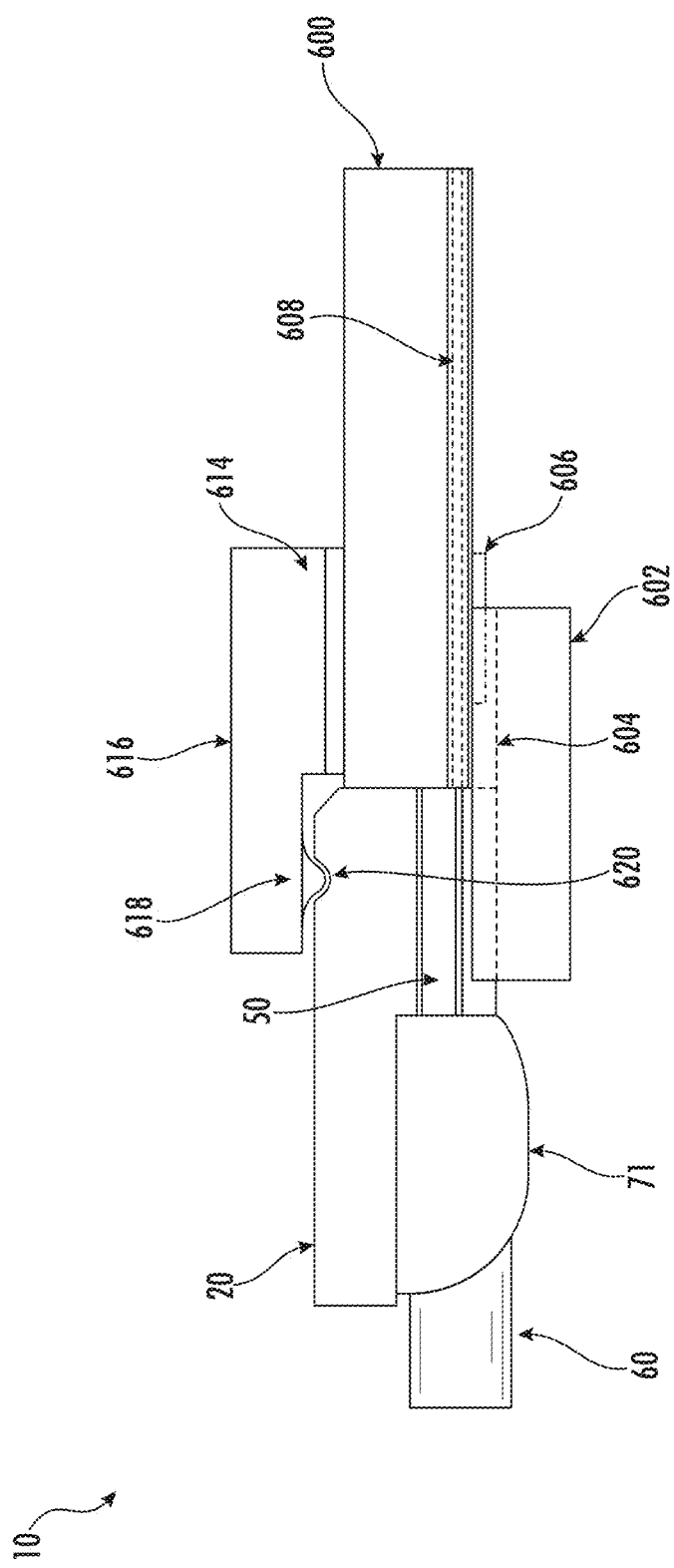
FIG. 31 illustrates and example lidless FAU installed onto a PIC substrate that includes a cap according to an example embodiment.

FIGS. 29A-29C depict top, side and end views of a passive alignment of signal-fiber array 50 of the lidless FAU 10, including the overlap sheet 612, to the waveguides 608 of the PIC substrate 600. As the lidless FAU 10 is inserted into the U-channel 604, the curved fiber sidewall profile of the signal-fiber array 50 may guide the signal-fiber array 50 into the U-channel 604. After passive alignment the lidless FAU 10 contacts the alignment substrate 602, such that the signal-fiber array 50 of the lidless FAU 10 is aligned by the U-channels 604 of the alignment substrate 602, as depicted in FIGS. 30A-30C. At least a portion of the overlap sheet 612 extends past a forward edge of the Lidless FAU, defined by the ends of the signal-fiber array 50, such that the portion of the overlap sheet 612 covers a portion of the PIC substrate 600. A layer of adhesive 614, such as UV-curable adhesive, may be applied between a bottom surface of the portion of the overlap sheet and a top surface of the portion of the PIC substrate 600, which may also be compressed during assembly. The adhesive 614 may also be applied in the U-channel of the alignment substrate 602, such that signal-fiber array 50 of the lidless FAU 10 is bonded to the alignment substrate, thereby providing additional strength to the assembly. UV exposure to the adhesive 614 assisted by the transparency of the support substrate 10 and overlap sheet 612.

In an example embodiment, a force may be applied to the top of the lidless FAU 10 to assist in retention of the lidless FAU 10 and maintain axial alignment of the signal-fiber array 50 with the waveguides 608. In the example depicted in FIG. 31, a cap 616 is disposed on a top surface of the PIC substrate 600. The cap 616 may extend from the PIC substrate over a portion of the alignment substrate 602 to form a receiving area. Similar to the overlap sheet 612, discussed in reference to FIGS. 29A-30C, the cap may be bonded to the top surface of the PIC substrate 600 by an adhesive 614. In some example embodiments, a retention feature may be disposed on one or both of the cap 616 and the support substrate 10 to resist removal of the lidless FAU from the U-channel 604. In the depicted embodiment, a protrusion feature 618 is disposed on the cap 616 that engages a mating depression 620 formed on a top surface of the support substrate 10.

Figure 32A:
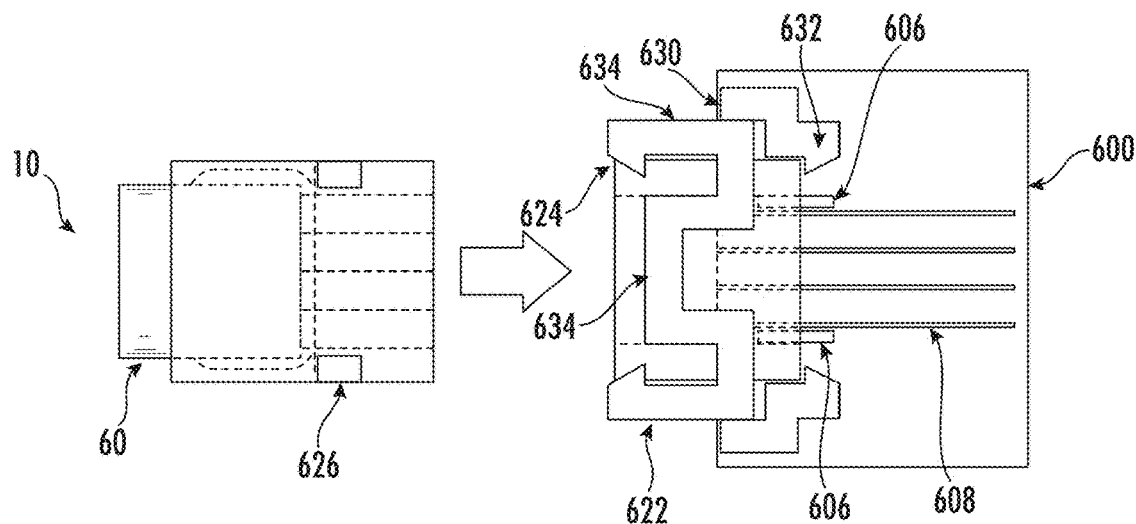
FIGS. 32A-32C illustrate top, side, and end views of installation of a lidless FAU including an to a PIC substrate that includes a retention clip according to an example embodiment.
Figure 32B:
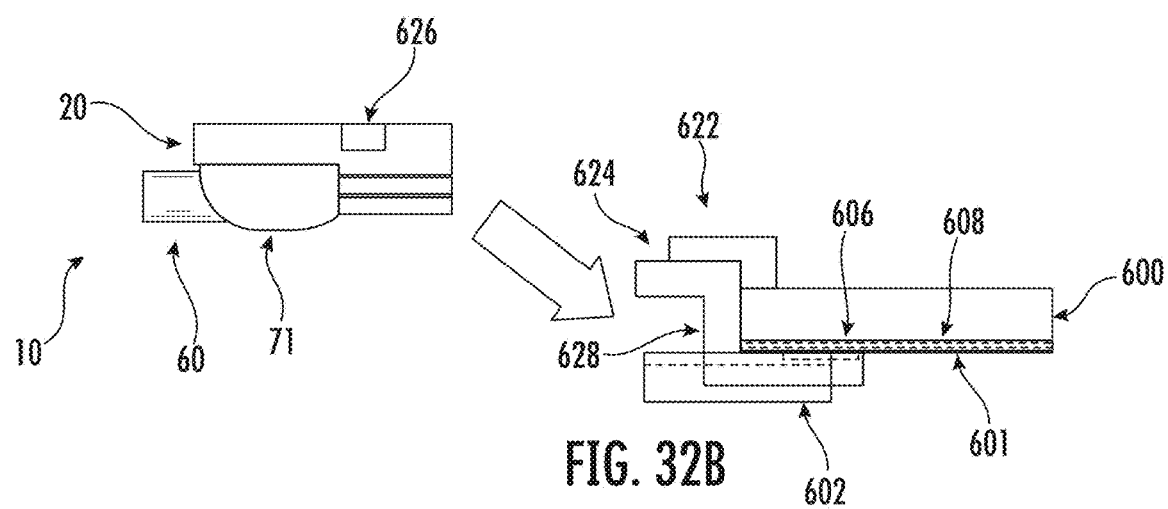
Figure 32C:
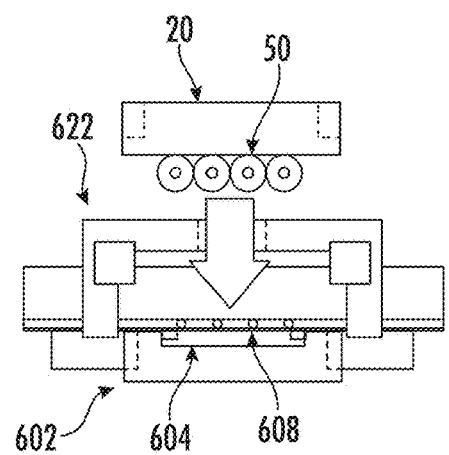

In another example embodiment depicted in FIGS. 32A-32C, the lidless FAU 10 may be retained using a clip 622 configured to wrap around the PIC substrate 600. The clip 622 may include a catch or grip feature 624, such as a projection or tab, configured to engage with retaining notch features 626 formed in the support substrate 10 of the lidless FAU 10. The notches 626 of the support substrate 10 may be formed using laser damage and etch processes or glass pressing or notch sawing processes.

Figure 33A:
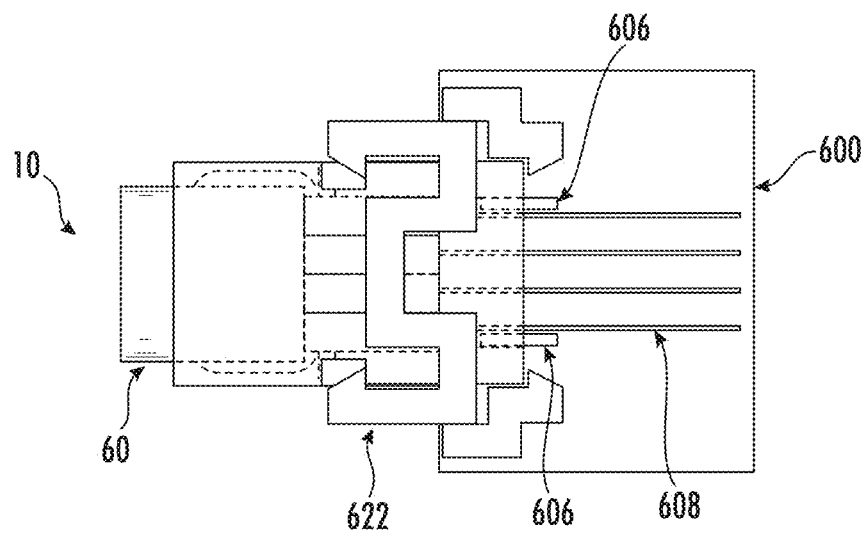
FIGS. 33A-33C illustrates top, side, and end views of the lidless FAU installed on the PIC substrate of FIGS. 32A-32C according to an example embodiment.
Figure 33B:
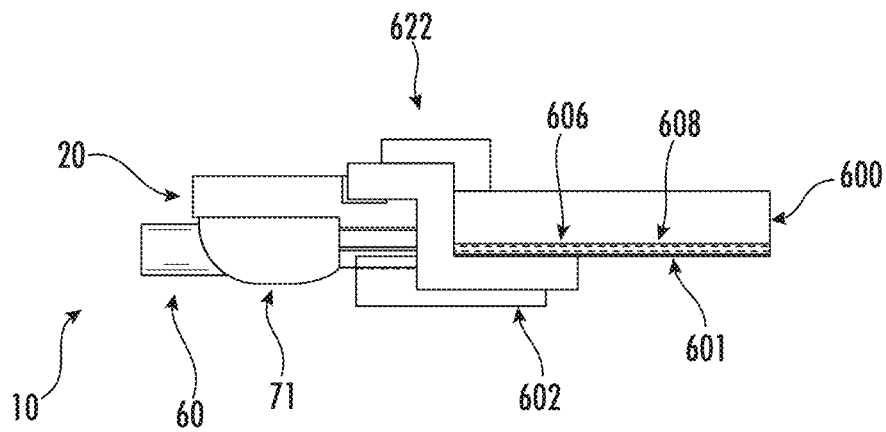
Figure 33C:
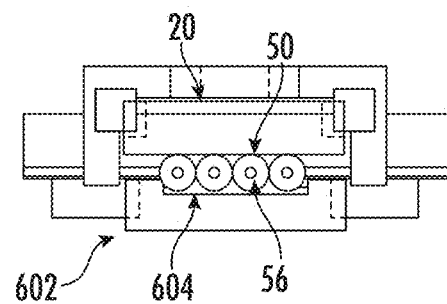

The clip 622 may be formed from metal, such as steel or aluminum or may be formed from plastic, such as an injection molded plastic. The clip 622 may include a vertical arm 628 extending across an edge of the PIC substrate from the top surface of the PIC substrate 600 to the PIC face 601. The vertical arm 628 may be configured to retain the clip 622 in contact with the PIC substrate 600. A fixture element 630 may extend from the vertical arm 628 and across a portion of the PIC face 610 and, in some embodiments, include a substrate catch 632 configured to engage a backside of the alignment substrate 602. A horizontal arm of the grip feature 634 may extend over a portion of the top surface of the PIC substrate 600, such that the clip wraps around the edge of the PIC substrate 600. The clip 622 may provide axial force to hold the signal-fiber array 50 of the lidless FAU 10 in contact with the waveguides 608 of the PIC substrate 600. The grip feature 634 may also extend outward from the edge of the PIC substrate 600. The grip feature 634 may be configured to provide a force to bias the support substrate 10 of the lidless FAU 10 toward the U-channel 604, similar to the cap 616 discussed in reference to FIG. 31. In an alternative embodiment, the clip 622 may be configured to engage a distal edge, or backside, of the support substrate 10 of the lidless FAU 10, which may eliminate a need to form notches 626 in the support substrate 10. FIGS. 33A-33C depict the lidless FAU 10 installed into the U-channel 604 and retained therein by the clip 622.

Figure 34A:
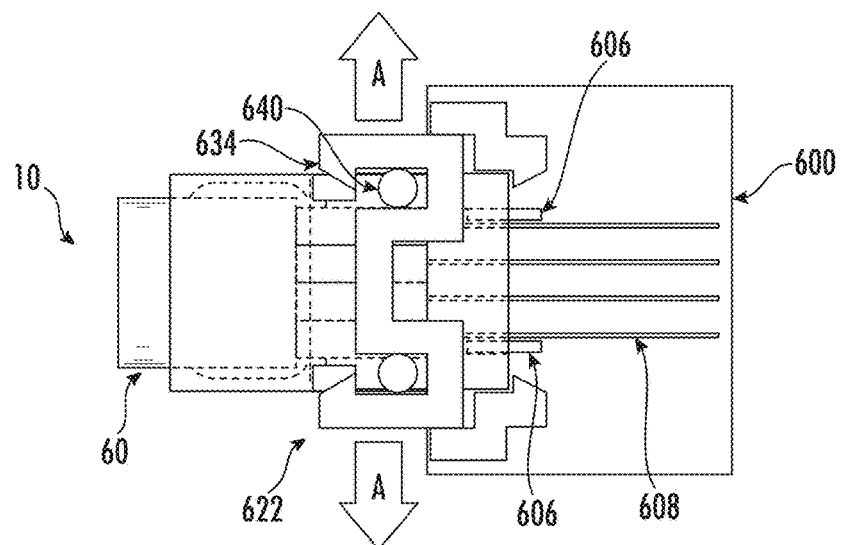
FIGS. 34A-34C illustrates top, side, and end views of a gripper tool engaging the lidless FAU installed on the PIC substrate of FIGS. 32A-32C according to an example embodiment.
Figure 34B:
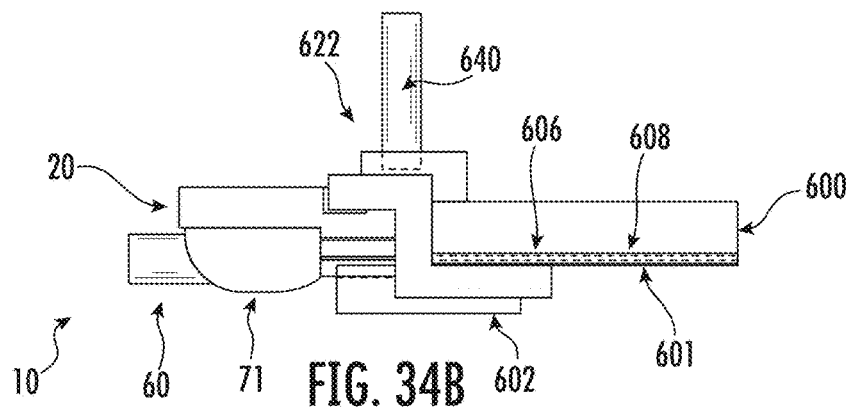
Figure 34C:
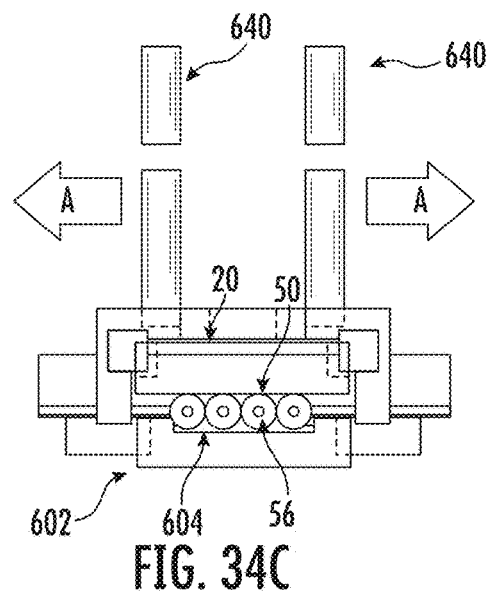

Turning to FIGS. 34A-34C, the clip 622 may be positioned, opened, and closed via a dual-arm tweezer-like actuator arm or "gripper" 640. The arms of gripper 640 may separate from each other, causing the jaws of the metal clip, e.g. grip features 634 to open, as depicted by arrow A. This allows the lidless FAU 10 to be inserted into the U-channel 604 and attached to the PIC substrate 600. The opened grip features 634 of the clip 622 may then engage the lidless FAU 10. As the arms of the gripper 640 are brought closer to each other the grip features 634 of the clip 622 may apply force on the lidless FAU 10 to force the signal-fiber array 50 into contact with the PIC substrate 600, or more particularly, the waveguides 608, and hold the lidless FAU 10 in position during subsequent product deployment.

The lidless FAU mounting discussed in reference to FIGS. 23-34C may enable optical interconnections to flip chip mounted optoelectronic components and PIC substrates after solder reflow processing, avoiding connector signal-fiber array shifts due to adhesive softening, and/or relaxing high temperature requirements on optical jumpers and connectors. Utilizing glass lidless squeeze FAU and glass alignment substrate that are CTE matched to silicon or other PIC substrate materials may minimize waveguide coupling misalignments in thermal cycling. The increased bonding area provided by embodiments including an overlap sheet, a cap or a clip may enable more mechanically robust interconnections than FAUs bonded to the PIC edge. Passive alignment of the lidless FAU to waveguides of the flip chip mounted PIC substrate may be provided by an alignment substrate that passively aligns to PIC face alignment features. The lidless FAU mounting may also enable high density optical interconnections to PIC substrates, on 125 μm fiber pitch for standard SMF fiber, and with smaller pitches possible using smaller cladding diameter fiber.

Large Array FAUs

When scaling fiber array squeeze assemblies for lidless or lidded FAUs large arrays (e.g., 24-96 fibers or larger) variations in fiber cladding diameters may accumulate as large fiber arrays are squeezed together. These accumulated variations in cladding diameter may lead to unacceptable fiber array core position errors. However, the core position error may be minimized during the fabrication of large array FAUs by optimizing the order of the optical fibers, and associated cladding variance prior to ribbonization.

Individual spools of single mode optical fiber (SMF) may be ribbonized to form a multifiber cable 60. A plurality of optical fibers 52 may be conducted side-by-side through a coating arrangement that surrounds the optical fibers with a material matrix and/or protective cable jacket 61. One such ribbonization process is disclosed in U.S. Pat. No. 5,486,378, entitled Method and Apparatus for Manufacturing an Optical Ribbon Conductor, filed on Aug. 11, 1993, which is incorporated herein in its entirety. Another example ribbonization process is disclosed in U.S. Pat. No. 10,175,436, entitled Optical Fiber Ribbons and Ribbon Matrix Materials having Low Oligamer Content, filed Jun. 15, 2016, which is also incorporated herein in its entirety.

Figure 35B:
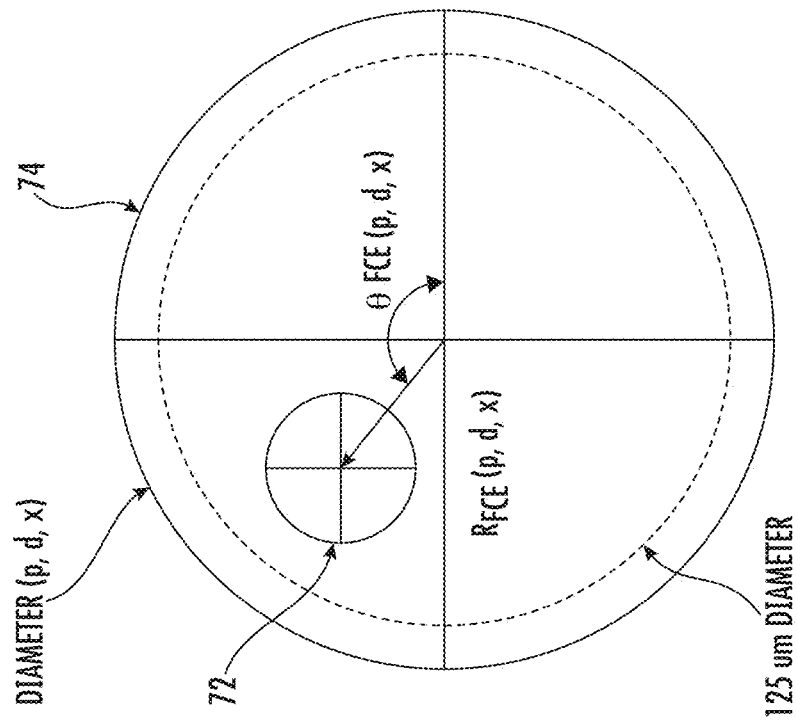
FIGS. 35A and 35B illustrate a comparison of an ideal optical fiber and an optical fiber with cladding diameter and core eccentricity variation according to an example embodiment.
Figure 35A:
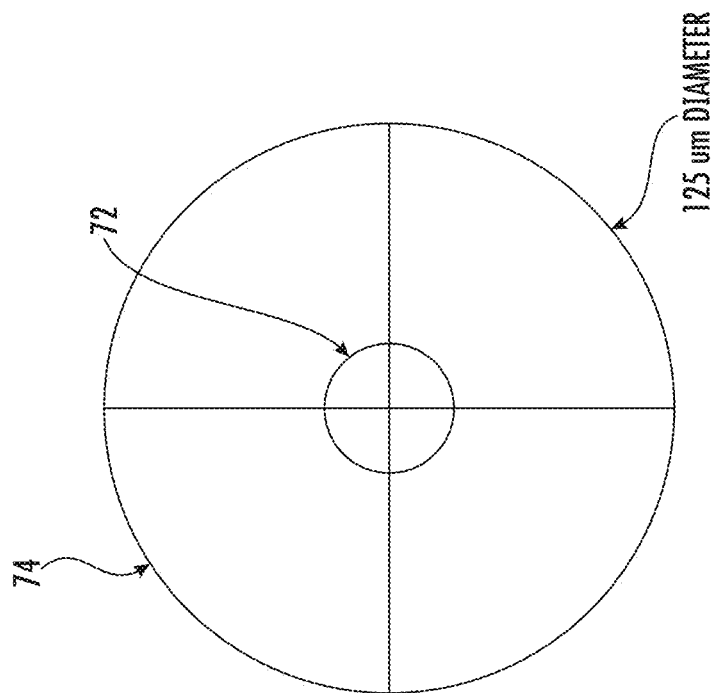

FIG. 35 illustrates a comparison of an ideal optical fiber 52 (A) and an optical fiber 52 (B) with core and cladding variation. In the ideal optical fiber 52 (A), the diameter of the cladding 74 is a perfect circle exactly 125 μm in diameter and the center of the core 72 is positioned in the geometric center of the optical fiber 52 (as defined by the shape of the cladding 74). However, core position and cladding diameter variations may be created as a function of the fiber draw preform geometry and draw conditions, resulting in the optical fiber 52 (B) having a variation in diameter and core center position. These variations may result in the center of the core 72 being offset from the geometric center of the optical fiber 52, creating what is commonly referred to as "core-to-cladding eccentricity" or "fiber core eccentricity" (FCE). The offset may be characterized by both direction and magnitude. The magnitude of FCE is commonly referred to as FCE error.

Regarding optical fiber cladding diameter variation, as the optical fiber 52 is drawn a control system that manages cladding diameter via tension control is typically able to control with a 1 sigma variation of 0.05 μm around a mean diameter of 125.0 μm. The diameter of the cladding 74 varies slowly along the length of the optical fiber 52, with peak-to-peak cyclic variations over relatively long fiber lengths (e.g., >10 meters). Some fiber preforms yield optical fibers 52 with periodic fiber upsets, where the diameter may increase in local areas by 0.3-0.5 μm. These upsets are characterized during the fiber draw process, with most spools having few to no upsets, and some spools having large numbers of upsets. The FAUs 10 discussed above utilize fiber spools with few or no upsets to increase the precision alignment of the cores 72 of the FAU to the waveguides 304 of the waveguide substrate 300. Fiber cladding diameter measurement systems on different fiber draw towers may experience variations in measured values due to variations in calibration. The calibration error may have a 1 sigma variation of 0.05 μm. In some example embodiments, this source of error may be eliminated by characterizing fiber cladding diameters immediately in advance of assembly of the FAU 10. Regarding core variation, fiber core eccentricity (FCE) may be approximately 0.1-0.2 μm, with a maximum of 0.5 μm based on screening measurements performed on the optical fibers 52. In some example embodiments, the spools of optical fiber 52 may enable a measurement of the diameter of the cladding 74 of the optical fiber 52 at either end of the spool. Additionally, in some embodiments, cladding measurements performed during the draw process may be available enabling an estimated average diameter of the cladding 74 for each spool of optical fiber 52. FCE may also be considered and may be added as a shift to the position of the core 72 after the diameter variations of the optical fiber have been determined. For example the FCE of an optical fiber may be measured, such as by imaging an end face 56 of the optical fiber 52 and performing a sub-micron inferential measurement, and the value of FCE applied to the length of the optical fiber 52.

FIG. 36 shows a comparison of a first FAU 10 (A) fabricated with a signal-fiber array 50 including optical fibers 52 having a uniform diameter and a second FAU 10 (B) fabricated with a signal-fiber array 50 that has realistic variations in the diameter of the optical fibers 52. FIG. 36 also includes a grid overlay 80 with crosshatches 81 representing the target fiber core center positions ("ideal fiber core positions") along a straight line with pitch (P). As may be seen in relation to the first FAU 10 (A), the grid overlay 80 and the ideal core positions represented by crosshatches 81 are based on ideal optical fibers 52 (A) (see FIG. 3) being arranged side-by-side in an array. There is no fiber core position error in that ideal situation. For the second FAU 10 (B) that includes realistic variations in the diameter of the optical fibers 52, fiber core position error is determined by first positioning the grid overlay 80 mathematically, such that the grid overlay 80 is centered on the midpoint of a line extending between the centers of the cores 72 of the two outboard optical fibers 52.

Figure 37:
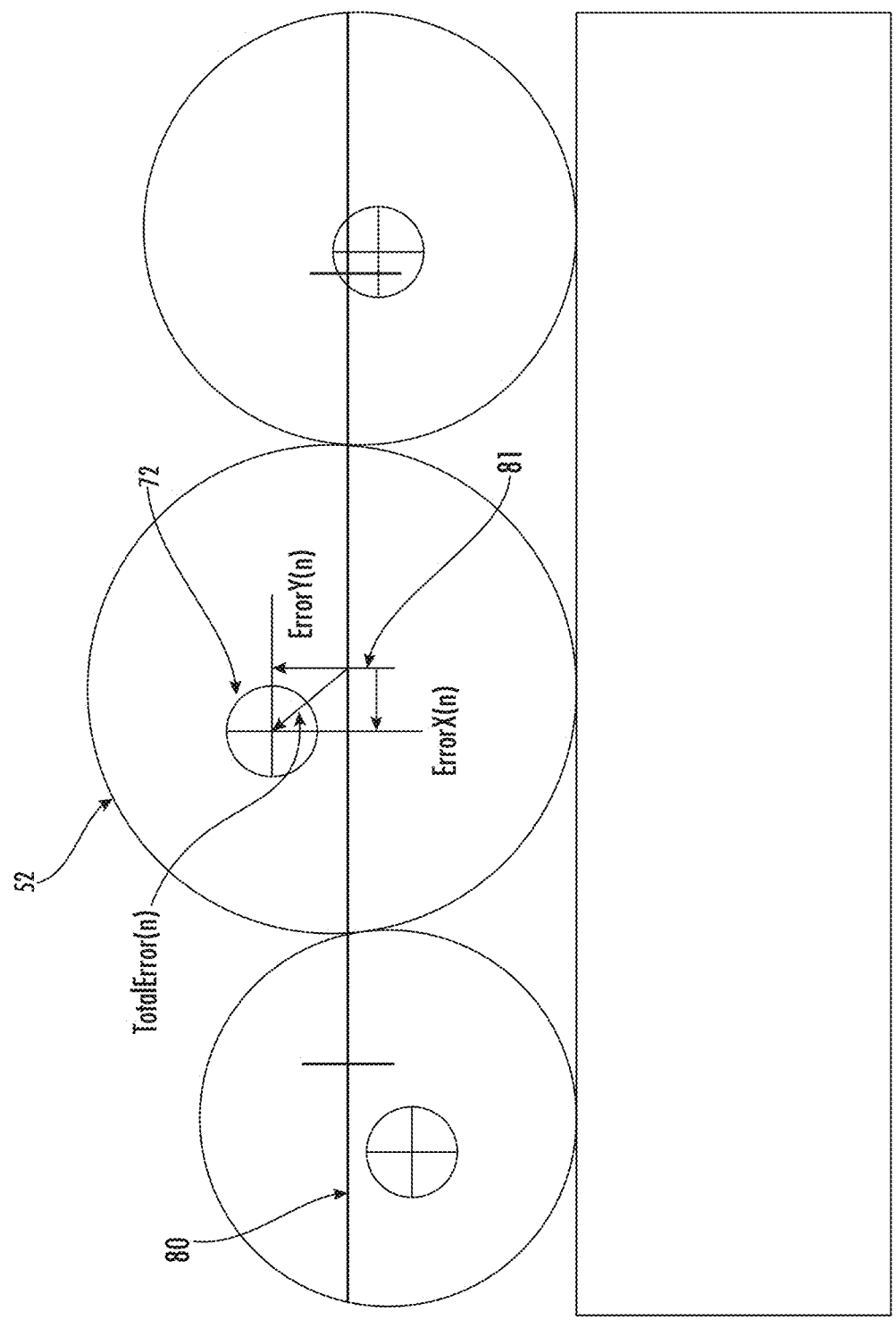
FIG. 37 illustrates a determination of fiber core position error according to an example embodiment.

With the grid overlay 80 in position, the fiber core position error may be determined by measuring the distance between a given center of the core 72 of the optical fiber 52 and a corresponding ideal grid crosshatch 81, as shown in FIG. 37. The fiber core position (FCP) error may be found using EQN. 2

Equation 2

$$\text{FCP Error} = (\text{Error } X^2 + \text{Error } Y^2)^{1/2} \quad (2)$$

where Error X is distance between the center of the core 72 of the optical fiber 52 and the corresponding crosshatch 81 of the grid overlay 80 measured parallel to the X-axis; Error Y is distance between the center of the core 72 of the optical fiber 52 and the corresponding crosshatch 81 of the grid overlay 80 measured parallel to the Y-axis; and FCP Error is center of the core 72 of the optical fiber 52 and the corresponding crosshatch 81 of the grid overlay 80 measured along the straight line path between them.

Figure 38:
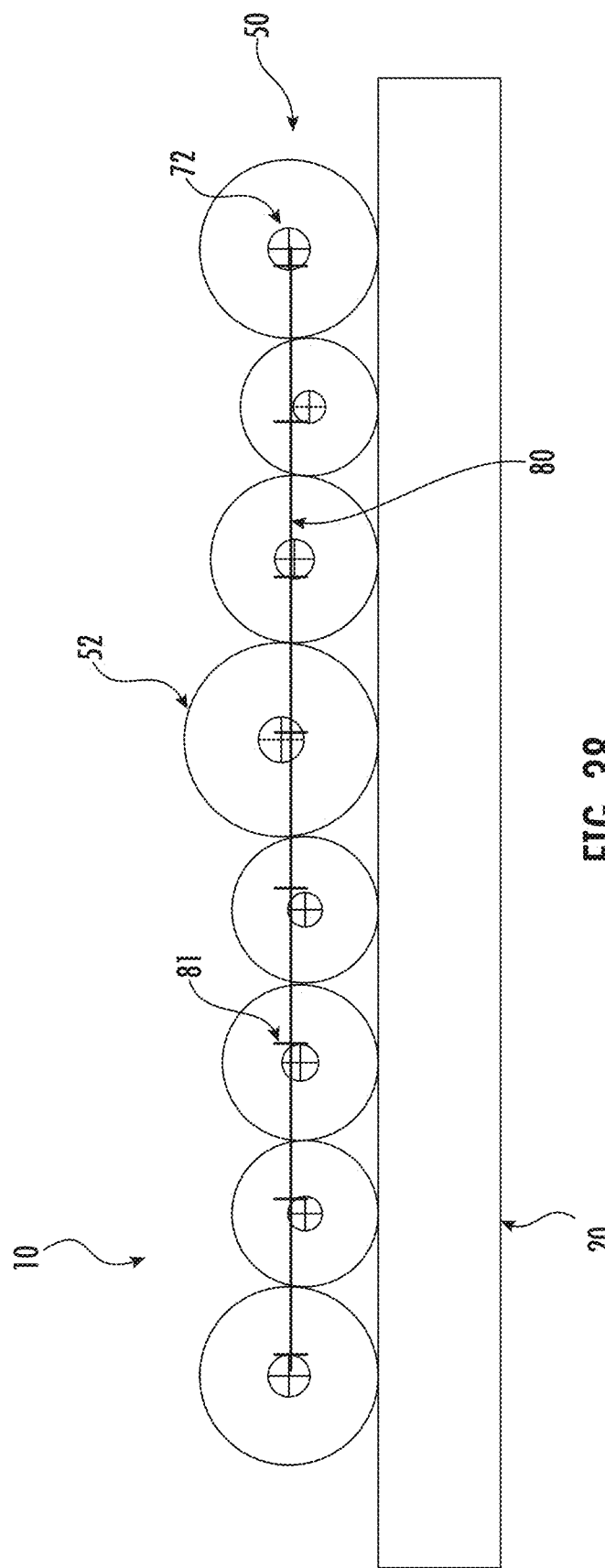
FIG. 38 illustrates an example FAU including eight randomly selected optical fibers according to an example embodiment.

The signal-fiber array 50 of the FAU 10 may have different numbers of optical fibers 52 including, but not limited to, eight (8), sixteen (16), thirty-two (32), forty-eight (48), seventy-two (72), or ninety-six (96) optical fibers 52 to provide different sizes. FIG. 38 illustrates an example FAU 10 including 8 optical fibers 52. For each size the signal-fiber array 50, the desired number of optical fibers 52 (e.g., N optical fibers 52) may be selected at random from a large pool of optical fibers 52 with statistical estimates for a diameter variation of the cladding 74. The optical fibers 52 may be arranged in random order on a support substrate 20 with each optical fiber 52 making contact with a neighboring optical fiber 52 at the datum contact 101, as discussed above.

Figure 39:
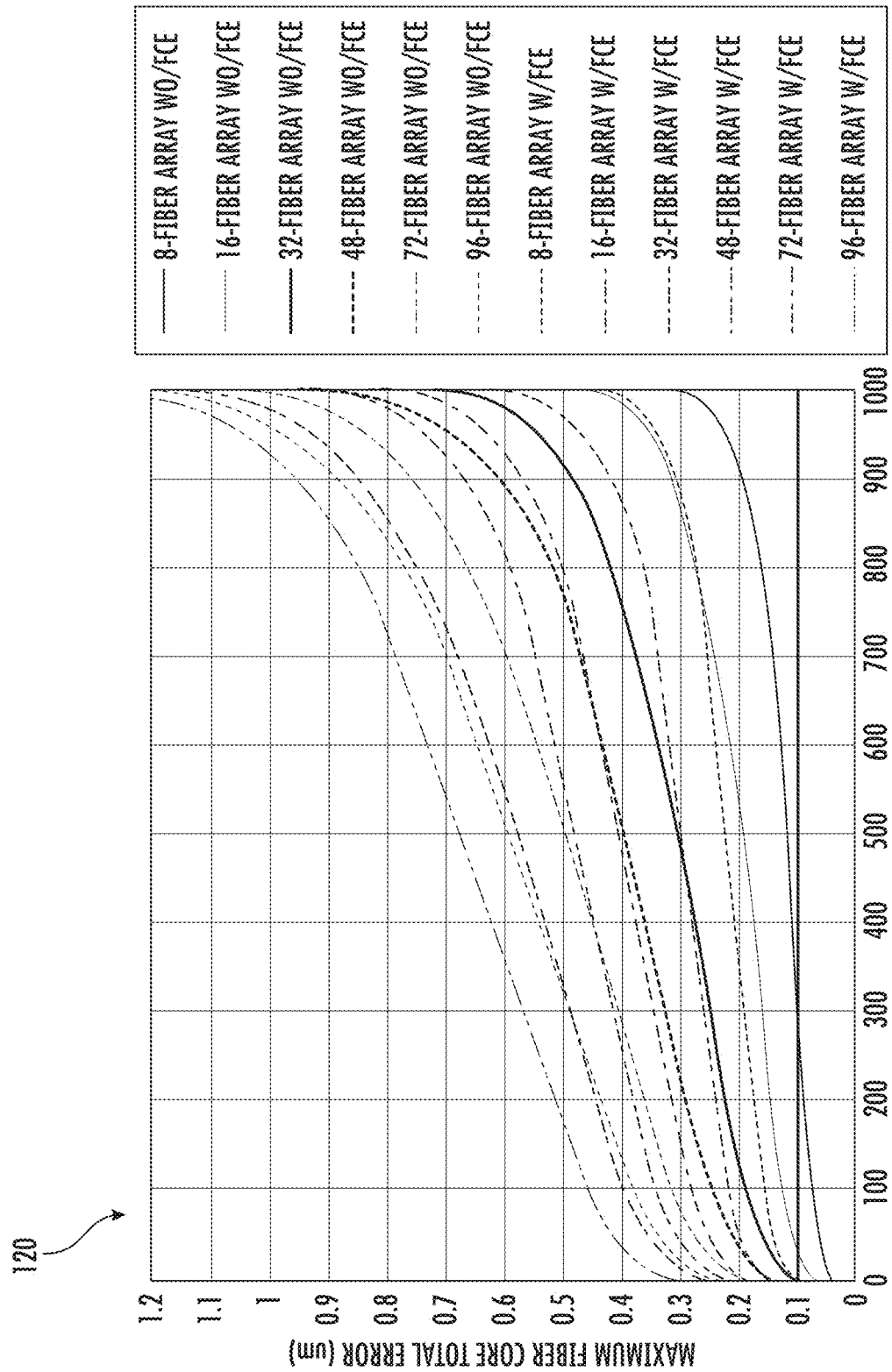
FIG. 39 illustrates a data plot of one thousand random FAU configurations for different signal-fiber array sizes according to an example embodiment.

FIG. 39 illustrates a data plot 120 of one thousand (1000) random FAU 10 configurations for different signal-fiber array sizes including eight (8), sixteen (16), thirty-two (32), forty-eight (48), seventy-two (72), or ninety-six (96) optical fibers 52. The data plot 120 includes the maximum fiber core position error on the Y axis and the FAU configuration number on the X axis. The FAU configurations have been sorted from lowest to highest maximum fiber core position error. As the size of the signal-fiber array 50 increases, the maximum fiber core position error also increases. The maximum fiber core position error when FCE included is larger than the maximum fiber core position error for optical fibers without FCE consideration.

The data plot 120 may also be used to generate a statistical estimate for process yield. For example, the plot shows that 90% of the simulated values for maximum fiber core position error were less than or equal to 0.57 μm for a 32-fiber array with FCE considered. The data plot 120 may also be used to construct a plot of maximum fiber core position error vs. size of the signal-fiber array 50 for a given target process yield. For example, at 90% yield the following curve fit was generated based on EQN. 3.

Equation 3

$$\text{Maximum fiber core position error (μm)} = 0.0579 * N^{0.6052} + \sigma_{FCE} \quad (3)$$

Figure 40:
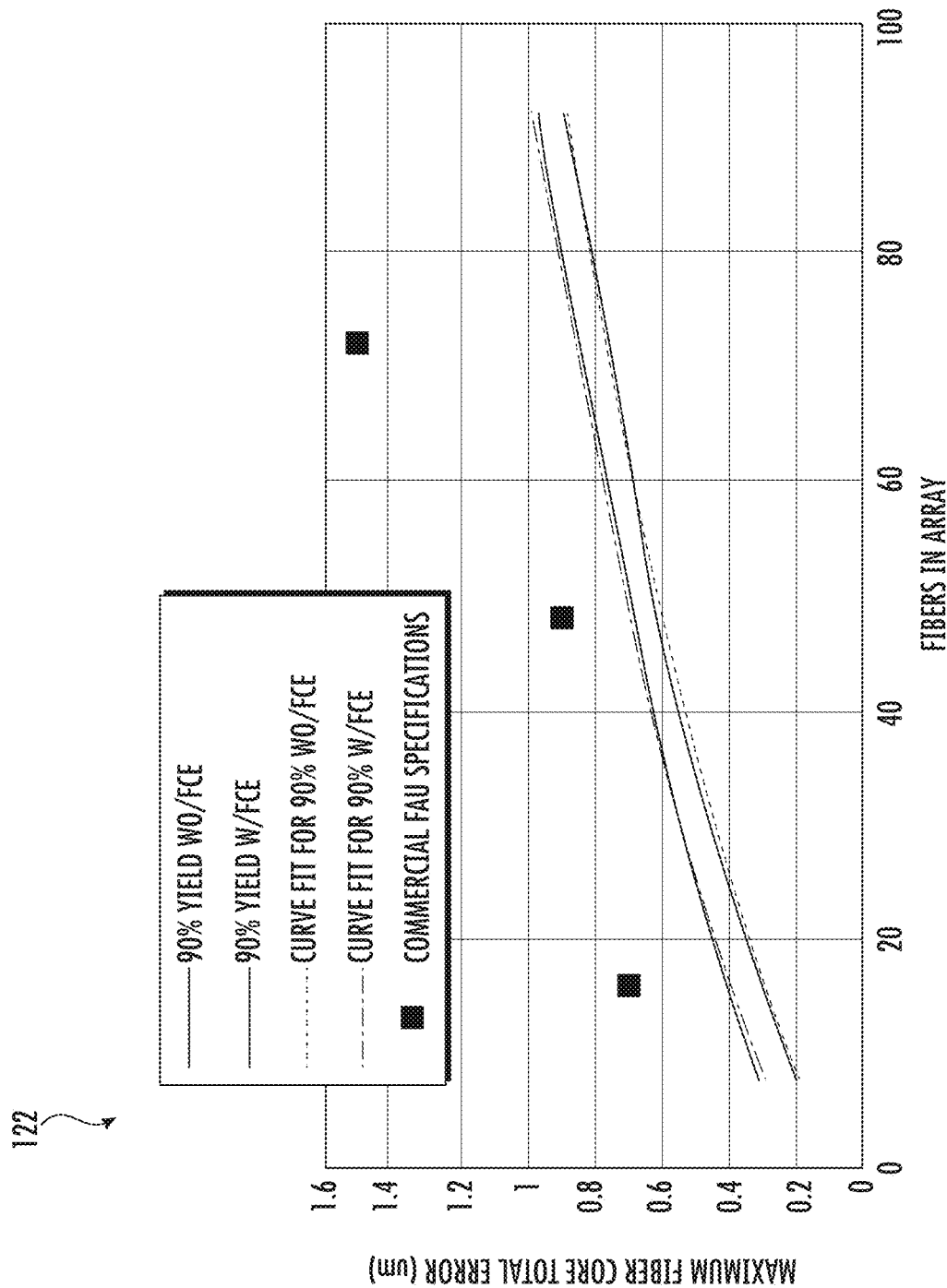
FIG. 40 illustrates a data plot of maximum fiber core total error versus the size of the signal-fiber array according to an example embodiment.

FIG. 40 provides a data plot 122 of maximum fiber core position error on the Y axis vs. size of the signal-fiber array 50 for 90% target process yield. The data plot 122 enables rapid estimation of maximum fiber core position error for a range of sizes of the signal-fiber array 50. The figure also shows commercial FAU specifications as black squares.

Additionally, the data plot indicates that lidless FAUs 10 may be fabricated with maximum fiber core position errors that are less than or comparable to maximum fiber core position errors associated with typical V-groove-based FAUs.

Changes to the orderings of the same N optical fibers 52 in a signal-fiber array 50 may yield different values for maximum fiber core position error. In an example embodiment, a method is provided to identify specific optimal orderings of the optical fibers 52 that reduces the maximum fiber core position error. The optical fibers 52 may be prepared for ribbonization in a specific order that minimizes the maximum fiber core position error across the signal-fiber array 50.

Figure 41:
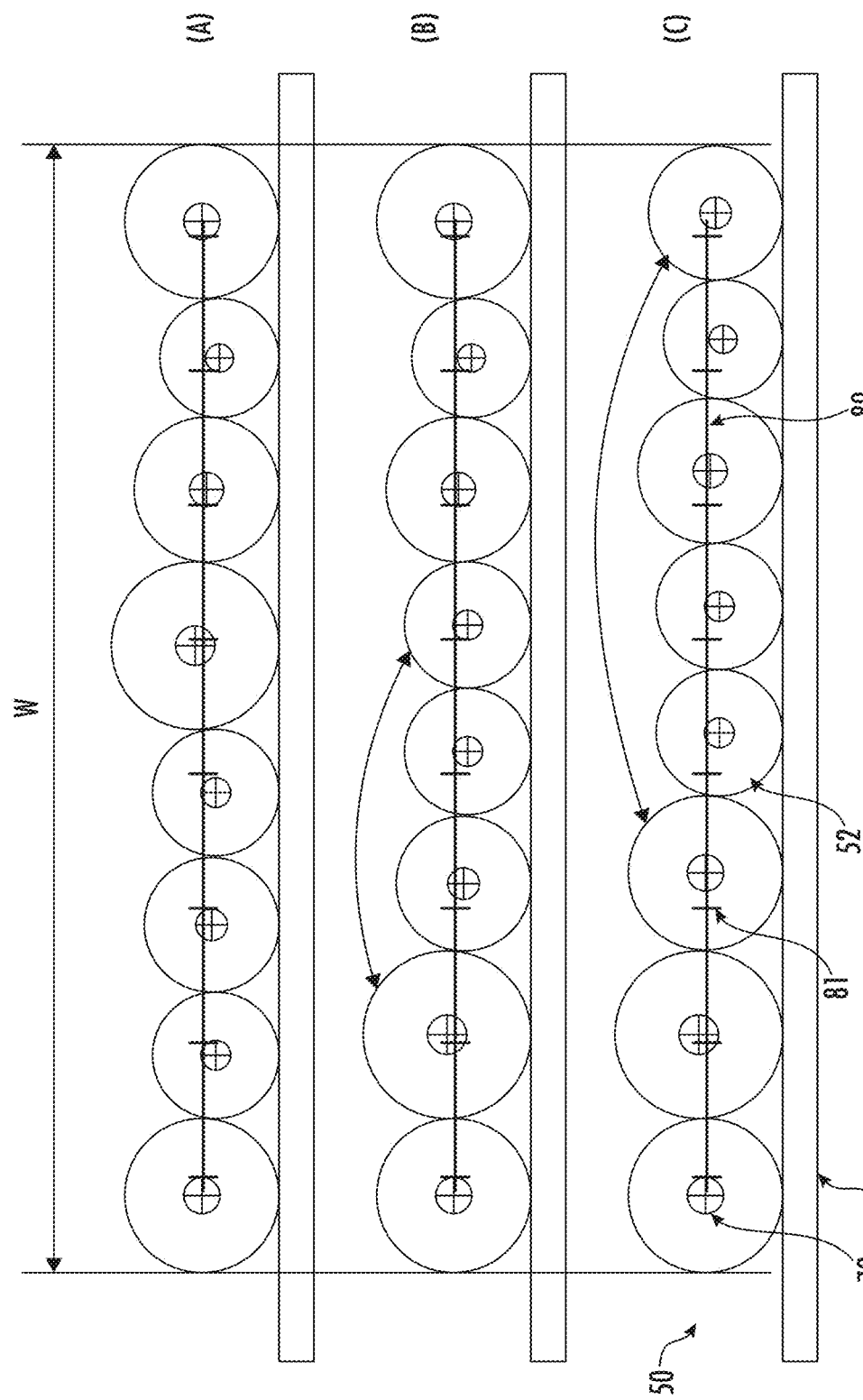
FIG. 41 illustrates iterations of an algorithm that randomly swaps two optical fibers in a signal-fiber array to determine an optical fiber order that minimizes the maximum fiber core total error according to an example embodiment.

FIG. 41 illustrates iterations of an algorithm that randomly swaps two (2) optical fibers 52 in the signal-fiber array 50, assesses the maximum fiber core position error, and logs preferred orderings of the optical fibers 52 that yield low values for maximum fiber core position error. These preferred orderings of optical fibers 52 may be used to seed subsequent algorithm runs, allowing the algorithm to converge on optimal ordering configuration of the optical fibers 52 of the signal-fiber array 50.

Prior to coloring and ribbonization of the optical fibers 52, measurements of diameter of the cladding 74 of the optical fibers 52 is performed on a set of N fibers that will eventually be fabricated into a ribbonized multifiber cable 60 and then a signal-fiber array 50 of an FAU 10. In one variant of the algorithm, the N fibers are treated as a closed group or set. Prior to making a decision on fiber ribbon position and corresponding fiber color, the algorithm is executed to determine the optimal fiber ordering in the fiber ribbon.

The algorithm starts with a random ordering of optical fibers, such as the 8-fiber array showing in iteration A of FIG. 41. The algorithm determines the position of the cores 72 of the optical fibers 52 of the signal-fiber array 50 (assuming no FCE) and then estimates the maximum fiber core total error for the configuration.

Next at iteration B, two of the optical fibers 52 are selected at random and their positions are swapped in the signal-fiber array 50. The resulting configuration may then be assessed for maximum fiber core total error. The random swapping of fibers is continued through iteration C for a predetermined number (P) of swaps (for example P=100). The results for maximum fiber core position error for the P swap configurations may then be evaluated. The configuration of optical fibers 52 with the lowest maximum fiber core position error may then be selected as the seed configuration for the next round of P swap configurations. The method continues until there are Q trials of P swap configurations, where, for example, Q=10. The configuration from Q trials of P swap configurations with the best (e.g. lowest) overall maximum fiber core total error may be selected for ribbonization. The total physical width (W) of the signal-fiber array may be substantially unchanged by the various fiber swap configurations.

Figure 42:
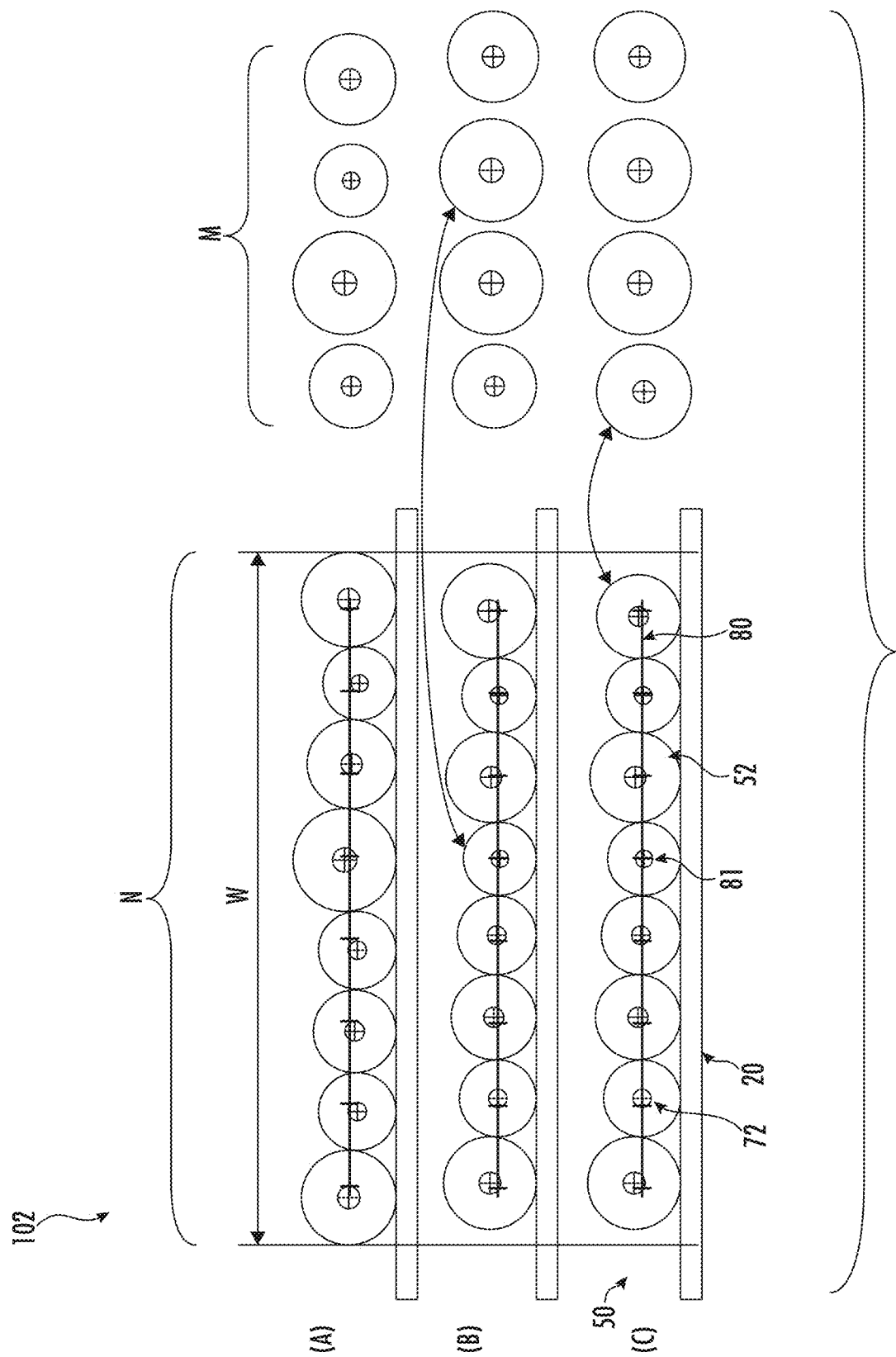
FIG. 42 depicts iterations of an algorithm that randomly swaps two optical fibers in a signal-fiber array and a pool of optical fibers to determine an optical fiber order that minimizes the maximum fiber core total error according to an example embodiment.

Additionally or alternatively, the method may determine an optimal order of the optical fibers 52 of the signal-fiber array 50 by swapping between the set of N randomly selected optical fibers 52, and a set of M additional optical fibers 52 with the similar diameter distribution of the cladding 74 that serve as a pool of available optical fibers for the signal-fiber array 50. The method including swapping optical fibers between set N and additional set M of optical fibers 52 is illustrated in FIG. 42. Swapping of optical fibers 52 between set N and additional set M may reduce of maximum fiber core position error by about 3x as compared to the ordering over the closed set of N optical fibers 52. The swapping of optical fibers between set N and additional set M may enable additional control over the width W of groups of N optical fibers, so that the signal-fiber array 50 of N optical fibers 52 may have a width W that is extremely close to the ideal case (e.g., N*mean fiber cladding diameter for an signal-fiber array 50 having N optical fibers 52).

Iteration A of FIG. 42 depicts an initial random configuration of the optical fibers 52 of the signal-fiber array 50 and the set of M additional optical fibers 52. Iteration B of FIG. 42 illustrates the results of a swap of an optical fiber 52 of the signal-fiber array 50 and the set of M additional optical fibers. The width W of the signal-fiber array 50 is reduced, since a larger optical fiber 52 in the signal-fiber array 50 was swapped with a smaller optical fiber 52 from the set of M optical fibers 52.

After each swap of a pair of optical fibers 52, the maximum fiber core position error is determined. Additionally, the total width of the signal-fiber array 50 may also be determined. The algorithm may continue iterations, such as iteration C, to determine a configuration where the total width of the signal-fiber array 50 is within c of the target value (e.g., N*mean fiber cladding diameter) and the maximum fiber core position error is at a minimum. The algorithm may track of all configuration of the optical fibers 52 and store a configuration of optical fibers 52 that provides the lowest maximum fiber core position error. If a subsequent swap of the optical fibers 52 results in a signal-fiber array 50 with a width W within c of the target value and the maximum fiber core position error is lower than previously stored value, the new configuration and corresponding properties are stored. At the completion of the iterations, the stored configuration of the optical fibers 52 may have a width W of the signal-fiber array 50 that substantially equal to the target value, and a comparatively low maximum fiber core position error.

The algorithm may also be applied to practical fiber ribbonization situations, such as where the optical fibers 52 in their spools have been colored. In this example, for a signal-fiber array having N optical fibers 52, there are effectively N fiber pools (one pool for each fiber color) and swapping between the signal-fiber array and a pool of optical fibers, or set M additional optical fibers is limited to fibers of the same color. The algorithm may be executed multiple times to generate multiple configurations of signal-fiber arrays having N optical fibers 52, with the set M optical fiber spools replenished with additional data on colored fiber cladding diameter as additional spools of optical fiber 52 become available.

Figure 43:
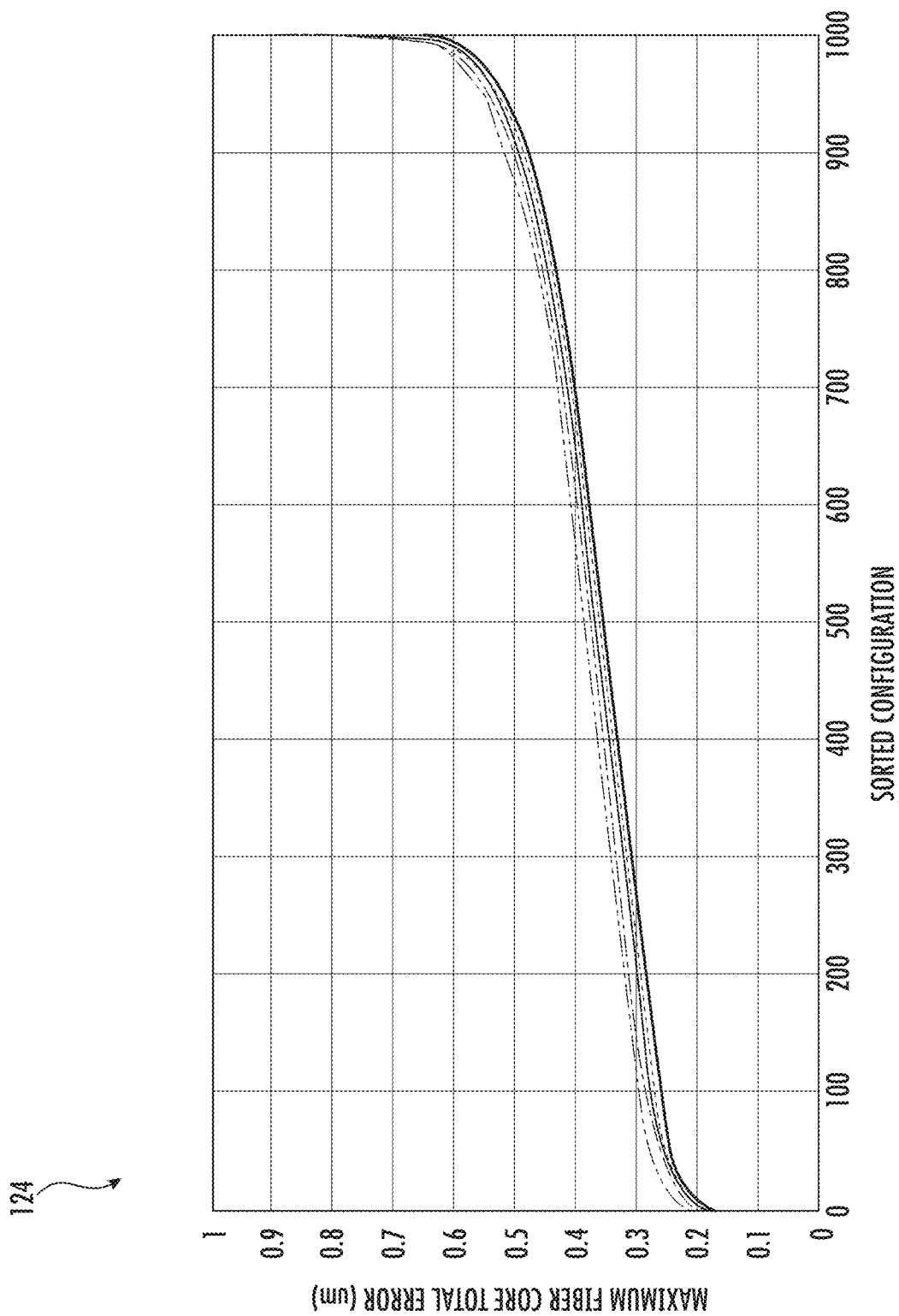
FIG. 43 illustrates a data plot for a signal-fiber array including thirty-two optical fiber fabricated from two multifiber cables each including sixteen optical fibers according to an example embodiment.

In some example embodiments, an FAU 10 may be fabricated using a plurality of multifiber cables 60. The signal-fiber array 50 of the FAU 10 may include interdigitated optical fibers 52 from the plurality of multifiber cables 60. FIG. 43 illustrates a data plot 124 for a signal-fiber array including thirty-two (32) optical fiber 52 fabricated from two (2) multifiber cables 60 each including sixteen (16) optical fibers 52. The data plot 124 indicates that the benefits of ordering the optical fibers 52 to minimize the maximum fiber core position error for fabrication of signal-fiber arrays 50 with sixteen (16) optical fiber 52 are preserved when interdigitating optical fibers 52 of two (2) multifiber cables 60 to create an FAU 10 including thirty-two (32) optical fibers 52.

In the data plot 124, a first set of sixteen (16) optical fibers 52 is chosen. The algorithm is then executed to determine an optical fiber 52 ordering that minimizes the maximum fiber core position error. The process is repeated for a second set of sixteen (16) randomly selected optical fibers 52, yielding two (2) sets of sixteen (16) optical fibers 52 that each have a fiber ordering that minimizes the maximum fiber core total error.

In some example embodiments, the fiber cladding diameter variation and FCE variation along lengths of the optical fibers 52 on spools feeding the fiber ribbonization process may also be considered. For example, using the two (2) sets of sixteen (16) optical fibers 52, a plurality of simulations, for example 1000 simulations, may be run imposing variations in diameter of the cladding 74 of the optical fiber 52 along the length of the optical fiber. Fiber cladding diameter variation simulations may address the practical problem of only knowing the start and end diameter of the cladding 74 of the optical fiber 52 on a spool. Additionally, simulations of random FCE of the optical fiber may be applied along the length of the optical fiber 52. For each simulation, the two (2) sets of sixteen (16) optical fibers 52 are interdigitated to in an FAU 10 having a signal-fiber array 50 with thirty-two (32) optical fibers 52.

For each of the 1000 configurations the two (2) sets of sixteen (16) optical fibers 52 for the signal-fiber array 50 having two (2) sets of sixteen (16) optical fibers 52 the maximum fiber core total error is calculated. The one thousand (1000) values of maximum fiber core total error may be sorted from lowest to highest to generate a data plot, such as data plot 124. Data plot 124 shows ten (10) curves with similar performance. The data plot 124 indicates that based on fiber cladding diameter error accumulation, around 90% of all fabricated multifiber cables, or fiber ribbons, have a maximum fiber core total error of less than about 0.52 µm.

In an example embodiment, an FAU may be fabricated using a side-by-side concatenation of order optimized optical fiber sets. For example, an FAU 10 may be fabricated including seventy-two (72) optical fibers 52 comprised of three (3) interdigitated groups of two (2) sets of twelve (12) optical fibers 52.

Figure 44:
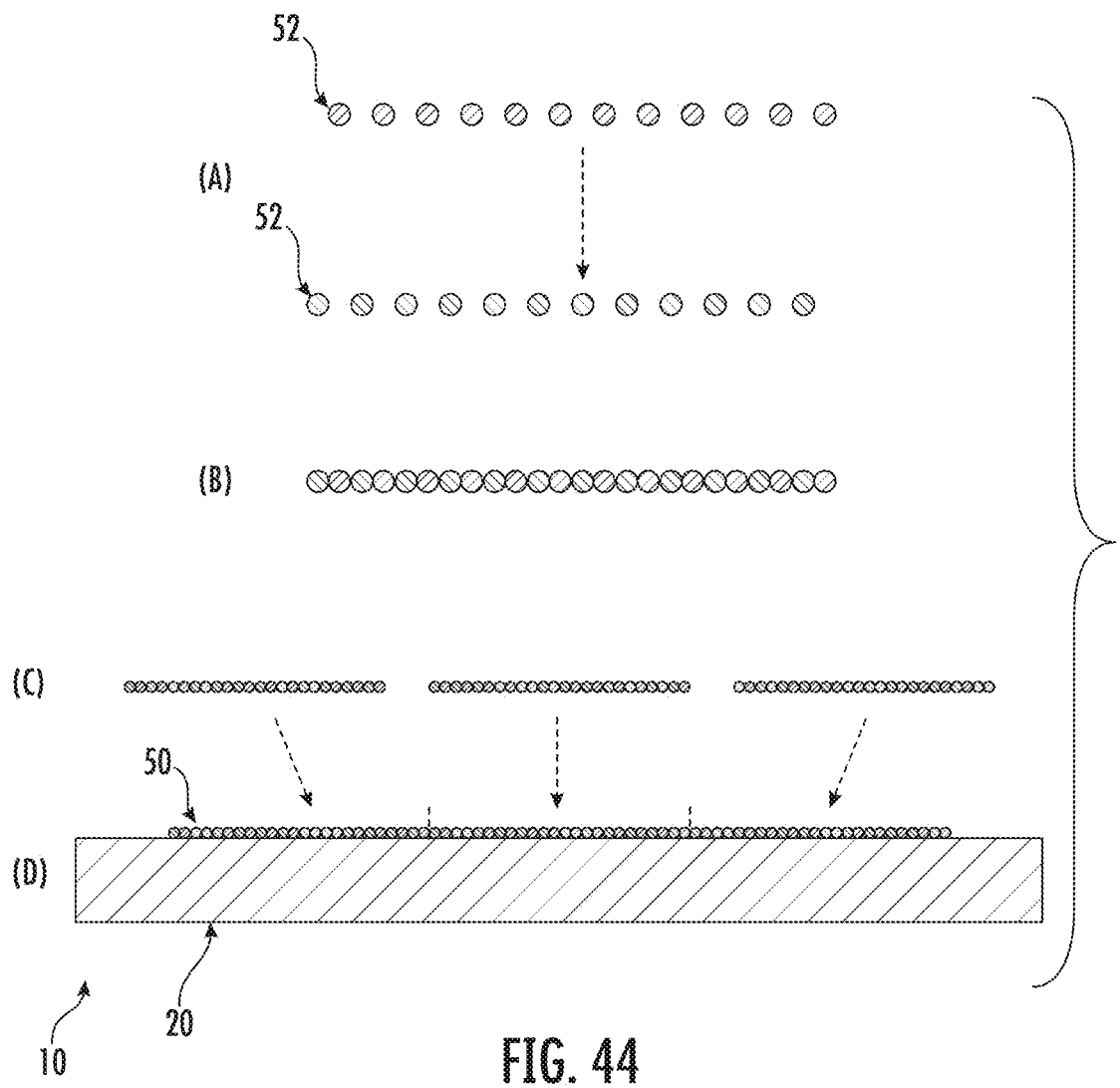
FIG. 44 illustrates a fabrication process for a signal-fiber array including thirty-two optical fiber formed from two multifiber cables each including sixteen optical fibers according to an example embodiment.

As shown in FIG. 44 in step A to step B, a first set of twelve (12) optical fibers 52 may be interdigitated with a second set of twelve (12) optical fibers 52 to for an interdigitated group of twenty-four (24) optical fibers 52. Both the first and second sets of twelve (12) optical fibers 52 may have a been ordered to minimize maximum fiber core total error, as described above. At step C to step D, three (3) interdigitated groups of two (2) sets of twelve (12) optical fibers 52 may be positioned on the support substrate 20. In an example embodiment, the optical fibers 52 disposed at the adjacent edges of the interdigitated groups may be in direct contact with each other, such as at datum surface 104. The lidless FAU squeeze process, as discussed above in reference to FIGS. 2-10B, may be used to fix the optical fibers 52 to the support substrate 20. Using the 72-fiber interdigitated array approach shown in FIG. 44 with optimal ordering of fibers in each of the sets of twelve (12) optical fibers 52 may reduce the maximum fiber core total error by, for example 15-40% compared to an FAU 10 including seventy-two (72) optical fibers 52 selected randomly.

Figure 45:
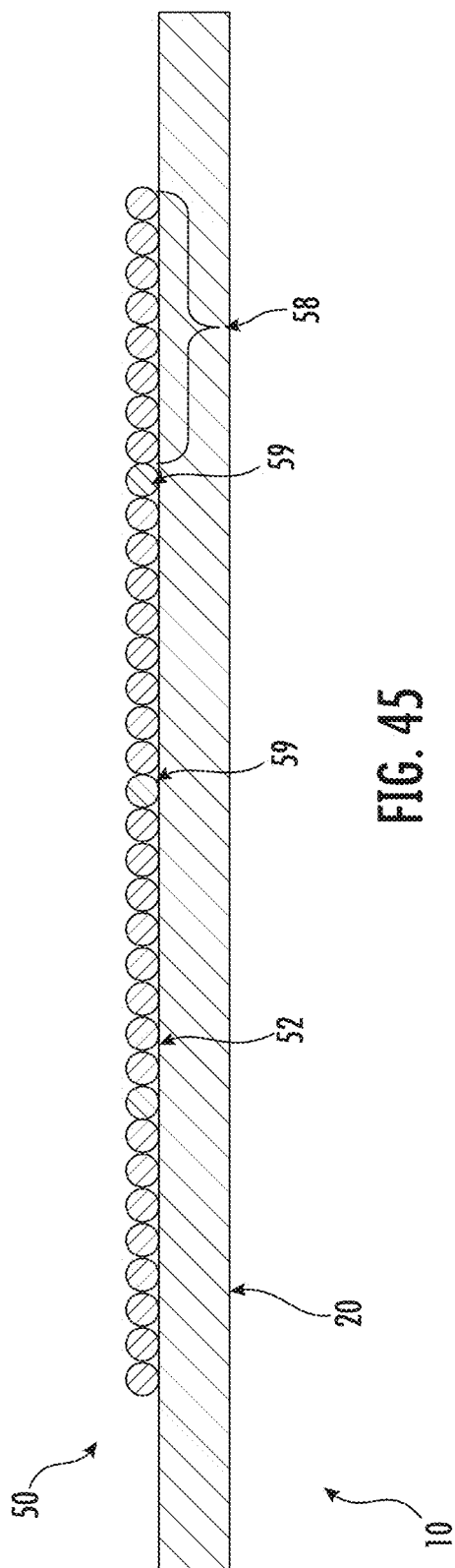
FIG. 45 illustrates FAU including a signal-fiber array formed from a plurality of fiber array groups with spacer fibers between the fiber array groups according to an example embodiment.

FIG. 45 illustrates and example embodiment, in which the signal-fiber array 50 of the FAU 10 may be formed from a plurality of fiber array groups 58 of N optical fibers 52. The maximum fiber core total error may be minimized by measuring the diameter of the cladding 74 of the optical fibers 52 for each optical fiber 52 in each group of N optical fibers 52 that form a fiber array group 58. When the fiber array groups 58 are arranged on the support substrate 20, the total width of the signal-fiber array 50 may be estimated.

As larger signal-fiber arrays 50 are constructed by concatenating fiber array groups 58, the accumulation of fiber core position error may be adjusted for by adding spacer fibers 59 between the fiber array groups 58. The spacer fibers 59 may be fabricated with non-standard fiber cladding diameters that may be either larger or smaller than the mean fiber cladding diameter. Based on the magnitude of the width correction along the signal-fiber array 50, a specific spacer fiber 59 may be selected and positioned between fiber array groups 58 to bring the cores 72 of the optical fibers 52 of the fiber array groups 58 back into alignment with the target pitch of the signal-fiber array 50.

Figure 46:
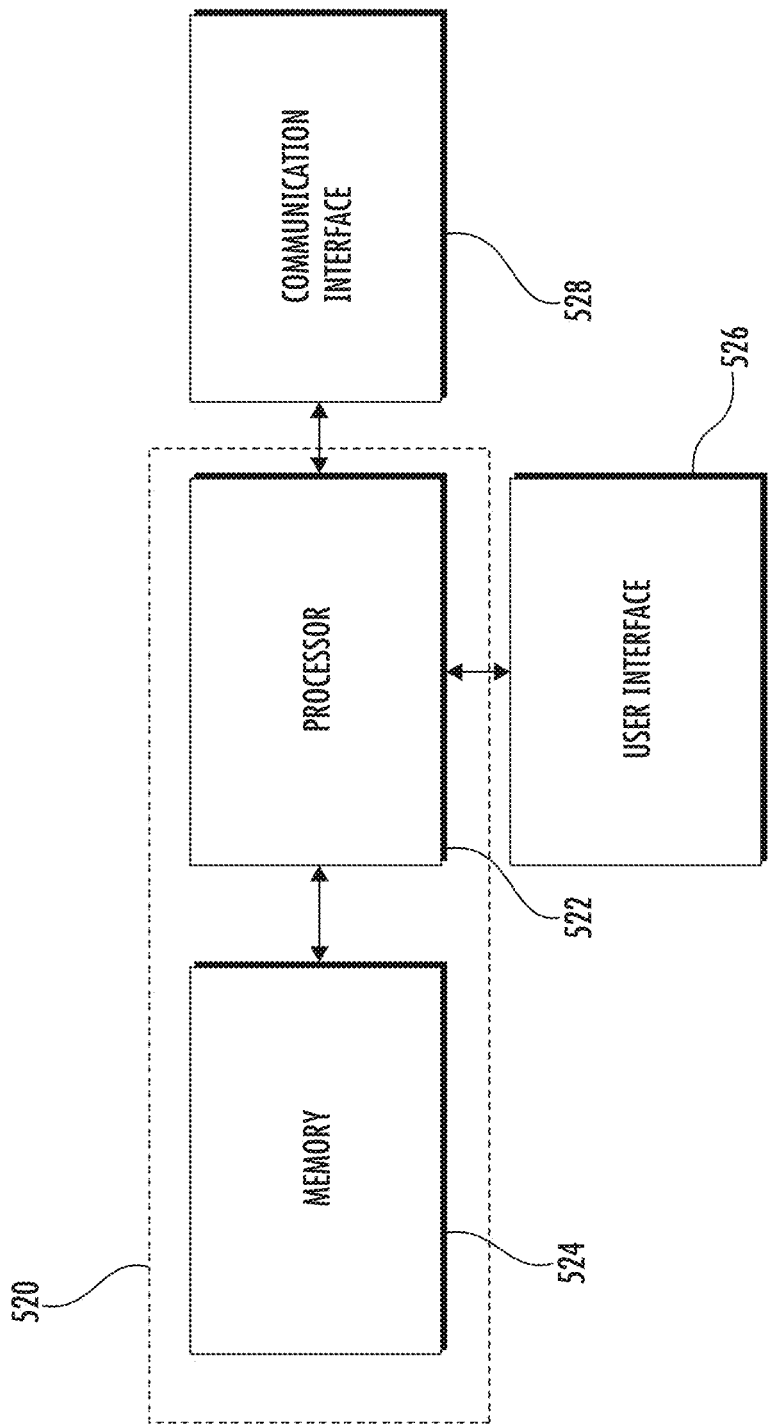
FIG. 46 illustrates an apparatus for determining a maximum fiber core total error for a plurality of optical fibers in a plurality of configurations according to an example embodiment.

FIG. 46 illustrates an apparatus for determining a maximum fiber core total error for a plurality of optical fibers in a plurality of configurations according to an example embodiment. The apparatus of FIG. 46 may be employed, for example, on a user device (e.g., a computer, a network access terminal, a personal digital assistant (PDA), cellular phone, smart phone, wearable computer, or the like) or a variety of other devices (such as, for example, a network device, server, proxy, or the like. Alternatively, embodiments may be employed on a combination of devices. Accordingly, some embodiments of the present disclosure may be embodied wholly at a single device or by devices in a client/server relationship. Furthermore, it should be noted that the devices or elements described below may not be mandatory and thus some may be omitted in certain embodiments.

In an example embodiment, the apparatus may include or otherwise be in communication with processing circuitry 520 that is configured to perform data processing, application execution and other processing and management services according to an example embodiment of the present invention. In one embodiment, the processing circuitry 520 may include a memory 524 and a processor 522 that may be in communication with or otherwise control a user interface 526 and a communication interface 528. As such, the processing circuitry 520 may be embodied as a circuit chip (e.g., an integrated circuit chip) configured (e.g., with hardware, software or a combination of hardware and software) to perform operations described herein. However, in some embodiments, the processing circuitry 520 may be embodied as a portion of a server, computer, laptop, workstation or even one of various mobile computing devices or wearable computing devices. In situations where the processing circuitry 520 is embodied as a server or at a remotely located computing device, the user interface 526 may be disposed at another device (e.g., at a computer terminal or client device such as a user device that may be in communication with the processing circuitry 520 via the communication interface 528 and/or a network.

The processor 522 may be embodied in a number of different ways. For example, the processor 522 may be embodied as various processing means such as a microprocessor or other processing element, a coprocessor, a controller or various other computing or processing devices including integrated circuits such as, for example, an ASIC (application specific integrated circuit), an FPGA (field programmable gate array), a hardware accelerator, or the like. In an example embodiment, the processor 522 may be configured to execute instructions stored in the memory 524 or otherwise accessible to the processor 522. As such, whether configured by hardware or software methods, or by a combination thereof, the processor 522 may represent an entity (e.g., physically embodied in circuitry) capable of performing operations according to embodiments of the present invention while configured accordingly. Thus, for example, when the processor 522 is embodied as an ASIC, FPGA or the like, the processor 522 may be specifically configured hardware for conducting the operations described herein. Alternatively, as another example, when the processor 522 is embodied as an executor of software instructions, the instructions may specifically configure the processor 522 to perform the operations described herein.

In an example embodiment, the memory 524 may include one or more non-transitory storage or memory devices such as, for example, volatile and/or non-volatile memory that may be either fixed or removable. The memory 524 may be configured to store information, data, applications, instructions or the like for enabling the apparatus to carry out various functions in accordance with example embodiments of the present invention. For example, the memory 524 could be configured to buffer input data for processing by the processor 522. Additionally or alternatively, the memory 524 could be configured to store instructions for execution by the processor 522. As yet another alternative, the memory 524 may include one of a plurality of databases that may store a variety of files, contents or data sets. Among the contents of the memory 524, applications (e.g., client applications or service application) may be stored for execution by the processor 522 in order to carry out the functionality associated with each respective application.

The user interface 526 may be an input/output device for receiving instructions directly from a user. The user interface 526 may be in communication with the processing circuitry 520 to receive user input via the user interface 526 and/or to present output to a user as, for example, audible, visual, mechanical or other output indications. The user interface 526 may include, for example, a keyboard, a mouse, a joystick, a display (e.g., a touch screen display), a microphone, a speaker, or other input/output mechanisms. Further, the processing circuitry 520 may comprise, or be in communication with, user interface circuitry configured to control at least some functions of one or more elements of the user interface 526. The processing circuitry 520 and/or user interface circuitry may be configured to control one or more functions of one or more elements of the user interface 526 through computer program instructions (e.g., software and/or firmware) stored on a memory device accessible to the processing circuitry 520 (e.g., volatile memory, non-volatile memory, and/or the like). In some example embodiments, the user interface circuitry is configured to facilitate user control of at least some functions of the apparatus through the use of a display configured to respond to user inputs. The processing circuitry 520 may also comprise, or be in communication with, display circuitry configured to display at least a portion of a user interface 526, the display and the display circuitry configured to facilitate user control of at least some functions of the apparatus.

The communication interface 528 may be any means such as a device or circuitry embodied in either hardware, software, or a combination of hardware and software that is configured to receive and/or transmit data from/to a network and/or any other device or module in communication with the apparatus. The communication interface 528 may also include, for example, an antenna (or multiple antennas) and supporting hardware and/or software for enabling communications with the network or other devices (e.g., a user device). In some environments, the communication interface 528 may alternatively or additionally support wired communication. As such, for example, the communication interface 528 may include a communication modem and/or other hardware/software for supporting communication via cable, digital subscriber line (DSL), universal serial bus (USB) or other mechanisms. In an exemplary embodiment, the communication interface 528 may support communication via one or more different communication protocols or methods. In some cases, IEEE 802.15.4 based communication techniques such as ZigBee or other low power, short range communication protocols, such as a proprietary technique based on IEEE 802.15.4 may be employed along with radio frequency identification (RFID) or other short range communication techniques. In other embodiments, communication protocols based on the draft IEEE 802.15.4a standard may be established.

Adhesive Profile Control and Passive Alignment

Controlling the shape of adhesive over optical fibers may be an important parameter in lidless FAU fabrication that is not a factor in lidded FAUs, since the optical fibers are generally completely covered by adhesive and a glass lid. Lidless FAUs may be utilized in compact, low-profile, interconnections, where a lid would interfere with other optical or electrical components, or otherwise increase the volume of the optical interconnection solution. Therefore, it may be advantageous for the adhesive over the fibers to be sufficiently thin to enable these interconnections.

An additional value of controlling the adhesive layer profile is that excessive adhesive may lead to shrinkage and shifts in optical fiber position during adhesive curing and environmental testing. In instances in which the adhesive is not deposited symmetrically over the fiber array, the differences in adhesive shrinkage (e.g., on the left vs. right side of the optical fiber) may cause fiber shifts in curing and environmental testing. These shifting effects may be reduced by reducing the thickness of the adhesive.

A further benefit of controlling and reducing the adhesive thickness layer may be accelerated curing of the adhesive. This may be particularly advantageous for FAUs assembled using inorganic adhesives, such as sodium silicate ("liquid glass"). Sodium silicate adhesives may experience cracking if cured too quickly or deposited in an excessively thick layer. In some example embodiments, the height of the adhesive may be less than half of the diameter of an optical fiber of signal-fiber array.

The solution described below enables the adhesive layer profile to be precisely controlled, and in locations between optical fibers where it is not needed, it may be completely eliminated. This approach may assist in mechanically decoupling individual fibers from each other, so that they are not joined together with a thick layer of adhesive with a different CTE (Coefficient of Thermal Expansion) than the optical fiber or the base glass substrate.

Further, various techniques for molding the adhesive into a desired shape, and simultaneously positioning fibers in a precise location in an array on a V-groove substrate or a flat glass sheet are also described. For example, the adhesive around the optical fibers may be molded with a precise profile to enable passive alignment of the optical fibers to V-groove alignment features or PIC alignment features.

Figure 47:
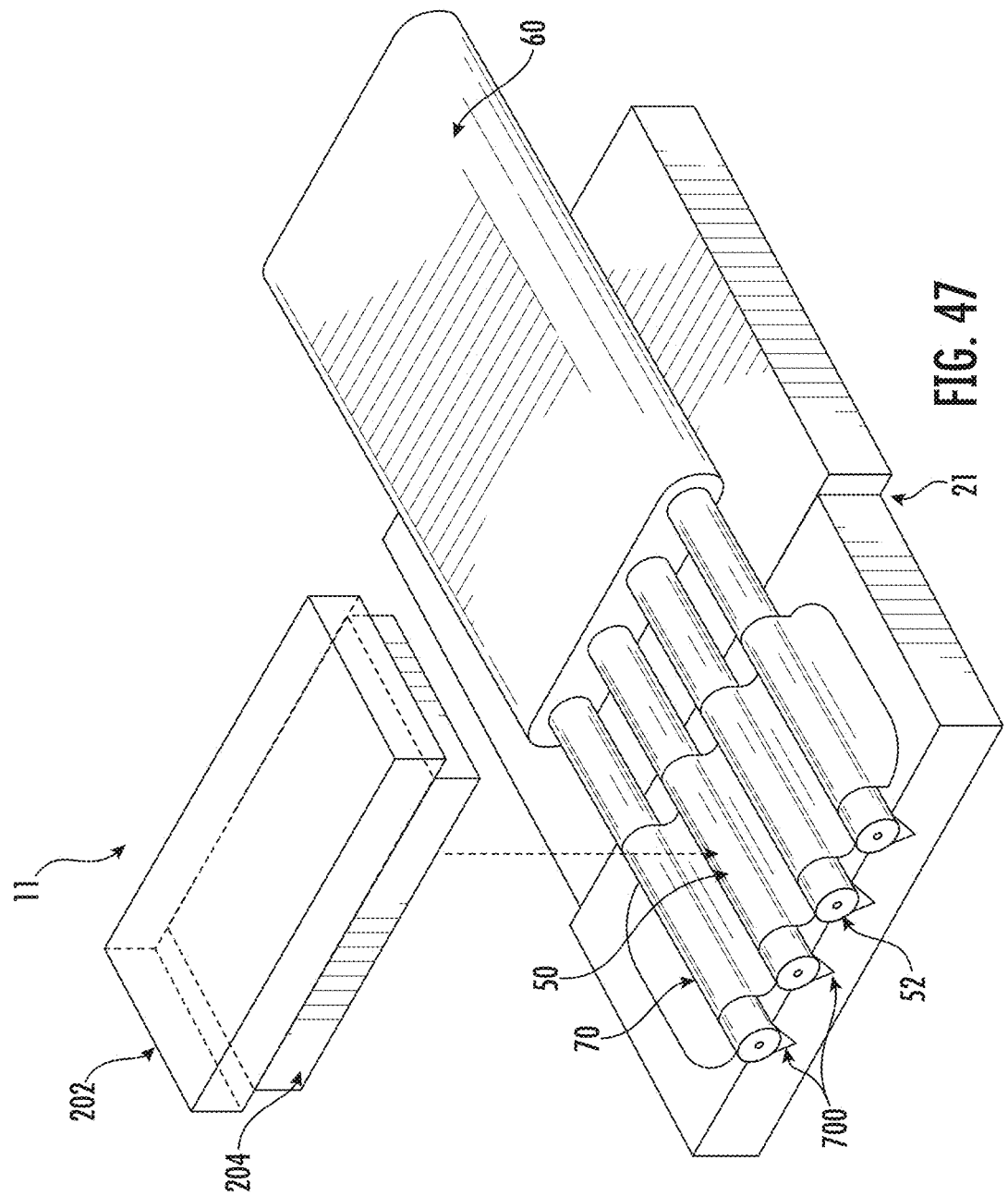
FIGS. 47 and 48 depict an example process for forming a lidless FAU using a V-groove support substrate according to an example embodiment.
Figure 48:
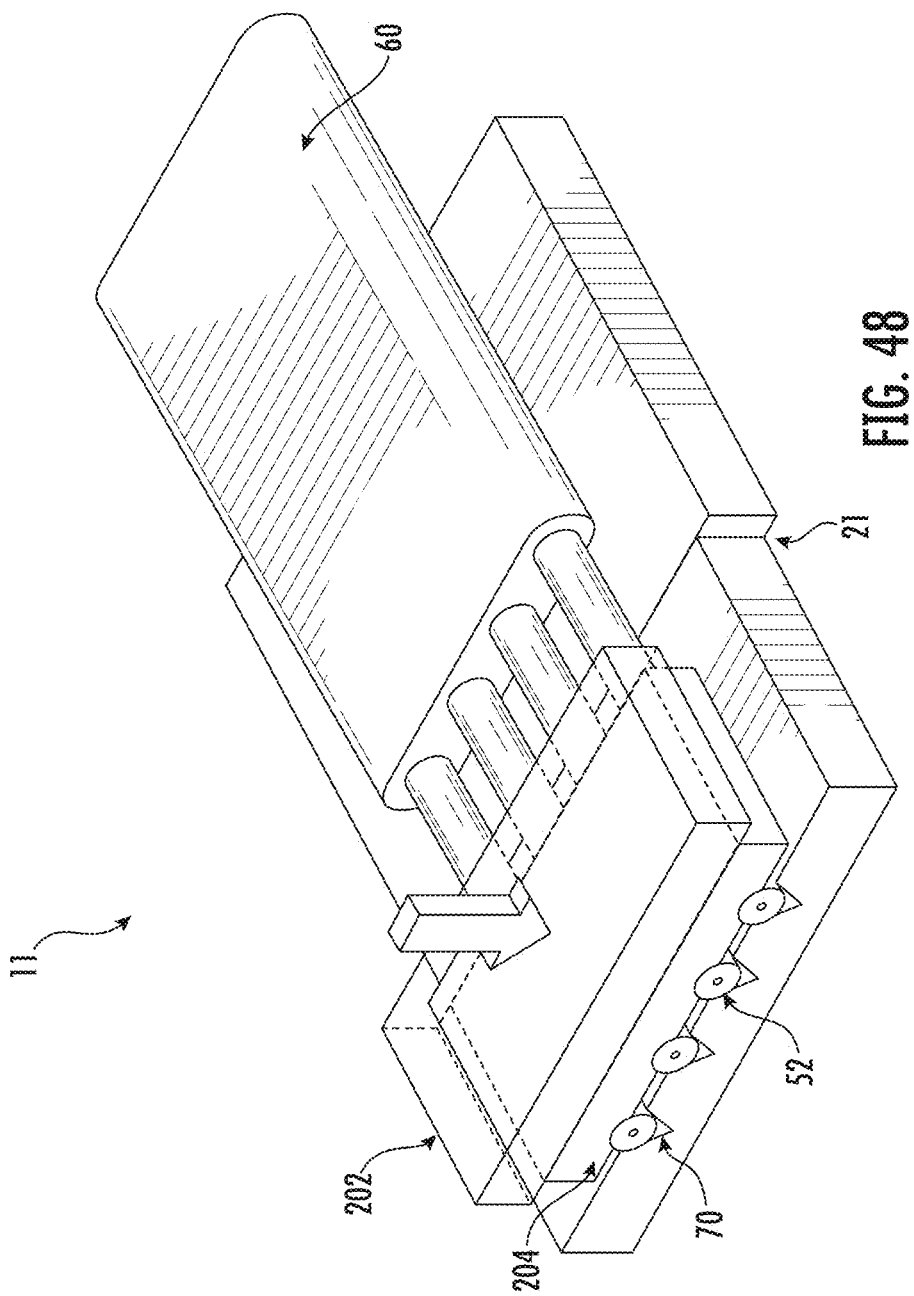

Lidless FAUs 11 may be assembled using either a permanent V-groove substrate 21 (that remains as part of the FAU after assembly), or a temporary V-groove substrate, for aligning signal-fiber arrays 50. FIGS. 47 and 48 depict an assembly process of a lidless FAU 11 using a permanent V-groove substrate 21. A multifiber ribbon 60 may be stripped and individual bare optical fibers 52 of the signal-fiber array 50 may be aligned with V-grooves 700 in the V-groove substrate 21. A release pad 204 pad mounted on a top plate 202 may be positioned over the V-groove substrate 21. The release pad 204 may be constructed of a material with high release properties from the chosen adhesive, such as Silicone or Buna-N. Alternatively, a thin release sheet or film can be applied to the release pad 204 to improve the release properties, such as a PTFE sheet. UV curable adhesive 70 may be applied over the bare optical fibers 52 in the V-grooves 700 in the V-groove substrate 21. Additionally or alternatively, the UV curable adhesive 70 may be applied over the V-groove substrate 21 before the optical fibers 52 are inserted into the V-grooves 700. The release pad 204 may be lowered onto the signal-fiber array 50 and downward force is applied through the top plate 202, causing the release pad 204 to deform around each optical fiber 52 in the signal-fiber array 50, as depicted in FIG. 49. The adhesive 70, applied over the optical fibers 52 may be displaced by the deformation of the release pad 204, resulting in a thin layer of adhesive 70 disposed between the optical fibers 52 and the V-groove substrate 21. In the embodiment shown, the lidless FAU 11 does not require a lid, such as a glass lid or other substrate, disposed on the top of the optical fibers 52 opposite the V-groove substrate 21. This enables each of the plurality of optical fibers 52 to define a first exposed datum surface 103 at a top of the optical fibers 52 opposite the V-groove substrate 21, as depicted in FIG. 51.

In an alternative assembly approach, the release pad 204 may be applied over the signal-fiber array 50 with a reduced force, which may not cause full deformation of the release pad 204 around each optical fiber 52. In this process, there may be a small vertical gap 702 between a bottom surface of the release pad 204 and the top surface of the V-groove substrate 21 in regions between each optical fiber 52 in the signal-fiber array 50, as depicted in FIG. 50. This vertical gap 702 forms a capillary channel that enables adhesive to wick into the region between the release pad 204, the V-groove substrate 21, and neighboring optical fibers 52 in the signal-fiber array 50. As adhesive 70 is applied to either end of the V-groove substrate 21, but particularly at the fiber array end face, adhesive 70 may also wick into the small V-shaped channel 704 formed below each optical fiber 52 in the signal-fiber array 50.

The process of adhesive wicking may limit or prevent entrapped bubbles in the adhesive 70, which may be more common when adhesive 70 is applied over the signal-fiber array 50 prior to the lowering of the release pad 204 onto the signal-fiber array 50. The progress of adhesive 70 as it wicks into the vertical gap 702 and/or the V-shaped channel 704, may be monitored during the adhesive application process by observing the V-groove substrate 21 from below, using, for example, a glass support substrate with a camera and/or mirror reflection optics. Once the adhesive 70 has flowed to fill the vertical gap 702 and/or the V-shaped channel 704 the downward force applied to the release pad 204 may be increased to exclude it from regions around each optical fiber 52 in the signal-fiber array 50.

The adhesive 70 may be cured by exposure to UV light, as discussed above in reference to FIGS. 2-7B. The UV light may be transmitted toward the V-groove substrate 21 from the sides, either end, or even the bottom of the V-groove substrate 21, when using a UV-transparent glass support substrate. After the adhesive 70 is UV-cured the release pad 204 may be removed from the signal-fiber array 50, as depicted in FIG. 51. The height of the adhesive 70 may be relatively thin, such as less than fifty percent of the diameter of an optical fiber 52 of the of signal-fiber array 50, less than twenty-five percent of the diameter of an optical fiber 52 of the of signal-fiber array 50, less than twenty percent of the diameter of an optical fiber 52 of the of signal-fiber array 50, less than ten percent of the diameter of an optical fiber 52 of the of signal-fiber array 50, or other suitable height.

Figure 52A:
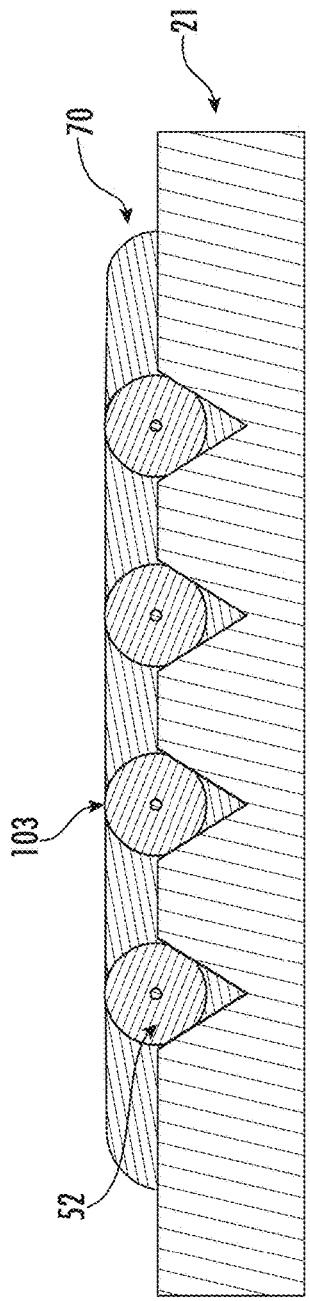
Figure 52B:
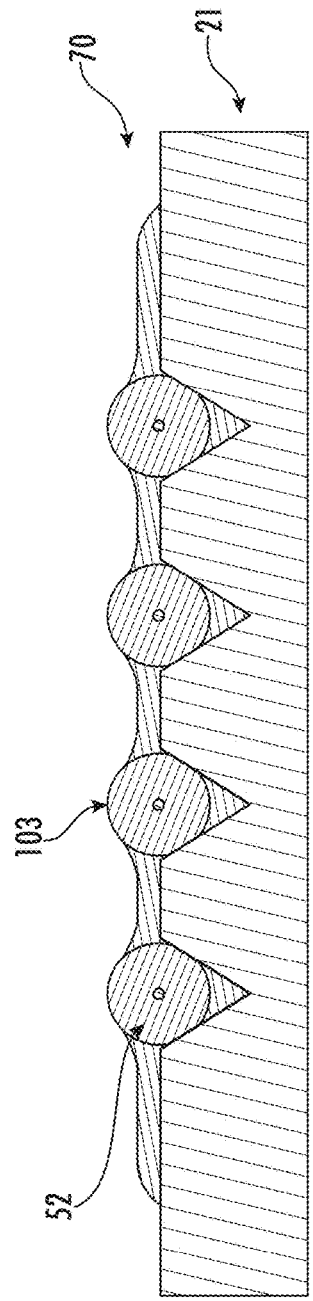
Figure 52C:
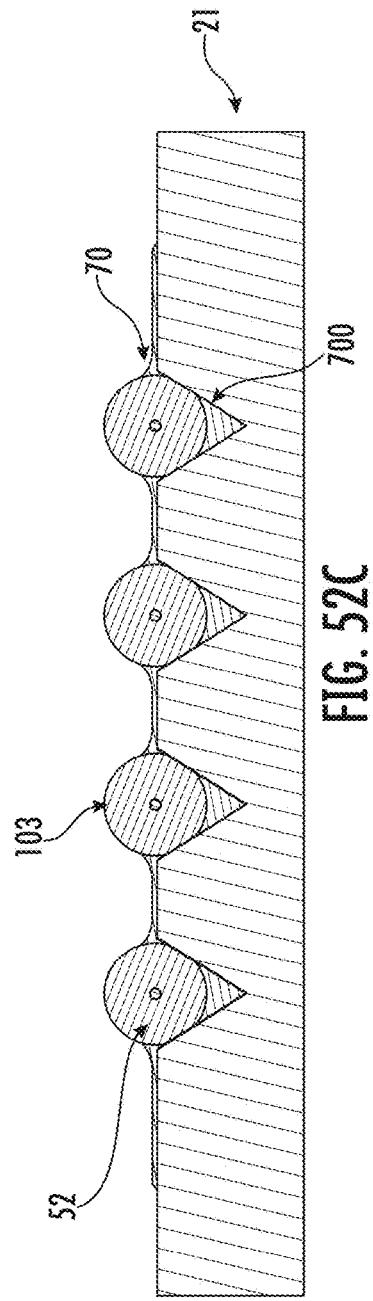

An advantage of utilizing the release pad 204 to shape the adhesive 70 over the signal-fiber array 50 of the lidless FAU 11 is that the adhesive profile may be easily modified by adjusting the downward force applied to the release pad 204. For example, if the downward force is relatively low and/or the release pad 204 is significantly stiff, a thick layer of adhesive may be formed in the region between optical fibers, as depicted in FIG. 52A. If the downward force is increased and/or the release pad 204 stiffness is reduced, the release pad 204 may press downward more, thereby excluding more adhesive 70 from the region between optical fibers 52 as depicted in FIGS. 52B and 52C. In each case, the downward force applied to the release pad 204 may be sufficient to press the optical fibers 52 down into contact with the V-grooves 700 in the V-groove substrate 21. The disclosed process may produce an identical adhesive profile over each optical fiber 52 in the signal-fiber array 50, because the downward force is substantially uniform over the signal-fiber array 50, and the release pad 504 has a substantially uniform elasticity.

If the downward force applied to the release pad 204 is increased and/or the release pad 204 is even softer, the release pad 204 may deform into the small V-shaped regions 706 between the optical fiber 52 and the two adjacent sidewalls of the V-groove 700, as depicted in FIG. 53A. If the pressing force applied to the release pad 204 is further increased, even more adhesive 70 may be excluded from the V-shaped regions 706, as depicted in FIG. 53B. Exclusion of adhesive 70 from the V-shaped regions 706 adjacent to each optical fiber 52 may be utilized to increase the bonding strength of a second adhesive layer applied over the lidless FAU 11. For example, if a lid is subsequently bonded over the lidless FAU 11, the V-shaped regions 706 provide angled sidewall bonding interfaces that are partially in shear to resist delamination of the lid. The V-shaped regions 706 may also increase the total bonding surface area of any adhesive used for joining a top surface of the lidless FAU 11 to another component.

Figure 54:
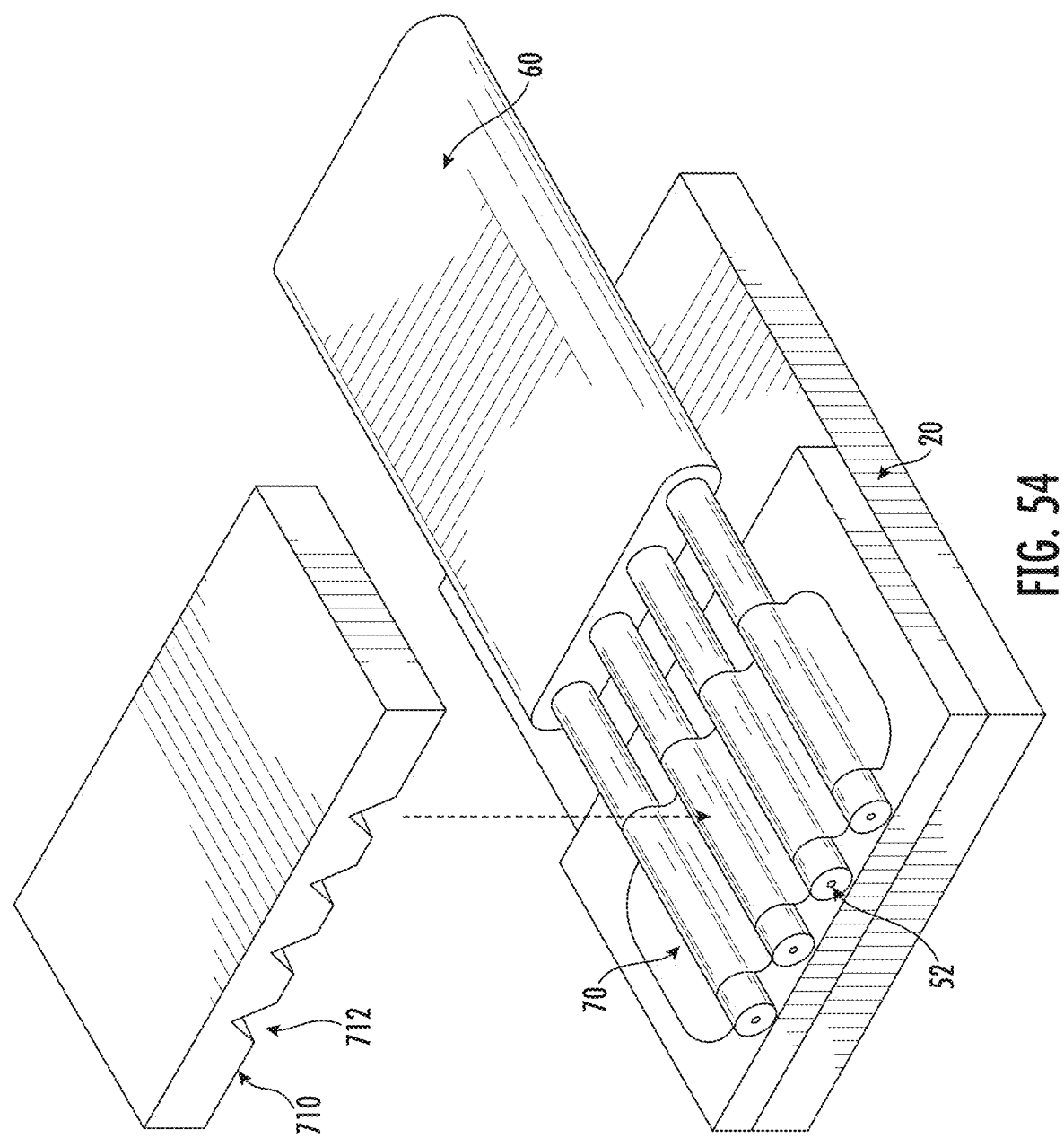
FIGS. 54 and 55 depict an example process for forming a lidless FAU using a reusable V-groove alignment substrate according to an example embodiment.
Figure 55:
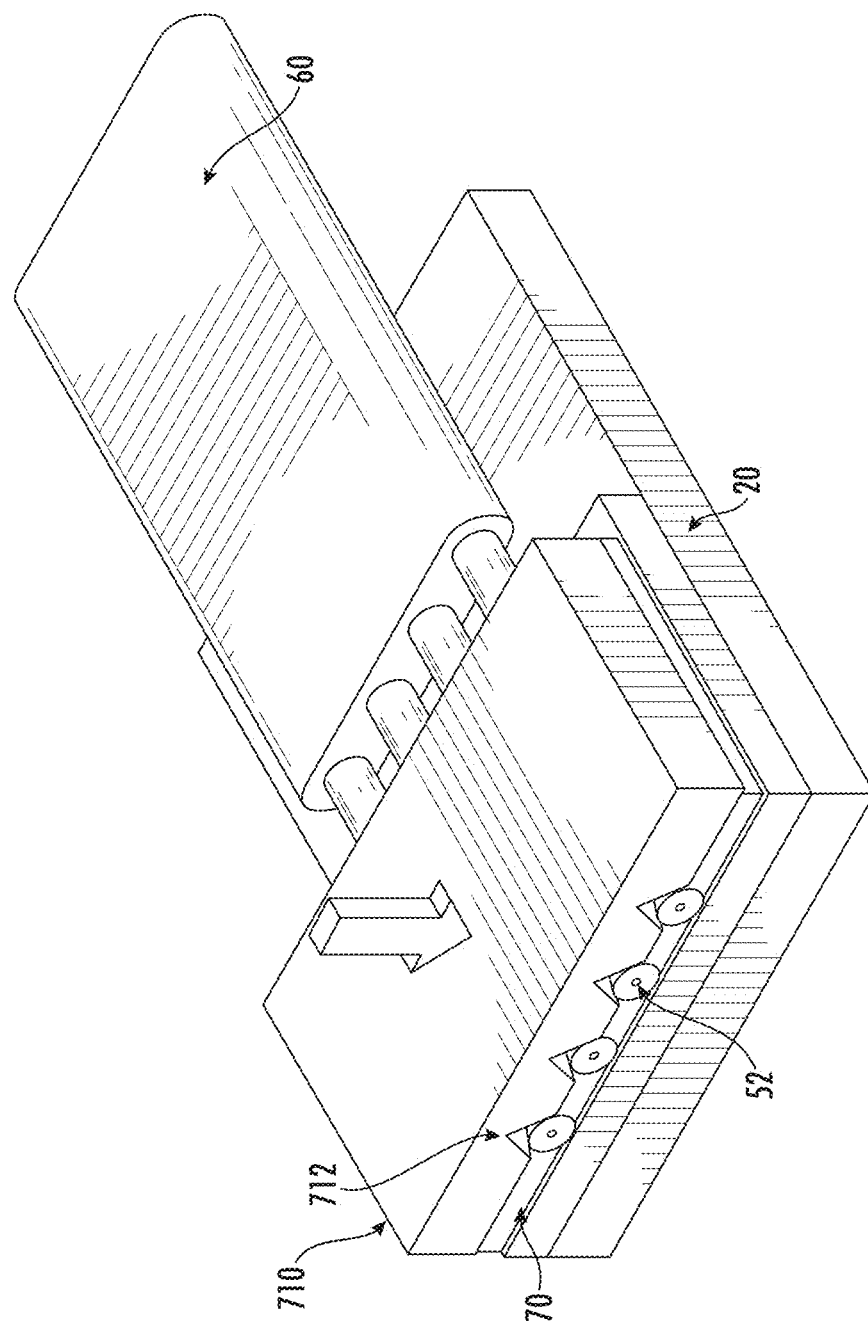

In another example embodiment, lidless FAUs may be fabricated by pressing optical fibers onto a precision flat sheet of glass, e.g. support substrate 20, for example LCD glass, using a reusable V-groove alignment substrate 710. The assembly approach depicted in FIGS. 54 and 55, is similar to the assembly approach described above for lidless FAUs 11, where signal-fiber array 50 is pushed into a V-groove substrate 21. In this case, however, a reusable V-groove alignment substrate 700 may be used to align optical fibers 52 of the signal-fiber array 50 on the support substrate 20. V-grooves 712 in the V-groove alignment substrate 710 may be coated with a non-stick coating, such as a fluorosilane coating, a PTFE coating, or other suitable non-stick coating. The V-grooves 712 may also be covered by a precision uniform thickness film sheet, such as a sheet of PTFE.

In FIG. 54, the reusable V-groove alignment substrate 710 is positioned above the signal-fiber array 50. An adhesive 70 may be pre-applied over the signal-fiber array 50, or it may be allowed to wick into the gap between V-groove alignment substrate 710 and the support substrate 20 after the V-groove alignment substrate 710 is lowered onto the signal-fiber array 50.

Figure 56:
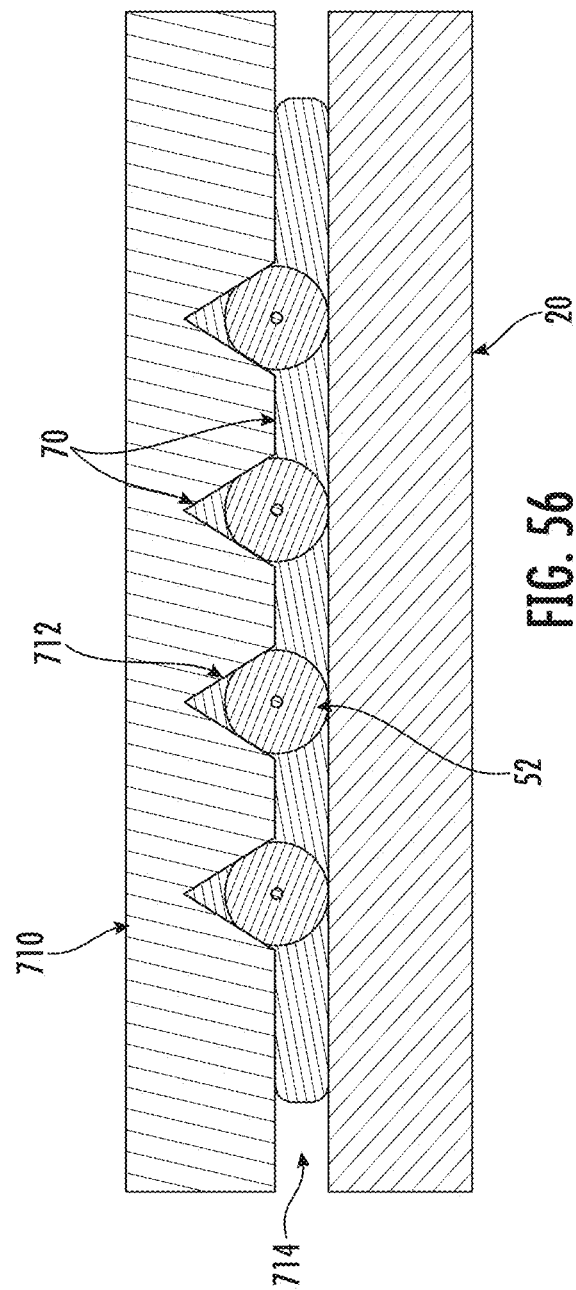

Once the reusable V-groove alignment substrate 710 is lowered over the signal-fiber array 50, a downward force may be applied to press the optical fibers 52 into contact with the support substrate 20, while spacing the optical fibers 52 in the V-grooves 712 on precise pitch, as depicted in FIG. 55. The adhesive 70 may flow into gap 714 between the V-groove alignment substrate 710 and the support substrate 20 and into the V-grooves 712, as depicted in FIG. 56.

The adhesive 70 may be cured via UV exposure while downward force is applied on the V-groove alignment substrate 710. After curing of the adhesive 70, the V-groove alignment substrate 710 may be raised away from the signal-fiber array 50. As shown in FIG. 57, the adhesive 70 around each of the optical fibers 52 of the signal-fiber array 50 may take the shape of the associated V-groove 712 of the V-groove alignment substrate 714, including raised peaks 730 over each optical fiber 52 that correspond to the valleys in each V-groove 712. The height of the adhesive 70 disposed between adjacent optical fibers 52 may be relatively thin, such as less than fifty percent of the diameter of an optical fiber 52 of the of signal-fiber array 50, less than twenty-five percent of the diameter of an optical fiber 52 of the of signal-fiber array 50, less than twenty percent of the diameter of an optical fiber 52 of the of signal-fiber array 50, less than ten percent of the diameter of an optical fiber 52 of the of signal-fiber array 50, or other suitable height.

Turning to FIG. 58, a lid 719 may be optionally applied over the signal-fiber array 50 of the lidless FAU 11. The lid may assist stabilization of the signal-fiber array 50. The lid 719 may rest on the pointed ridge peaks formed in the adhesive 70 by the V-grooves 712 of the V-groove alignment substrate 710. Additional adhesive 716 may be disposed between the signal-fiber array 50 and the lid 716, e.g. between the ridge peaks. The additional adhesive may bond the lid 719 to the signal-fiber array 50. In FIG. 59, excess adhesive 70 exists between the lid 719 and the support substrate 20. Prior to attachment of the lid 719, the pointed ridge peaks of the adhesive 70 over the optical fibers 52 may be removed via, for example, a sanding operation that stops when the top 718 of the signal-fiber array 50 is reached, as indicated by the dotted line. After sanding is completed, the lid 719 may be applied over the optical fibers 52 of the signal-fiber array 50, as shown in FIG. 60. The sanded adhesive 70 may present a more stable surface for seating of the lid 719 and may provide a more compact profile. Additionally, the pointed ridge peaks of the adhesive profile or the substantially flat sanded surface of the adhesive 70 may define a datum surface 730. The lid 719 may rest on the datum surfaces 730.

Figure 63:
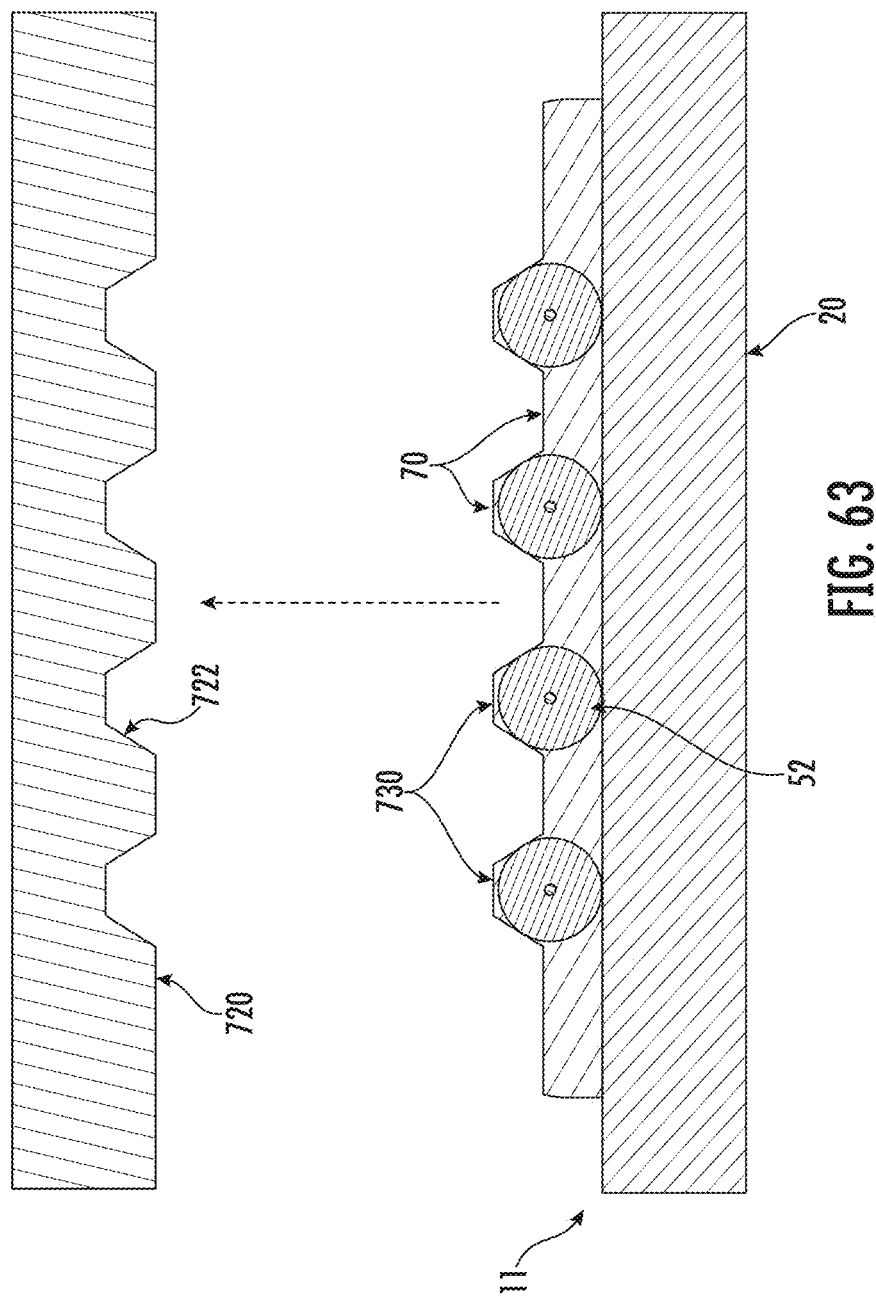
Figure 64:
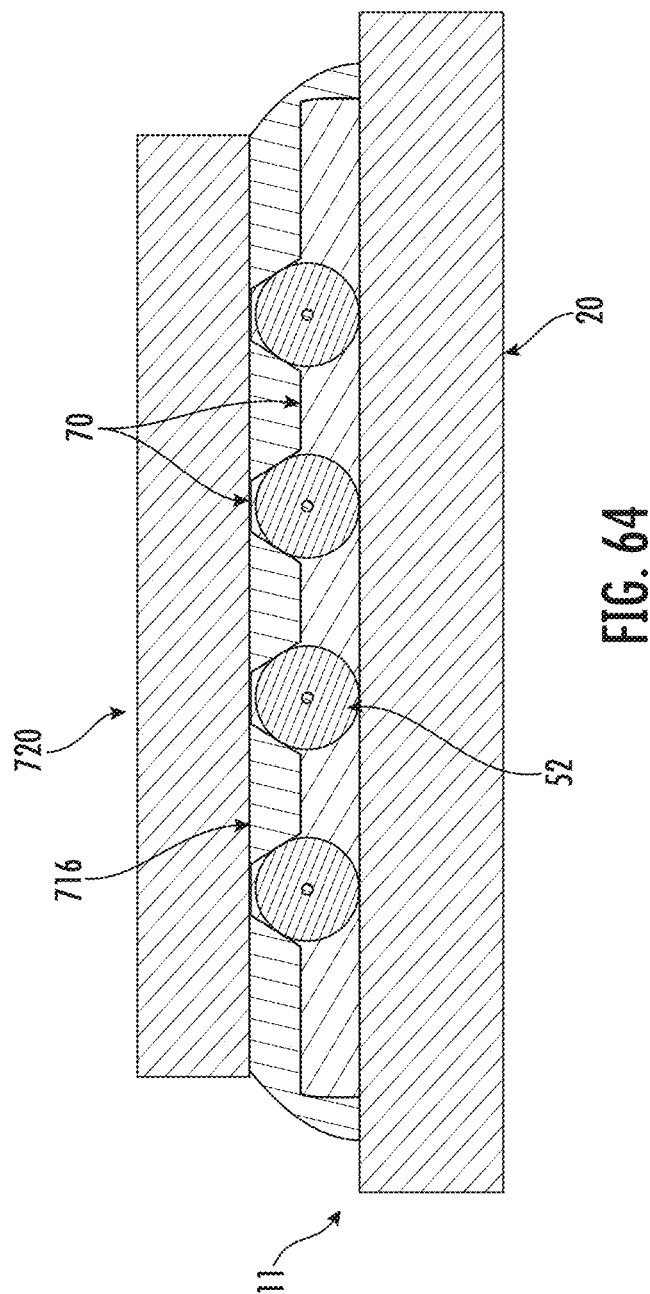
FIG. 64 depicts the FAU of FIGS. 61-63 including an optional lid according to an example embodiment.

As an alternative to sanding the adhesive 70, the V-grooves 722 of an alignment substrate 720 may be truncated, e.g. include flat bottoms, as depicted in FIG. 61. A bottom surface of the alignment substrate 720 may be coated with a non-stick coating as described above. Adhesive 70 may be applied over the optical fibers 52 in the signal-fiber array 50, and the V-groove alignment substrate 720 may lowered onto the signal-fiber array 50, as depicted in FIG. 62. As described above, the adhesive 70 may be cured while a downward force is applied on the alignment substrate 720. As shown in FIG. 63, after UV exposure curing or the adhesive 70, the alignment substrate 720 may be lifted off the signal-fiber array 50. The adhesive profile over the signal-fiber array 50 may match the flat-bottom V-groove profile of the alignment substrate 720. Thereby, eliminating the excess adhesive 70 over the signal-fiber array 50 compared to the alignment substrate 720 include the full V-grooves 712. The substantially flat surface of the profile of adhesive 70 may define a datum surface 730. As shown in FIG. 64, additional adhesive 716 may be applied over the signal-fiber array, followed by application of a lid 719. The lid 719 may rest on the datum surfaces 730.

Figure 65:
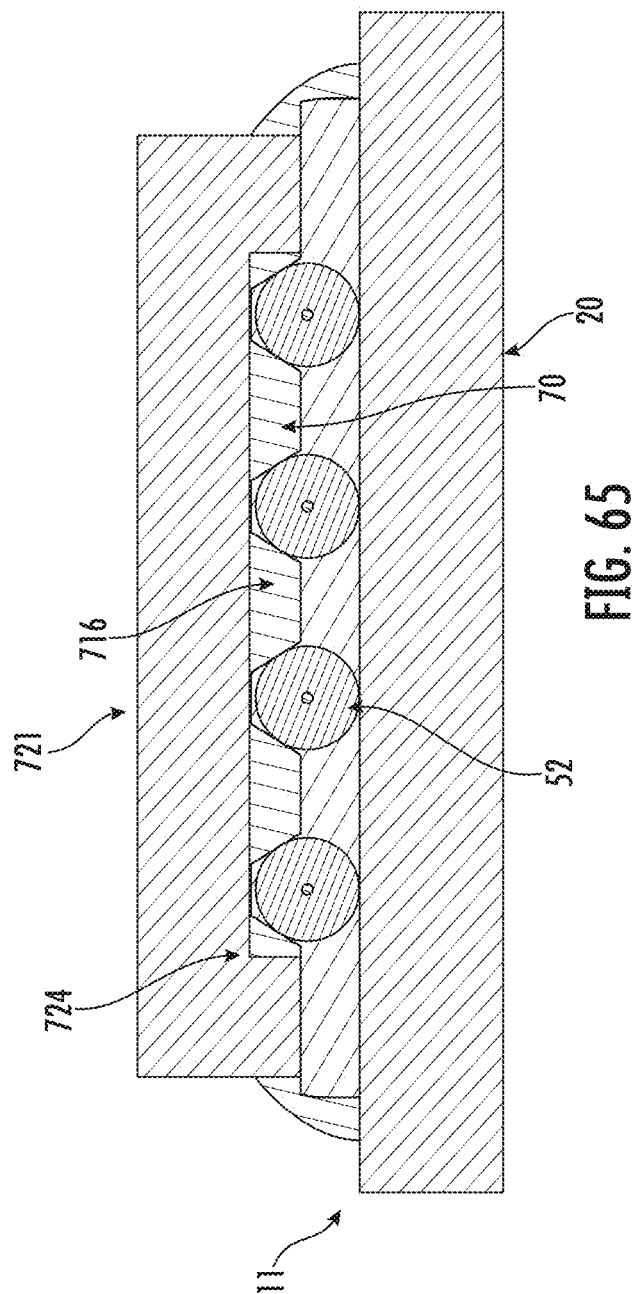
FIG. 65 depicts the FAU of FIGS. 61-63 including an optional lid with trench according to an example embodiment.

In some example embodiments, the lid 719 may include a broad trench or notch feature 724 disposed in a bottom surface, as shown in FIG. 65. The notch feature 724 may be generated by sawing or grinding the lid 721, as shown in FIG. 65). In an example embodiment, the depth and width dimensions may not need to be precisely controlled, as long as the notch feature 724 enables clearance of the optical fibers 52 on the support substrate 20. This notch feature 724 may reduce the thickness of adhesive 70, 716, disposed between the lid 719 and the support substrate 20, thereby reducing the total depth of the FAU. Utilization of a notch feature 724 particularly effective when the optical fibers 52 are arranged on fine pitch (e.g., 127 μm pitch for 125 μm diameter fibers), which may reduce or eliminate the amount of adhesive 70 between adjacent optical fibers 52.

Figure 66A:
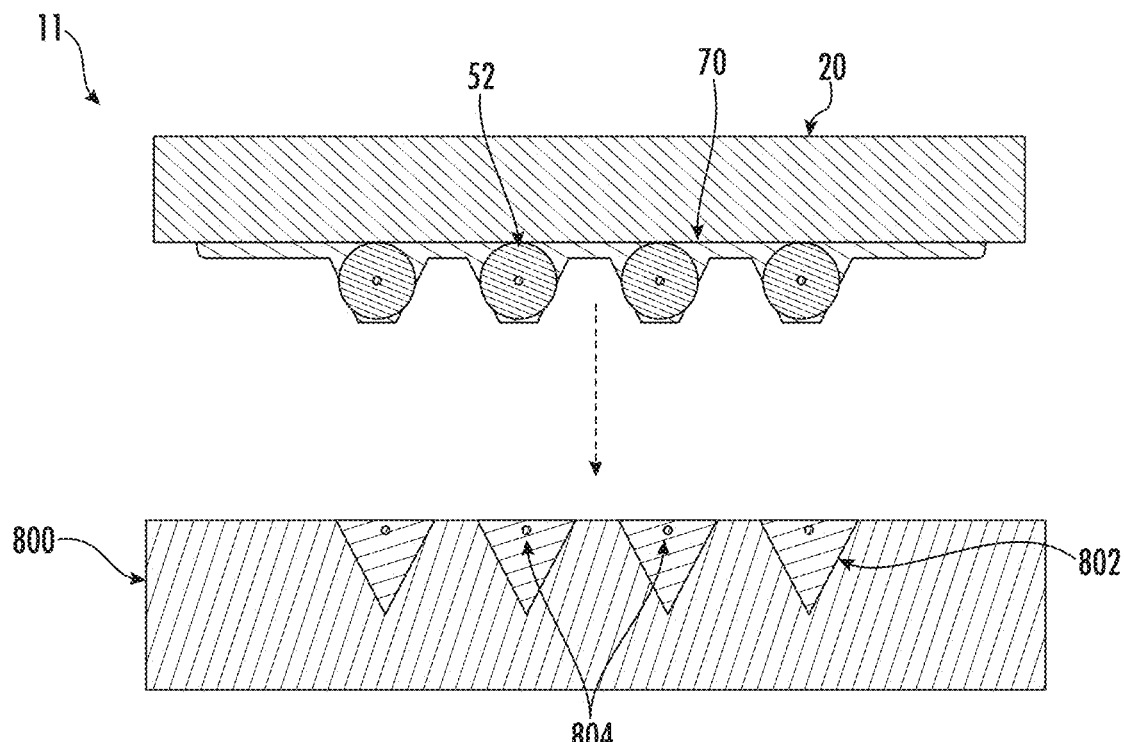
FIGS. 66A and 66B illustrate passive alignment of an FAU with truncated V-groove adhesive profiles to a PIC substrate according to an example embodiment.
Figure 66B:
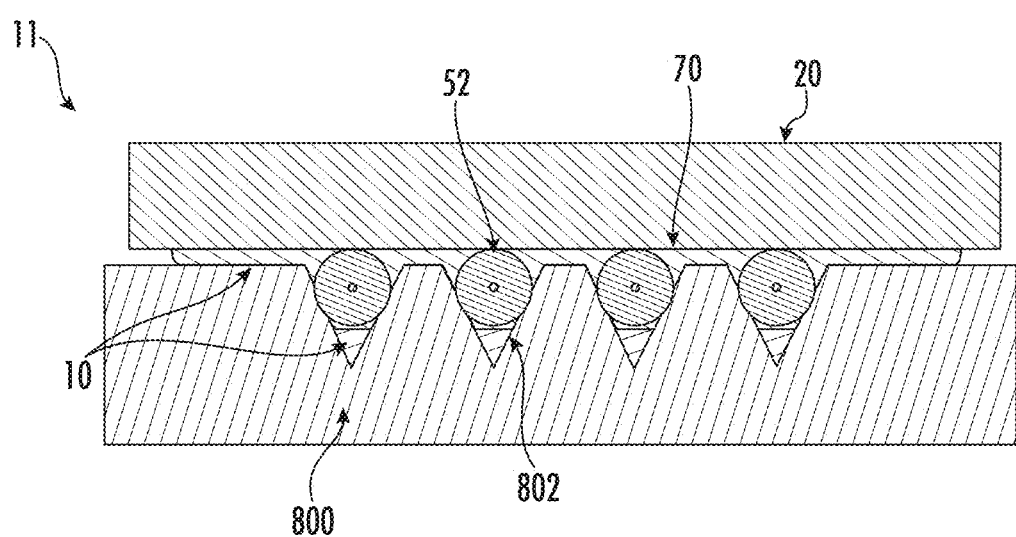

The profile, e.g. shape, of the adhesive 70 over the signal-fiber array 50 of the lidless FAU 11 may be utilized to passively align the lidless FAU 11 to other optical components. In the example depicted in FIGS. 66A and 66B, the lidless FAU 11 is positioned over an array of V-grooves 802 on a PIC substrate 800. The fabrication process of the lidless FAU 11 positions the V-grooves 712 of the V-groove alignment substrate 710 on precise pitch on the support substrate 20, causing the optical fibers 52 and profile of the adhesive 70 to be precisely aligned to the V-grooves 802 on the PIC substrate 800.

The PIC substrate 800 may include waveguides 804 that are aligned to the centers of the V-grooves 802 and may be disposed at a precise predetermined depth. The depth of the waveguides 804 may enable precise alignment to optical fiber cores 72 to the waveguides 804. The lidless FAU 11 may be inserted into the V-grooves 802 of the PIC substrate 800. The profiled shape of the adhesive 70 may guide the optical fibers 52 into contact with the sidewalls of the V-groove 802. Adhesive 806 may be applied in a gap between the PIC substrate 800 and the lidless FAU 11. The application of the adhesive 806 may generate a large area thin bond line that provides a robust mechanical bond between the lidless FAU 11 and the PIC substrate 800.

As discussed above in reference to FIGS. 15-21, a lidless FAU 11 may be passively aligned to a notch feature 302, in the waveguide substrate 300 or PIC substrate 400, for interconnection of the optical fibers 52 to waveguides 304. The approach may be enabled by an absence of adhesive 70 sidewalls of the two outboard optical fibers 52 in the signal-fiber array 50, defining datum surfaces 104 disposed on each edge optical fiber 52, e.g. optical fibers 52 that have only one adjacent optical fiber 52. The exposed datum surfaces 104 may enable lateral alignment of the lidless FAU 11 with the waveguide substrate 300 or PIC substrate 400, such as mating with a precision surface disposed on the waveguide substrate 300 or PIC substrate 400.

Figure 67:
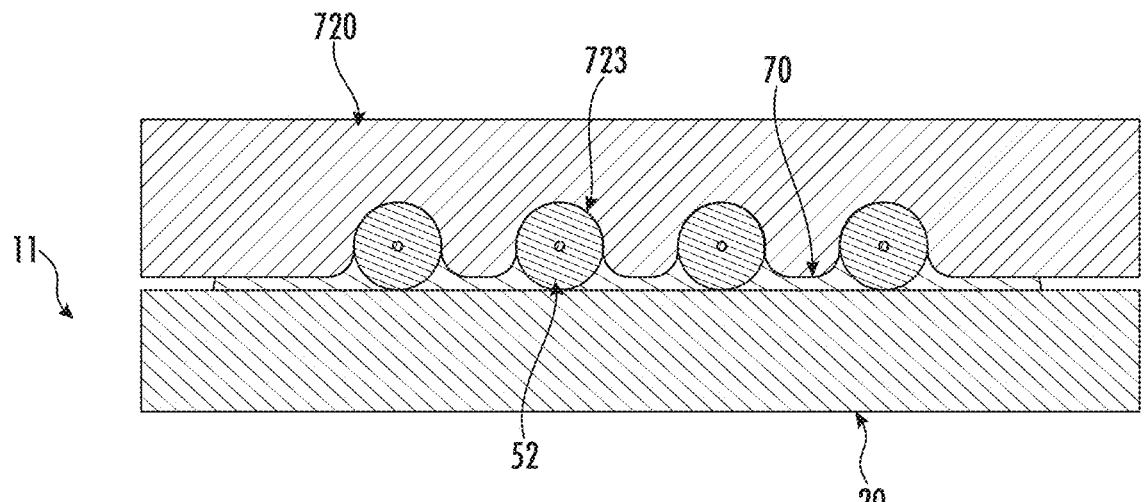
FIGS. 67 and 68 illustrate a process of forming a lidless FAU with datum surfaces on the top and outboard optical fibers according to an example embodiment.
Figure 68:
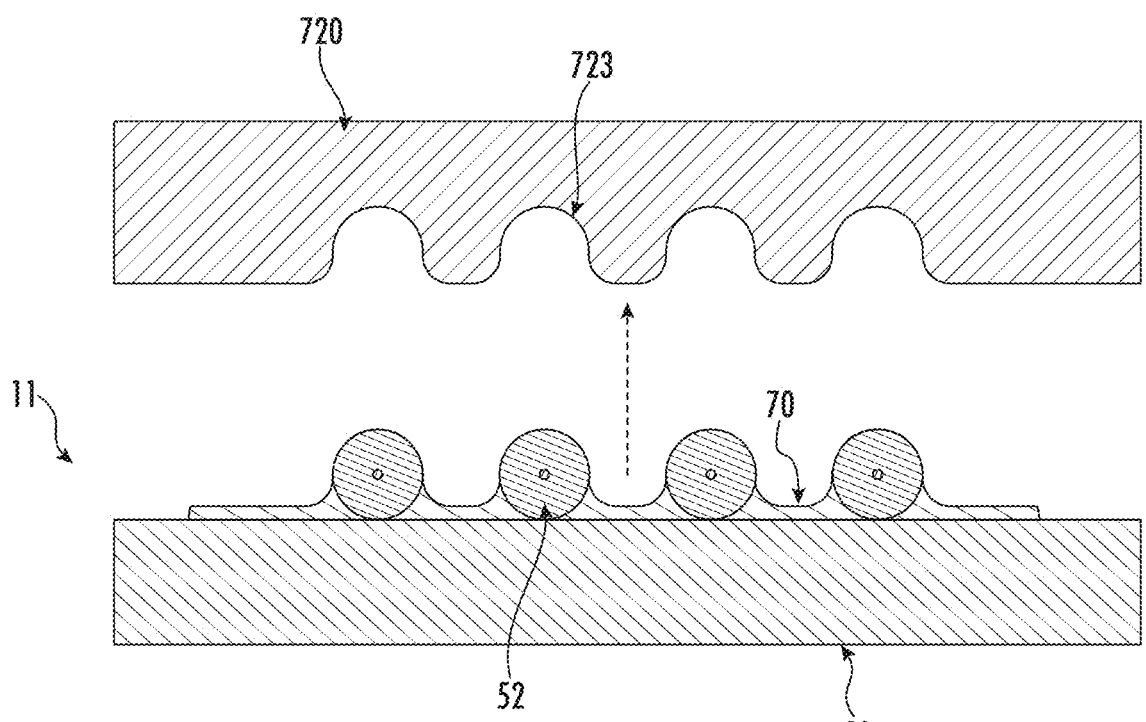
Figure 69:
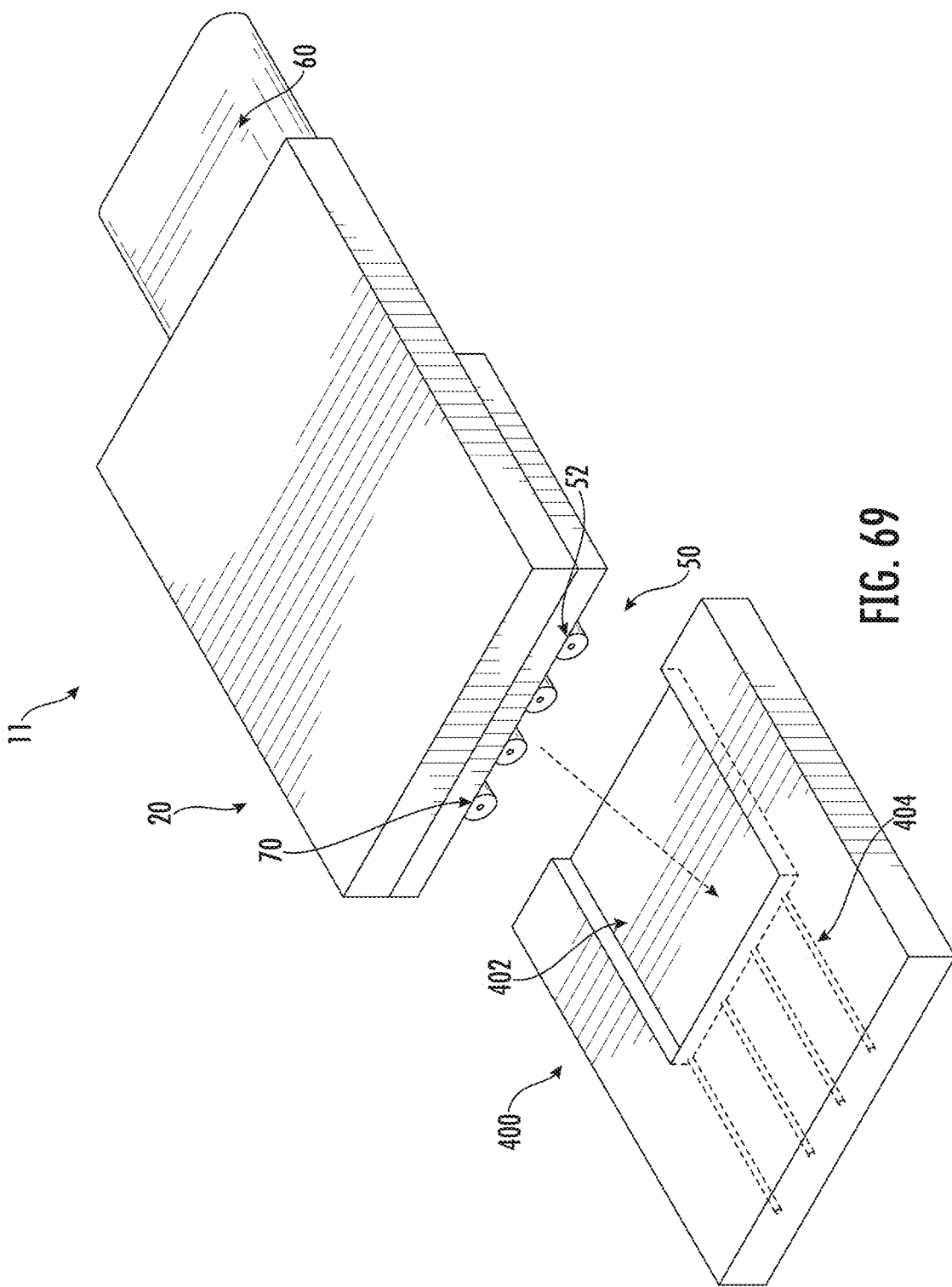
FIG. 69 illustrates passive alignment of the FAU of FIGS. 67 and 68 with a PIC substrate according to an example embodiment.

A similar approach may be utilized with the lidless FAU fabrication approach as described in reference to FIGS. 67-69. FIG. 67 shows an alignment substrate 720 with a bottom surface that has been given a precision profile including a plurality of alignment grooves 723 by, for example, a diamond turning process. The bottom surface of the alignment substrate 720 may be coated with a non-stick coating, and pressed over plurality of optical fibers 52 of the signal fiber array 50 that have been previously covered with adhesive 70.

Force may be applied on the top surface of the alignment substrate 720 to press the optical fibers 52 in the signal-fiber array 50 downward into contact with the surface of the support substrate 20. The adhesive 70 may be UV cured and the alignment substrate 720 may be lifted off the signal-fiber array. The cured adhesive 70 may form a thin layer (e.g., <0.2-0.3 μm) over each optical fiber, with a surface profile that matches the profile of the bottom surface of the alignment substrate 720. The molding process of the adhesive 70 precisely positions the optical fibers 52 on the support substrate 20 (at a precision pitch), and also ensures that only an extremely thin layer of adhesive 70 remains over the sides of the optical fibers 52. The resulting geometry of the lidless FAU 11 that is similar to the one used in lidless "squeeze" FAUs discussed above, but where the optical fibers 52 can be spaced apart and positioned relative to each other with arbitrary spacings.

Turning to FIG. 69, the lidless FAU 11 may be coarsely aligned to an alignment trench 402, or notch feature, disposed in a surface of the PIC substrate 400. The PIC substrate 400 also includes a plurality of waveguides 404 that are positioned to align with the cores of the optical fibers 52 of the lidless FAU 11 when the signal-fiber array 50 is inserted into the PIC alignment trench.

Figure 70:
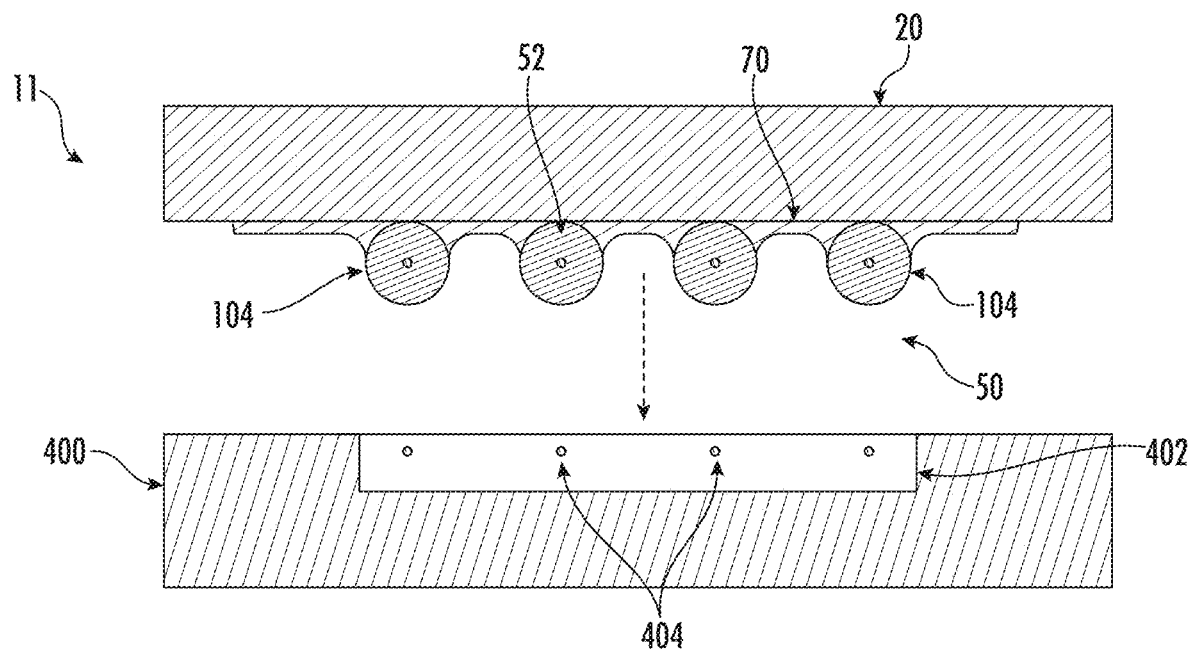
FIGS. 70 and 71 depict a cross-sectional view of the passive alignment of FIG. 69 according to an example embodiment.

FIG. 70 provides an end face view of the lidless FAU 11 as it is coarsely aligned above the alignment trench 402 of the PIC substrate 400. The adhesive profile of the above process results in no adhesive 70 disposed over the sides of the two outboard fibers in the array, allowing these surfaces to be used as precision alignment datums surfaces 104 during assembly.

Figure 71:
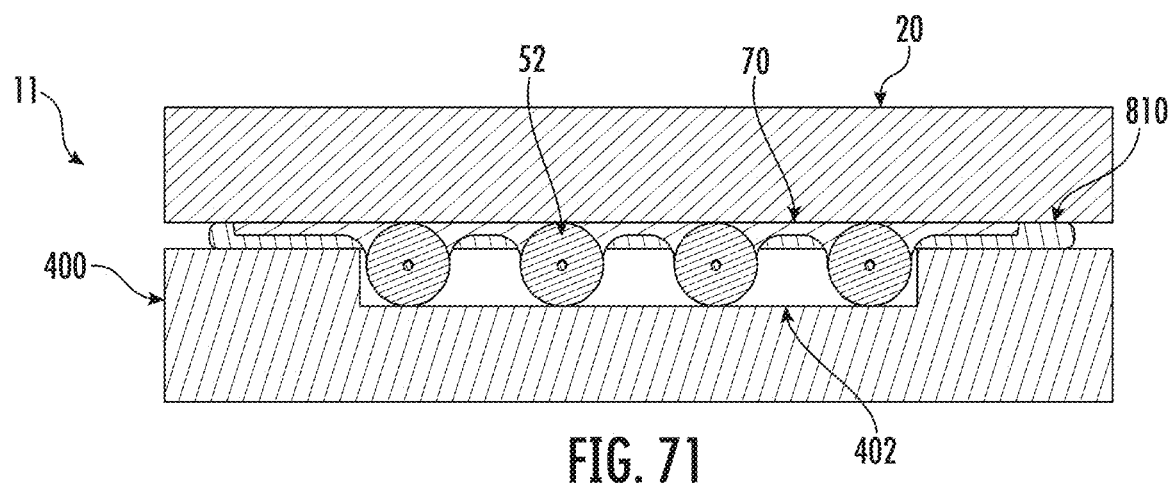

In FIG. 71, the lidless FAU 11 has been inserted into the alignment trench 402 of the PIC substrate 400. The depth of the alignment trench 402 is precisely controlled during the fabrication process, such that the cores of the optical fiber 52 are vertically aligned with the waveguides 404 of the PIC substrate 400. The cores of the optical fibers 52 of the lidless FAU 10 are horizontally aligned to the waveguides 404 by alignment of outboard fiber side surfaces, e.g. datum surfaces 104, with the sidewalls of the alignment trench 402. In some embodiments, the alignment trench 402 may be slightly wider than the signal-fiber array 50, by, for example, 0.5 μm, such that the signal-fiber array 50 may be inserted into the alignment trench 402 without mechanical interference.

Adhesive 810 may be applied to the interface after the lidless FAU 11 has been aligned to the alignment trench 402 of the PIC substrate, by allowing adhesive 810 to wick into the gap region between the lidless FAU 11 and the alignment trench 402. Alternatively, adhesive 810 may be applied to the alignment trench 402 and/or the optical fibers 52 of the lidless FAU 11 prior to assembly.

Figure 72:
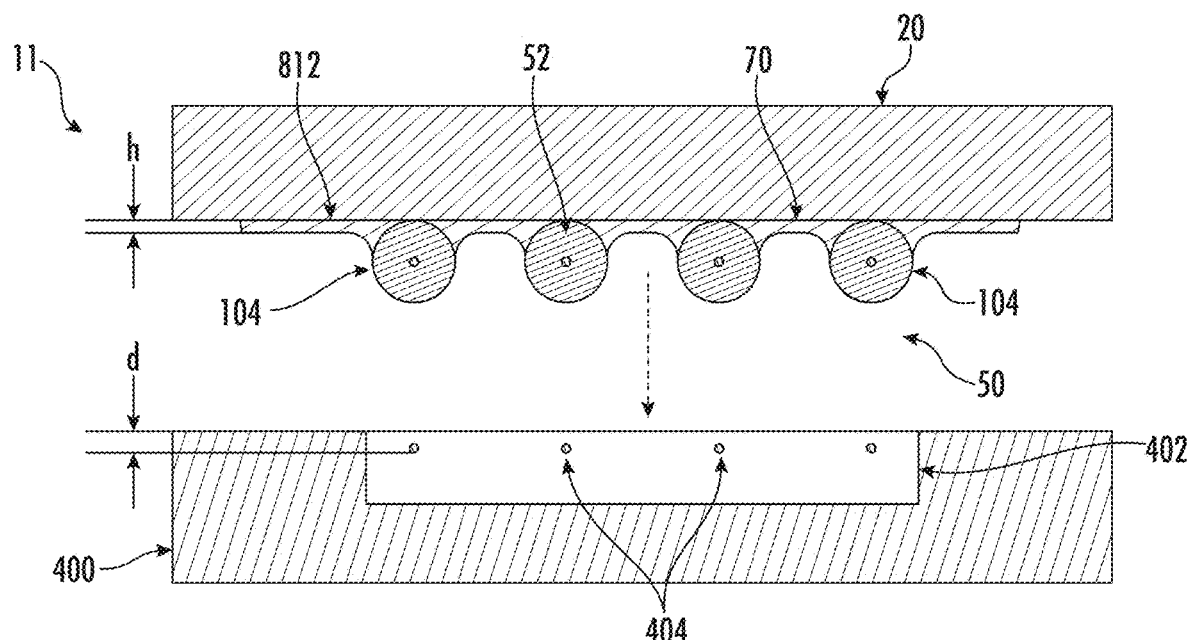
FIGS. 72 and 73 depict a cross-sectional view of passive alignment of a lidless FAU with vertical offset space formed in the adhesive profile according to an example embodiment.
Figure 73:
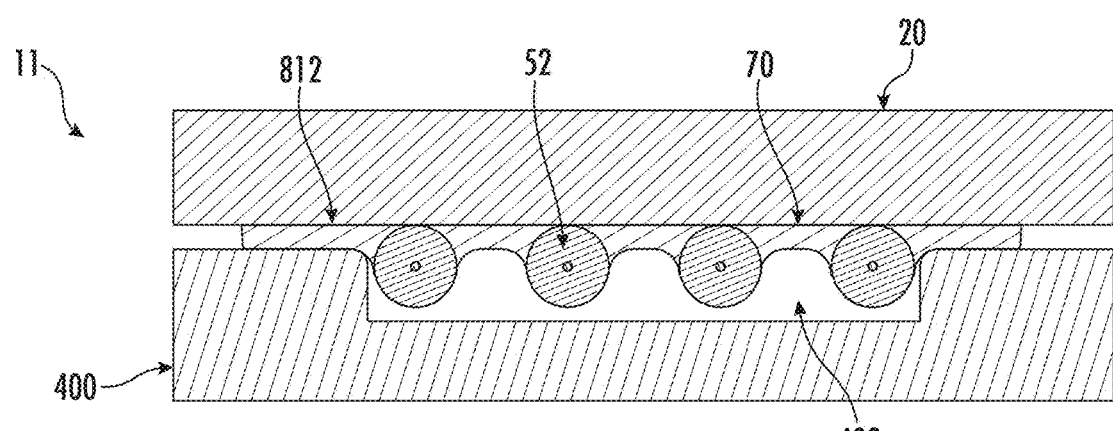

FIGS. 72 and 73 provide an example where two adhesive spacer regions 812 of thickness or height (h) are formed on both sides of the signal-fiber array 50 of the lidless FAU 11. The height (h) of the spacer region is selected to equal (r-d), where r is the radius of the optical fiber 52, and d is the depth of the center of PIC waveguide 404 below the top surface of PIC substrate 400. The molding process for shaping the profile of the adhesive 70 over the signal-fiber array 50 of the lidless FAU 11 may be utilized to form alignment features 235 at a precision offset relative to the optical fibers. For example, in the example embodiment discussed above in reference to FIGS. 70 and 71, the lidless FAU 11 was vertically aligned in the alignment trench 402 because the alignment trench 402 had been formed to be a precise depth. In the embodiment depicted in FIGS. 72 and 73, the vertical alignment of the cores of the optical fibers 52 of the lidless FAU 11 to the waveguides 404 be determined by the thickness of two spacer regions 812 formed from the cured adhesive 70 on each side of the signal-fiber array 50. Using this approach, the alignment trench 402 may be made deeper, such that the alignment trench 402 does not contact the signal-fiber array 50 during insertion of the lidless FAU into the PIC alignment trench.

The height (h) of the spacer region may be established by the precision shape of the diamond turned alignment substrate 720 that defines the profile of the adhesive 70. The depth of the adhesive shaping surface may be adjusted to take into account the shrinkage of UV curable adhesive 70 during curing. Inorganic fillers in the adhesive 70 may also be used to reduce shrinkage during curing of the adhesive 70. The height of the adhesive 70 in the spacer regions 812 may be relatively thin, such as less than fifty percent of the diameter of an optical fiber 52 of the of signal-fiber array 50, less than twenty-five percent of the diameter of an optical fiber 52 of the of signal-fiber array 50, less than twenty percent of the diameter of an optical fiber 52 of the of signal-fiber array 50, less than ten percent of the diameter of an optical fiber 52 of the of signal-fiber array 50, or other suitable height.

During assembly, the lidless FAU 11 may be inserted into the alignment trench 402 until the spacer region 812 contacts the top surface of the PIC substrate 400. As described above, the lidless FAU 11 may then be joined to the PIC substrate 400 by UV curing adhesive 70 that disposed in the gap between the lidless FAU 11 and the PIC substrate 400.

In the depicted embodiment, the spacer region 812 is formed as a large flat region adjacent to the outboard optical fibers 52. The adhesive 70 that joins the lidless FAU 11 to the PIC substrate 400 may be free to flow into the region around the spacer region 812, ensuring that a very thin layer of joining adhesive remains between the spacer region 812 and the top of the PIC substrate 400, for example the joining adhesive may be less than or equal to 0.5 μm thick.

Figure 74:
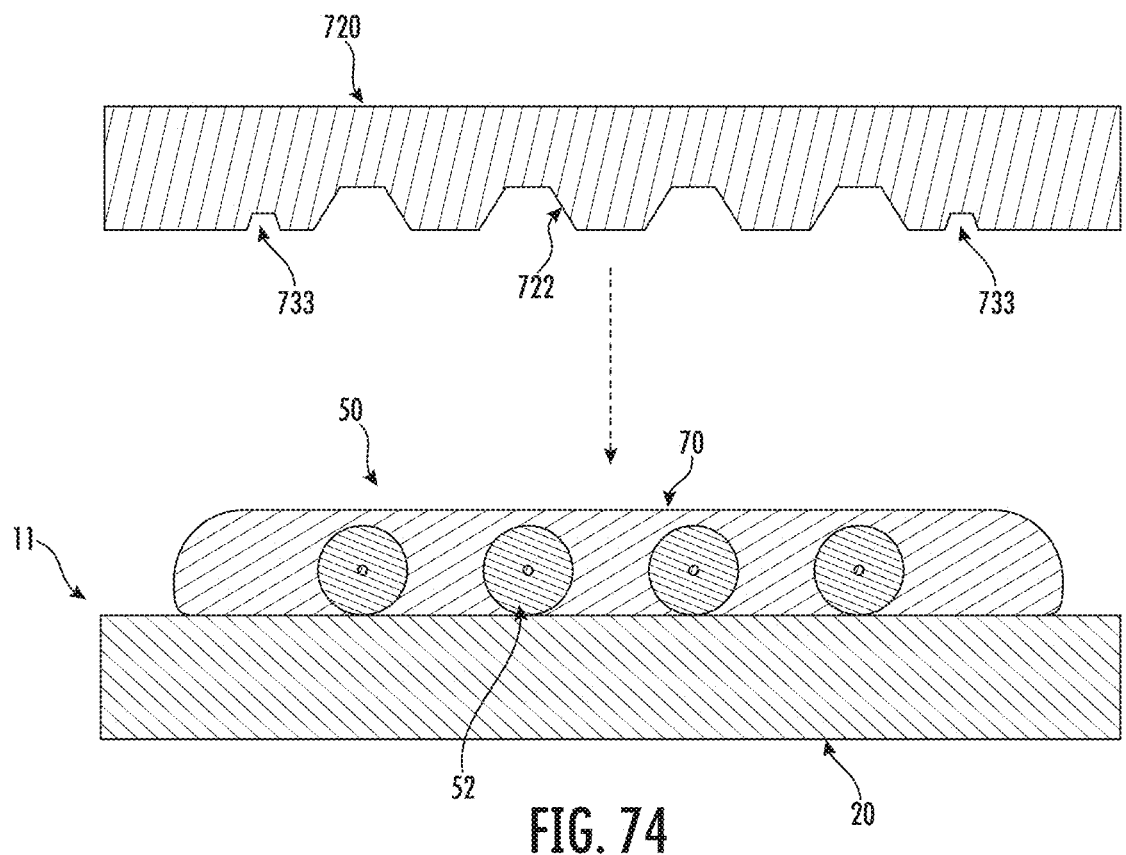
FIGS. 74-76 illustrate a process for forming a lidless FAU including alignment features formed in the adhesive profile according to an example embodiment.
Figure 75:
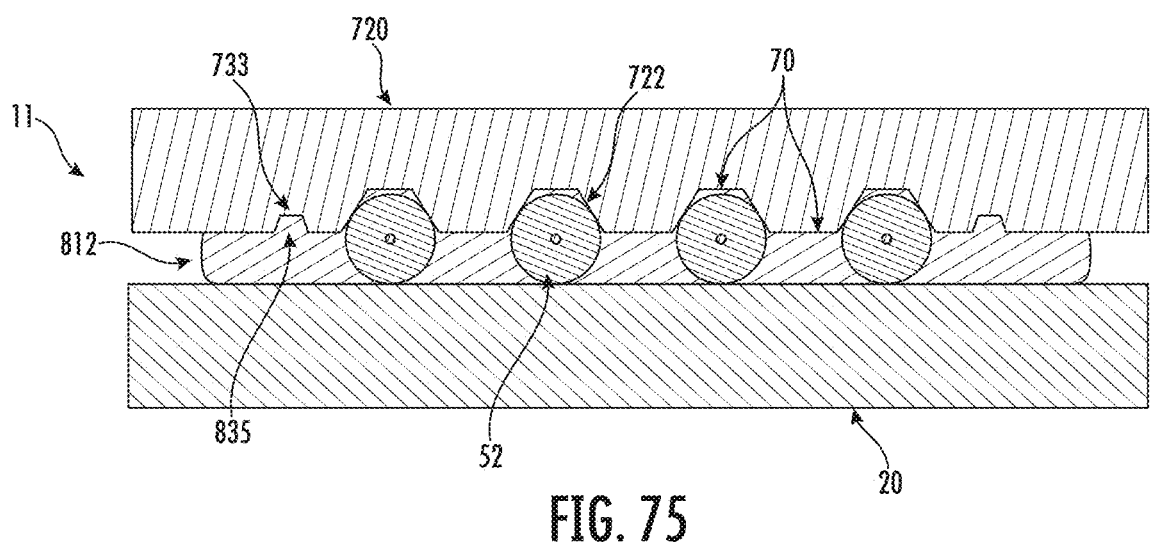
Figure 76:
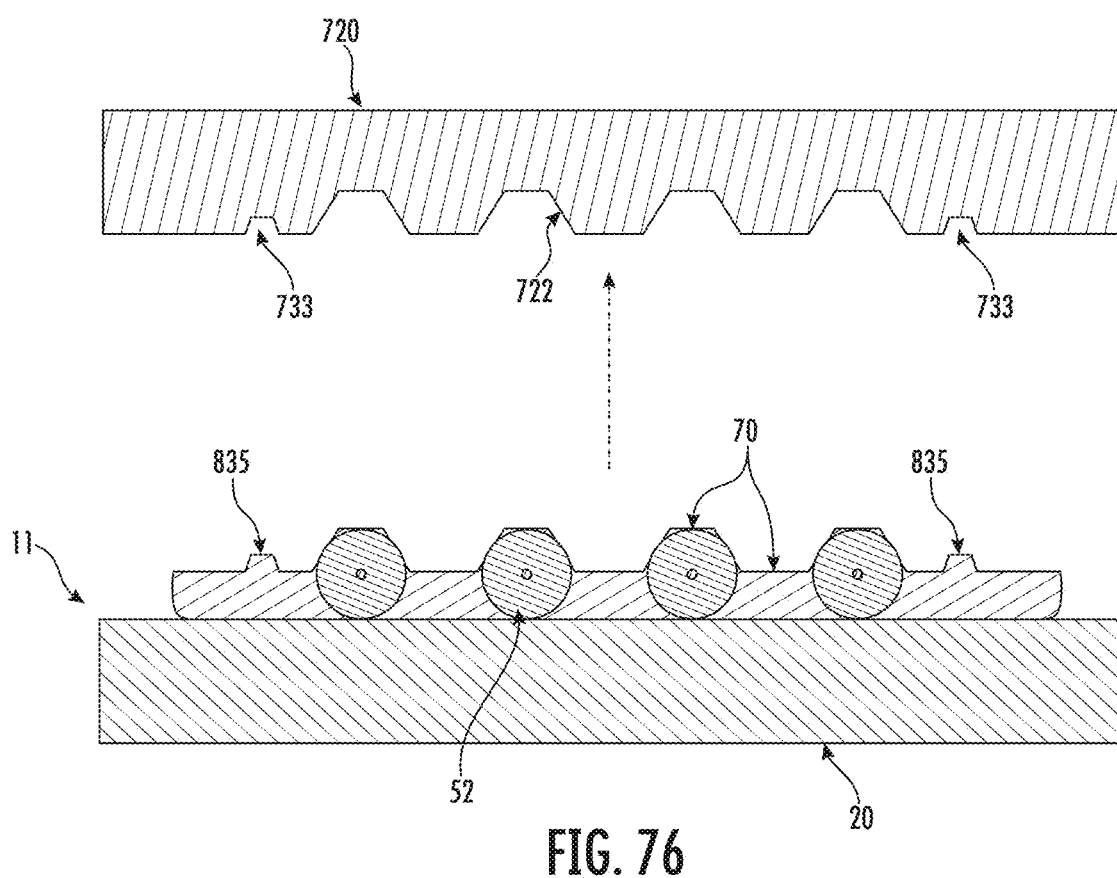

In the example depicted in FIGS. 74-76, a precision alignment feature 835, such as a trench or raised region, may be formed into the profile of the adhesive 70. The alignment feature 835 may be formed at a precise horizontal distance from the signal-fiber array 50. As depicted in FIGS. 74 and 75, the alignment substrate 720 includes mold features 733 configured for forming alignment features 835 horizontally offset from the V-grooves 722 configured to align the optical fibers 52.

The alignment substrate 720 may be pressed down over the adhesive and a signal-fiber array 50 disposed on the support substrate 20. Once the adhesive 70 cures, the alignment feature 835 is formed at a precision horizontal and vertical offset from the optical fibers 52.

The alignment substrate 720 may be removed from the adhesive a 70 and support substrate 20 aided by the non-stick surface coating. Once the alignment substrate is removed, the alignment feature 835 may enable passive alignment of the support substrate 20 and the signal-fiber array 50 to waveguides 404 on the PIC substrate 400 or other substrate. For example, if the PIC substrate 400 includes a precision etched notch feature or alignment trench 402, the alignment feature 835 may be sized and positioned to passively align with complementary features disposed on the PIC substrate 400 to enable precision alignment of cores of the optical fibers 52 to waveguides 404 of the PIC substrate 400.

The alignment feature 835 may be formed in any shape useful for aligning the cores of the optical fibers 52 with precision features on another substrate or component, including raised features, such as posts, rectangles, triangles, ridges, or the like or depressed features, such as trenches and pits or other depressions with any perimeter profile.

In an example embodiment, a fiber optic assembly is provided including a support substrate having a substantially flat surface and a signal-fiber array supported on the support substrate. The signal-fiber array includes a plurality of optical fibers. At least some of the optical fiber of the plurality of optical fibers includes a first datum contact disposed between the optical fiber and an adjacent optical fiber and each of the optical fibers of the plurality of optical fibers includes a second datum contact disposed between each of the optical fibers of the plurality of optical fibers and the support substrate. A first datum surface is disposed at a top surface of each of the plurality of optical fibers opposite the support surface.

In an example embodiment, the fiber optic assembly does not comprise a lid disposed opposite the support substrate. In some example embodiments the fiber optic assembly also includes an adhesive disposed in one or more voids disposed between the plurality of optical fibers or the plurality of optical fibers and the support substrate, the adhesive is not disposed at the first or second datum contact. In an example embodiment, a second datum surface is disposed on each edge optical fiber of the plurality of optical fibers and the second datum surface is disposed opposite the first datum contact. In some example embodiments, the adhesive is not disposed in an area of the planar surface adjacent to the plurality of optical fibers. In an example embodiment, the plurality of optical fibers includes a plurality of D-shaped optical fibers. In some example embodiments, a flat portion of each of the plurality of D-shaped optical fibers is disposed opposite to the support substrate. In an example embodiment, a flat portion of each of the plurality of D-shaped optical fibers is disposed in contact with the support substrate. In some example embodiments, each of the plurality of optical fibers includes a coated portion and a bare glass portion and the bare glass portion is disposed in the planar surface. In an example embodiment, the bare glass portion extends beyond an edge of the support substrate. In some example embodiments, the adhesive is disposed on the bare glass portion between the support substrate and the coated portion, such that the adhesive provides strain relief. In an example embodiment, the planar surface comprises a step down surface. The bare glass portion is disposed on the planar surface and the coated portion is disposed on the step down surface. In some example embodiments, the adhesive is disposed on support substrate at the interface of the bare glass portion and the coated portion, such that the adhesive provides strain relief. In an example embodiment, the fiber optic assembly also includes a waveguide substrate including a plurality of waveguides and a notch configured to receive the plurality of optical fibers therein. A second datum surface is disposed on each edge optical fiber of the plurality of optical fibers and the second datum surface is disposed opposite the first datum contact. The first datum surface or the second datum surface defines the interface of the plurality of optical fibers and the notch enabling passive alignment of the plurality of optical fibers to the plurality of waveguides. In some example embodiments, the first datum surface and the second datum surface define the interface of the plurality of optical fibers and the notch. In an example embodiment, the notch has at least one precision surface. The interface of the plurality of optical fibers and the notch is defined by the first datum surface or the second datum surface and the at least one precision surface. In some example embodiments, the fiber optic assembly also includes a waveguide substrate including a plurality of waveguides and an alignment feature disposed a predetermined offset distance from the plurality of waveguides. The support substrate includes an alignment edge and interaction of the alignment feature with the alignment edge enables passive alignment of the plurality of optical fibers to the plurality of waveguides. In an example embodiment, the alignment edge of the support substrate includes a precision surface.

In another example embodiment, a fiber optic assembly is provided including a fiber array unit including a support substrate having a planar surface and a signal-fiber array supported on the first surface of the support substrate. The signal-fiber array includes a plurality of optical fibers and an adhesive disposed in one or more voids disposed between the plurality of optical fibers or the plurality of optical fibers and the support substrate. Each optical fiber of the plurality of optical fibers includes a first datum contact disposed between the optical fiber and an adjacent optical fiber and each of the optical fibers of the plurality of optical fibers a second datum contact disposed between each of the optical fibers of the plurality of optical fibers and the support substrate. A first datum surface is disposed at a top surface of each of the plurality of optical fibers opposite the support surface. The fiber optic assembly also includes a waveguide substrate including a plurality of waveguides and a notch configured to receive the plurality of optical fibers therein. A first datum surface is disposed at a top surface of each of the plurality of optical fibers opposite the support substrate and a second datum surface is disposed on each edge optical fiber of the plurality of optical fibers, wherein the second datum surface is disposed opposite the first datum contact. The first datum surface or the second datum surface defines the interface of the plurality of optical fibers and the notch enabling passive alignment of the plurality of optical fibers to the plurality of waveguides. In an example embodiment, the fiber array does not comprise a lid disposed opposite the support substrate.

In a further example embodiment, a method for fabricating a multifiber assembly is provided including selecting a plurality of optical fibers that each have a respective cladding diameter and determining a maximum fiber core position error for the plurality of optical fibers in a plurality of configurations. For each configuration, the plurality of optical fibers are arranged side-by-side in an array such that each optical fiber has a position in the array, the plurality of optical fibers are arranged in a different order, each optical fiber has a respective fiber core position relative to an ideal core position for that optical fiber to define a respective fiber core position error, the ideal core positions are based on each optical fiber of the plurality of optical fibers having an ideal cladding diameter, and the maximum fiber core position error is a maximum of the respective fiber core position errors. The method also includes determining a desired order of the plurality of optical fibers that minimizes the maximum fiber core position error.

In an example embodiment, for each optical fiber of the plurality of optical fibers, a geometric center of the respective cladding diameter is used as the respective fiber core position. In some example embodiment, the method also includes measuring the respective cladding diameter of each optical fiber of the plurality of optical fibers at one or more locations along a length of the optical fiber. In an example embodiment, the method also includes arranging the plurality of optical fibers in the desired order and applying a matrix material to the plurality of optical fibers to form an optical fiber ribbon. In some example embodiment, the determining the maximum fiber core position error includes arranging the plurality of optical fibers in a first configuration, determining a first maximum fiber core position error for the first configuration, swapping the positions of two optical fibers of the plurality of optical fibers, such that the plurality of optical fibers are in a second configuration, and determining a second maximum fiber core position error for the second configuration. In an example embodiment, the swapping positions of two optical fibers of the plurality of optical fibers and the determining the maximum fiber core position error for a given configuration of the plurality of configurations is repeated for a predetermined number of iterations. In some example embodiment, the predetermined number of iterations includes all possible configurations of the plurality of optical fibers. In an example embodiment, the predetermined number of iterations includes at least 100 iterations. In some example embodiment, the method also includes selecting a plurality of additional optical fibers and determining the maximum fiber core position error includes arranging the plurality of optical fibers in a first configuration, determining a first maximum fiber core position error for the first configuration, swapping positions of two optical fibers of the plurality of optical fibers and swapping a first optical fiber of the plurality of optical fibers with a second optical fiber of the plurality of additional optical fibers to form a second configuration, and determining a second maximum fiber core position error for the second configuration. In an example embodiment, each optical fiber of the plurality of optical fibers has is colored and each of the additional optical fibers is colored. The swapping the first optical fiber of the plurality of optical fibers with the second optical fiber of the plurality of additional optical fibers comprises swapping the first optical fiber with a second optical fiber of the same color. In some example embodiment, the swapping positions of two optical fibers and the determining of a maximum fiber core position error is repeated for a predetermined number of iterations. In an example embodiment, the predetermined number of iterations includes all possible configurations of the plurality of optical fibers and the plurality of additional optical fibers. In some example embodiment, the predetermined number of iterations includes at least 100 iterations.

In yet another example embodiment, a method for fabricating a fiber array unit is provided including selecting a plurality of optical fibers that each have a respective cladding diameter and determining a maximum fiber core position error for the plurality of optical fibers in a plurality of configurations. For each configuration, the plurality of optical fibers are arranged side-by-side in an array such that each optical fiber has a position in the array, the plurality of optical fibers are arranged in a different order, each optical fiber has a respective fiber core position relative to an ideal core position for that optical fiber to define a respective fiber core position error, the ideal core positions are based on each optical fiber of the plurality of optical fibers having an ideal cladding diameter, and the maximum fiber core position error is a maximum of the respective fiber core position errors. The method also includes determining a desired order of the plurality of optical fibers that minimizes the maximum fiber core position error, positioning the plurality of optical fibers on a support substrate in the configuration that includes the desired order, and applying an adhesive to affix the plurality of optical fibers to the support substrate.

In some example embodiments, for each optical fiber of the plurality of optical fibers, a geometric center of the respective cladding diameter is used as the respective fiber core position. In an example embodiment, the method also includes measuring the respective cladding diameter of each optical fiber of the plurality of optical fibers at one or more locations along a length of the optical fiber. The method also includes, the method also includes arranging the plurality of optical fibers in the desired order, applying a matrix material to the plurality of optical fibers to form an optical fiber ribbon, removing the matrix material from a portion of the plurality of optical fibers positioned on the support substrate. In an example embodiment, the determining the maximum fiber core position error includes arranging the plurality of optical fibers in a first configuration, determining a first maximum fiber core position error for the first configuration, swapping the positions of two optical fibers of the plurality of optical fibers, such that the plurality of optical fibers are in a second configuration, and determining a second maximum fiber core position error for the second configuration. In some example embodiments, the swapping positions of two optical fibers of the plurality of optical fibers and the determining of the maximum fiber core position error for a given configuration of the plurality of configurations is repeated for a predetermined number of iterations. In an example embodiment, the method also includes selecting a plurality of additional optical fibers and the determining the maximum fiber core total error includes arranging the plurality of optical fibers in a first configuration, determining a first maximum fiber core position error for the first configuration, swapping positions of two optical fibers of the plurality of optical fibers or swapping a first optical fiber of the plurality of optical fibers with a second optical fiber of the plurality of additional optical fibers to form a second configuration, and determining a second maximum fiber core position error for the second configuration. In some example embodiments, the swapping positions of two optical fibers and the determining of a current maximum fiber core total error for a current configuration is repeated for a predetermined number of iterations. In an example embodiment, the plurality of optical fibers includes a first plurality of optical fibers and the desired order includes a first desired order. The method also includes selecting a second plurality of optical fibers that each have a respective cladding diameter, determining a plurality of maximum fiber core position errors for the second plurality of optical fibers in a second plurality of configurations, determining a second determined order of the second plurality of optical fibers that minimizes the maximum fiber core total error, positioning the second plurality of optical fibers in the second determined order, interdigitating the first plurality of optical fibers in the first desired order and the second plurality of optical fibers in the second desired order to form a interdigitated group of optical fibers, positioning the interdigitated group of optical fibers on the support substrate, and applying the adhesive to affix the interdigitated group of optical fibers to the support substrate. In some example embodiments, the interdigitated group of optical fibers includes a first interdigitated group of optical fibers and the method also includes positioning a second interdigitated group of optical fibers on the support substrate and applying the adhesive to affix the second interdigitated group of optical fibers to the support substrate. In an example embodiment, the second interdigitated group of optical fibers is in direct contact with the first interdigitated group of optical fibers. In some example embodiments, the second interdigitated group of optical fibers is spaced apart from the first interdigitated group of optical fibers and the method also includes positioning a spacer fiber on the support substrate between the first interdigitated group of optical fibers and the second interdigitated group of optical fibers and applying the adhesive to affix the spacer fiber to the support substrate.

In a further example embodiment, a optoelectronic assembly is provided including a photonic integrated circuit (PIC)

including at least one electronic connection element and plurality of waveguides disposed on a PIC face, a printed circuit board (PCB) including at least one PCB electronic connection element, which is complementary to the at least one electronic connection element of the PIC and the PIC is configured to be flip chip mounted to the PCB, a lidless fiber array unit including a support substrate having a substantially flat first surface and a signal-fiber array including a plurality of optical fibers supported on the first surface, and an alignment substrate disposed on the PIC face and configured to align the plurality of optical fibers of the signal-fiber array with the plurality of waveguides.

In an example embodiment, the alignment substrate comprises a precision channel configured to receive the lidless fiber array unit. In some example embodiments, the optoelectronic assembly also includes an alignment feature extending from the PIC face and configured to align the precision channel with the plurality of waveguides. In an example embodiment, the alignment feature includes an alignment rib including a stop extending perpendicularly from a longitudinal axis of the alignment rib. In some example embodiments, the PCB includes a recess and at least a portion of the alignment substrate is disposed in the recess. In an example embodiment, the optoelectronic assembly also includes an overlap sheet disposed on a second surface of the support substrate, opposite the first surface. A portion of the overlap sheet extends past a forward edge of the lidless fiber array, such that the portion of overlap sheet covers at least a portion of the PIC when the lidless fiber array is installed in the alignment substrate. In some example embodiments, an adhesive is disposed between the portion of the overlap sheet and the portion of the PIC. In an example embodiment, the photoelectric assembly also includes a cap disposed on the PIC, the cap is configured to retain the lidless fiber array unit in contact with the plurality of waveguides. In some example embodiments, the cap includes one of a protrusion and a depression and the other of the protrusion and the depression is disposed on the support substrate, such that the engagement of the depression by the protrusion resists removal of the lidless fiber optic array from the cap. In an example embodiment, the alignment substrate includes a precision channel configured to receive the lidless fiber array unit and the optoelectronic assembly also includes a clip feature disposed on the PIC. The clip feature including a first set of arms extending away from an edge of the PIC and configured to engage side edges of the support substrate and a grip element configured to bias the support substrate toward the precision channel. In some example embodiments, each of the side edges of the support substrate include a respective notch and each arm of the first set of arms includes a catch configured to engage the respective notch. In an example embodiment, the clip feature includes a metal clip. In some example embodiments, the clip feature also includes a second set of arms extending across a portion of the PIC face and configured to engage the alignment substrate. In an example embodiment, each arm of the second set of arms includes a catch configured to engage a sidewall of the alignment substrate.

In still further example embodiments, a fiber optic assembly is provided including a support substrate having a first surface comprising a plurality of V-grooves and a signal-fiber array supported on the first surface of the support substrate. The signal-fiber array including a plurality of optical fibers disposed in the plurality of V-grooves. The fiber optic assembly also including an adhesive disposed on the plurality of optical fibers and the support substrate. A first datum surface is disposed at a top of each of the plurality of optical fibers opposite the support surface.

In an example embodiment, the fiber optic assembly does not include a lid disposed opposite the support substrate. In some example embodiments, the adhesive is disposed on the first surface between two optical fibers of the plurality of optical fibers. In some example embodiments, the height of the adhesive is less than half of the diameter of an optical fiber of the plurality of optical fibers. In an example embodiment, the adhesive is disposed in the V-grooves and excluded from the first surface between two optical fibers of the plurality of optical fibers.

In another example embodiment, a fiber optic assembly is provided including a support substrate having a substantially planar surface and a signal-fiber array supported on the planar surface of the support substrate. The signal-fiber array includes a plurality of optical fibers. The fiber optic assembly also includes an adhesive disposed on the plurality of optical fibers and the support substrate. Each of the optical fibers is spaced from adjacent optical fibers of the plurality of optical fibers at a precise pitch.

In an example embodiment, the adhesive includes an adhesive profile having a plurality of raised peaks over at least a portion of each optical fiber of the plurality of optical fibers. In some example embodiments, a first datum surface is disposed at a top surface of the adhesive profile defined by the raised peaks. In an example embodiment, the raised peaks are truncated to a top surface of the plurality of optical fibers. In some example embodiments, the raised peaks are truncated to define a plurality of planar datum surfaces. In an example embodiment the fiber optic assembly also includes a lid disposed on the first datum surface. In some example embodiments, the lid includes a trench configured to receive at least a portion of the adhesive profile or the plurality of optical fibers. In an example embodiment the fiber optic assembly also includes a photonic integrated circuit (PIC) substrate comprising a plurality of V-grooves configured to receive the raised peaks. In some example embodiments, the height of the adhesive between adjacent optical fibers is less than half of the diameter of an optical fiber of the plurality of optical fibers In a further embodiment, a fiber optic assembly is provided including a support substrate having a planar surface and a signal-fiber array supported on the planer surface of the support substrate. The signal-fiber array includes a plurality of optical fibers. The fiber optic assembly also includes an adhesive disposed on the plurality of optical fibers and the support substrate. Each of the optical fibers is spaced from adjacent optical fibers of the plurality of optical fibers and a datum surface is defined on an outer surface of each edge optical fiber of the plurality of optical fibers.

In still a further example embodiment, a method of fabricating a fiber optic assembly is provided including placing a signal-fiber array on a first surface of a support substrate, the signal-fiber array including a plurality of optical fibers disposed in a plurality of V-grooves disposed on the first surface of the support substrate, applying an adhesive on the plurality of optical fibers and the support substrate, pressing a release pad onto the adhesive, signal-fiber array, and support substrate, curing the adhesive, and removing the release pad. A first datum surface is disposed at a top of each of the plurality of optical fibers opposite the support surface.

In yet another example embodiment, a method of fabricating fiber optic assembly is provided including placing a signal-fiber array on a planar surface of a support substrate, the signal-fiber array including a plurality of optical fibers, applying an adhesive on the plurality of optical fibers and the support substrate, pressing a release pad onto the adhesive, signal-fiber array, and support substrate, curing the adhesive, and removing the release pad. Each optical fiber is spaced apart from adjacent optical fibers of the plurality of optical fibers at a precise pitch.

In an example embodiment the fiber optic assembly also includes a photonic integrated circuit (PIC) substrate including a plurality of waveguides, and the plurality of optical fibers is aligned with the plurality of waveguides. In some example embodiments, the PIC substrate comprises a notch configured to receive the plurality of optical fibers therein, and the datum surfaces on the edge optical fibers define an interface of the plurality of optical fibers and the notch enabling passive alignment of the plurality of optical fibers to the plurality of waveguides. In an example embodiment, the adhesive defines a spacer region on the planar surface and the height of the spacer region corresponds to the depth of the waveguides below a top surface of the PIC substrate. In some example embodiments, the adhesive defines at least one alignment feature configured to enable passive alignment of the fiber optic assembly. In an example embodiment, the alignment feature include a raised feature In some example embodiments, the alignment feature includes a recessed feature. In an example embodiment, the alignment feature is disposed at a precision horizontal and vertical offset from the plurality of optical fibers.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations may be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A fiber optic assembly comprising:
a support substrate having a first surface comprising a plurality of V-grooves;
a signal-fiber array supported on the first surface of the support substrate, the signal-fiber array comprising a plurality of optical fibers disposed in the plurality of V-grooves, wherein each of the plurality of optical fibers comprises a first exposed datum surface at a top of the optical fibers opposite the support substrate and wherein some of the plurality of optical fibers are defined as edge optical fibers and comprise a second exposed datum surface; and
an adhesive, disposed on the plurality of optical fibers and the support substrate, that bonds the plurality of optical fibers to each other and to the support substrate,
wherein the adhesive resides below a plane defined by the first datum surface to not interfere with mating of the first exposed datum surface or the second datum surface, and wherein the second exposed datum surface enables lateral alignment of the fiber optic assembly with a waveguide substrate, and wherein each optical fiber is spaced apart from adjacent optical fibers of the plurality of optical fibers at a precise pitch, and each optical fiber is directly adjacent an adjacent optical fiber.

2. The fiber optic assembly of claim 1, wherein the fiber optic assembly does not comprise a lid disposed opposite the support substrate.

3. The fiber optic assembly of claim 1, wherein the adhesive is disposed on the first surface between two optical fibers of the plurality of optical fibers.

4. The fiber optic assembly of claim 3, wherein the height of the adhesive is less than half of the diameter of an optical fiber of the plurality of optical fibers.

5. The fiber optic assembly of claim 1, wherein the adhesive is disposed in the plurality of V-grooves and excluded from the first surface between two optical fibers of the plurality of optical fibers.

6. A fiber optic assembly comprising:
a support substrate having a substantially planar surface;
a signal-fiber array supported on the planar surface of the support substrate, the signal-fiber array comprising a plurality of optical fibers, wherein each of the plurality of optical fibers comprises a first exposed datum surface at a top of the optical fibers opposite the support substrate and wherein some of the plurality of optical fibers are defined as edge optical fibers and comprise a second exposed datum surface; and
an adhesive, disposed on the plurality of optical fibers and the support substrate, that bonds the plurality of optical fibers to each other and to the support substrate,
wherein each optical fiber is spaced apart from adjacent optical fibers of the plurality of optical fibers at a precise pitch, and each optical fiber is directly adjacent an adjacent optical fiber, and
wherein the adhesive resides below a plane defined by the first datum surface to not interfere with mating of the first exposed datum surface or the second datum surface, and wherein the second exposed datum surface enables lateral alignment of the fiber optic assembly with a waveguide substrate.

7. The fiber optic assembly of claim 6, wherein the adhesive comprises an adhesive profile having a plurality of raised peaks over at least a portion of each optical fiber of the plurality of optical fibers.

8. The fiber optic assembly of claim 7, wherein a third datum surface is defined at a top surface of the adhesive profile defined by the plurality of raised peaks.

9. The fiber optic assembly of claim 8, wherein the plurality of raised peaks are truncated to the plurality of optical fibers.

10. The fiber optic assembly of claim 8, wherein the plurality of raised peaks are truncated to define a plurality of planar datum surfaces.

11. The fiber optic assembly of claim 8, further comprising:
a lid disposed on the third datum surface.

12. The fiber optic assembly of claim 11, wherein the lid comprises a trench configured to receive at least a portion of the adhesive profile or the plurality of optical fibers.

13. The fiber optic assembly of claim 7, further comprising:
a photonic integrated circuit (PIC) substrate comprising a plurality of V-grooves configured to receive the plurality of raised peaks.

14. The fiber optic assembly of claim 6, wherein the height of the adhesive between adjacent optical fibers is less than half of the diameter of an optical fiber of the plurality of optical fibers.

15. A fiber optic assembly comprising:
a support substrate having a planar surface;
a signal-fiber array supported on the planer surface of the support substrate, the signal-fiber array comprising a plurality of optical fibers, wherein each of the plurality of optical fibers comprises a first exposed datum surface at a top of the optical fibers opposite the support substrate and wherein some of the plurality of optical fibers are defined as edge optical fibers and comprise a second exposed datum surface; and
an adhesive, disposed on the plurality of optical fibers and the support substrate, that bonds the plurality of optical fibers to each other and to the support substrate,
wherein each optical fiber is spaced apart from adjacent optical fibers of the plurality of optical fibers at a precise pitch and each optical fiber is directly adjacent an adjacent optical fiber, and
wherein a datum surface is defined on an outer surface of each edge optical fiber of the plurality of optical fibers.

16. The fiber optic assembly of claim 15, further comprising:
a photonic integrated circuit (PIC) substrate comprising a plurality of waveguides, wherein the plurality of optical fibers is aligned with the plurality of waveguides.

17. The fiber optic assembly of claim 16, wherein the PIC substrate comprises a notch configured to receive the plurality of optical fibers therein, and
wherein the datum surface on each of the edge optical fibers defines an interface of the plurality of optical fibers, and the notch enabling passive alignment of the plurality of optical fibers to the plurality of waveguides.

18. The fiber optic assembly of claim 14, wherein the adhesive defines a spacer region on the planar surface, wherein a height of the spacer region corresponds to a depth of the plurality of waveguides below a top surface of the PIC substrate.

19. The fiber optic assembly of claim 13, wherein the adhesive defines at least one alignment feature configured to enable passive alignment of the fiber optic assembly.

20. The fiber optic assembly of claim 19, wherein the at least one alignment feature comprises a raised feature.

21. The fiber optic assembly of claim 19, wherein the at least one alignment feature comprises a recessed feature.

22. The fiber optic assembly of claim 19, wherein the at least one alignment feature is positioned at a horizontal offset and a vertical offset spaced away from the plurality of optical fibers.

23. A method of fabricating a fiber optic assembly comprising:
placing a signal-fiber array on a first surface of a support substrate, the signal-fiber array comprising a plurality of optical fibers disposed in a plurality of V-grooves disposed on the first surface of the support substrate;
applying an adhesive on the plurality of optical fibers and the support substrate for bonding the plurality of signal optical fibers to each other and to the support substrate,
pressing a release pad onto the adhesive, signal-fiber array, and support substrate;
curing the adhesive;
deforming the release pad and thereby controlling and limiting the flow of the adhesive around the pressed released pad; and
removing the release pad,
wherein a first datum surface is disposed at a top of each of the plurality of optical fibers opposite the support surface, wherein each optical fiber is spaced apart from adjacent optical fibers of the plurality of optical fibers at a precise pitch, and each optical fiber is directly adjacent an adjacent optical fiber.

24. A method of fabricating fiber optic assembly comprising:
placing a signal-fiber array on a planar surface of a support substrate, the signal-fiber array comprising a plurality of optical fibers;
applying an adhesive on the plurality of optical fibers and the support substrate;
pressing a release pad onto the adhesive, signal-fiber array, and support substrate; deforming the release pad and thereby controlling and limiting the flow of the adhesive around the pressed released pad;
curing the adhesive; and
removing the release pad,
wherein each optical fiber is spaced apart from adjacent optical fibers of the plurality of optical fibers at a precise pitch, and each optical fiber is directly adjacent an adjacent optical fiber.

* * * * *